(12) United States Patent
Stettiner et al.

(10) Patent No.: US 11,513,187 B2
(45) Date of Patent: Nov. 29, 2022

(54) FMCW AUTOMOTIVE RADAR INCORPORATING MODIFIED SLOW TIME PROCESSING OF FINE RANGE-DOPPLER DATA

(71) Applicant: Arbe Robotics Ltd., Tel Aviv (IL)

(72) Inventors: Yoram Stettiner, Kerem Maharal (IL); Noam Arkind, Givatayim (IL)

(73) Assignee: Arbe Robotics Ltd.

( * ) Notice: Subject to any disclaimer, the term of this patent is extended or adjusted under 35 U.S.C. 154(b) by 12 days.

(21) Appl. No.: 17/048,577

(22) PCT Filed: May 6, 2019

(86) PCT No.: PCT/IL2019/050513
§ 371 (c)(1),
(2) Date: Oct. 17, 2020

(87) PCT Pub. No.: WO2019/215733
PCT Pub. Date: Nov. 14, 2019

(65) Prior Publication Data
US 2021/0156981 A1    May 27, 2021

(30) Foreign Application Priority Data
May 7, 2018    (IL) .......................................... 259190

(51) Int. Cl.
*G01S 7/35* (2006.01)
*G01S 7/02* (2006.01)
(Continued)

(52) U.S. Cl.
CPC .............. *G01S 7/356* (2021.05); *G01S 7/023* (2013.01); *G01S 7/0232* (2021.05);
(Continued)

(58) Field of Classification Search
CPC .... G01S 13/931; G01S 13/347; G01S 13/325; G01S 13/343; G01S 13/345;
(Continued)

(56) References Cited

U.S. PATENT DOCUMENTS 3,603,989 A    9/1971    Caspers
3,981,012 A    9/1976    Brault
(Continued)

FOREIGN PATENT DOCUMENTS

CN    1967286 A    5/2007
CN    101950851 A    1/2011
(Continued)

OTHER PUBLICATIONS

Jason Yu et al: "Multiband chirp synthesis for frequency-hopped FMCW radar", Signals, Systems and Computers, 2009 Conference Record of the Forty-Third Asilomar Conference on, IEEE, Piscataway, NJ, USA, Nov. 1, 2009 (Nov. 1, 2009), pp. 1315-1319, XP031679466, ISBN: 978-1-4244-5825-7.
(Continued)

*Primary Examiner* — Timothy A Brainard
*Assistant Examiner* — Michael W Justice
(74) *Attorney, Agent, or Firm* — Zaretsky Group PC; Howard Zaretsky

(57) ABSTRACT

A novel and useful system and method by which radar angle and range resolution are significantly improved without increasing complexity in critical hardware parts. A multi-pulse methodology is described in which each pulse contains partial angular and range information consisting of a portion of the total CPI bandwidth, termed multiband chirp. Each chirp has significantly reduced fractional bandwidth relative to monoband processing. Each chirp contains angular information that fills only a portion of the 'virtual array', while the full virtual array information is contained across the CPI.

(Continued)

This is done using only a single transmission antenna per pulse, thus significantly simplifying MIMO hardware realization, referred to as antenna-multiplexing (AM). Techniques for generating the multiband chirps as well as receiving and generating improved fine range-Doppler data maps. A windowing technique deployed in the transmitter as opposed to the receiver is also disclosed.

18 Claims, 34 Drawing Sheets

(51) Int. Cl.
G01S 13/34 (2006.01)
G01S 13/58 (2006.01)
G01S 13/931 (2020.01)

(52) U.S. Cl.
CPC .......... G01S 7/0235 (2021.05); G01S 13/343 (2013.01); G01S 13/346 (2013.01); G01S 13/347 (2013.01); G01S 13/584 (2013.01); G01S 13/931 (2013.01)

(58) Field of Classification Search
CPC ........ G01S 13/584; G01S 7/023; G01S 7/356; G01S 7/0232; G01S 7/0235
USPC ......................................... 342/128, 134, 196
See application file for complete search history.

(56) References Cited

U.S. PATENT DOCUMENTS

| | | | |
|---|---|---|---|
| 4,166,980 A | 9/1979 | Apostolos | |
| 4,197,540 A | 4/1980 | Riggs | |
| 4,494,083 A | 1/1985 | Josefsson | |
| 4,926,185 A | 5/1990 | Wittenberg | |
| 5,063,603 A | 11/1991 | Burt | |
| 5,424,742 A * | 6/1995 | Long | G01S 13/904 342/25 C |
| 5,430,445 A * | 7/1995 | Peregrim | G01S 13/22 342/25 C |
| 5,442,362 A | 8/1995 | Zwarts | |
| 5,923,280 A | 7/1999 | Farmer | |
| 5,955,992 A | 9/1999 | Shattil | |
| 6,028,548 A | 2/2000 | Farmer | |
| 6,828,929 B2 * | 12/2004 | Barbella | G01S 13/24 342/146 |
| 6,865,216 B1 | 3/2005 | Beamish | |
| 6,888,887 B1 | 5/2005 | Shattil | |
| 6,989,782 B2 | 1/2006 | Walker | |
| 7,071,868 B2 * | 7/2006 | Woodington | H01Q 1/3258 342/159 |
| 7,308,043 B1 | 12/2007 | Frank | |
| 7,639,171 B2 * | 12/2009 | Alland | H01Q 3/24 342/25 R |
| 7,804,445 B1 | 9/2010 | Fiore | |
| 7,835,455 B2 | 11/2010 | Shattil | |
| 8,035,038 B2 | 10/2011 | Cheng | |
| 8,175,134 B1 | 5/2012 | Giallorenzi | |
| 8,599,062 B2 | 12/2013 | Szajnowski | |
| 8,803,732 B2 | 8/2014 | Antonik | |
| 8,970,425 B2 * | 3/2015 | Nogueira-Nine | G01S 13/282 342/128 |
| 9,250,322 B2 * | 2/2016 | Newman | G01S 13/282 |
| 9,645,228 B1 | 5/2017 | Doerry | |
| 9,791,564 B1 | 10/2017 | Harris | |
| 10,082,570 B1 | 9/2018 | Izadian | |
| 10,094,920 B2 * | 10/2018 | Rao | G01S 13/343 |
| 10,359,504 B2 | 7/2019 | Fetterman | |
| 10,451,723 B2 * | 10/2019 | Chiu | G01S 7/354 |
| 11,199,617 B2 * | 12/2021 | Hakobyan | G01S 13/931 |
| 11,277,902 B2 | 3/2022 | Snir | |
| 2003/0151476 A1 | 8/2003 | Salmela | |
| 2004/0150552 A1 * | 8/2004 | Barbella | G01S 13/24 342/111 |
| 2004/0196172 A1 | 10/2004 | Wasiewicz | |
| 2005/0156780 A1 | 7/2005 | Bonthron | |
| 2005/0232182 A1 | 10/2005 | Shattil | |
| 2007/0040728 A1 | 2/2007 | Nishimura | |
| 2007/0171123 A1 | 7/2007 | Nakano | |
| 2007/0205847 A1 | 9/2007 | Kushta | |
| 2008/0284641 A1 | 11/2008 | Spreadbury | |
| 2008/0317345 A1 | 12/2008 | Wiedemann | |
| 2009/0085800 A1 * | 4/2009 | Alland | G01S 13/343 342/25 R |
| 2011/0122014 A1 | 5/2011 | Szajnowski | |
| 2012/0056780 A1 | 3/2012 | Antonik | |
| 2012/0146846 A1 | 6/2012 | Antonik | |
| 2012/0169523 A1 | 7/2012 | Lee | |
| 2012/0235859 A1 | 9/2012 | Hayase | |
| 2012/0313810 A1 * | 12/2012 | Nogueira-Nine | G01S 13/282 342/128 |
| 2013/0009806 A1 * | 1/2013 | Newman | G01S 13/282 375/139 |
| 2013/0257670 A1 | 10/2013 | Sovero | |
| 2014/0022113 A1 * | 1/2014 | Nogueira-Nine | G01S 13/34 342/128 |
| 2014/0079248 A1 | 3/2014 | Short | |
| 2014/0211438 A1 | 7/2014 | Lin | |
| 2014/0320231 A1 | 10/2014 | Seler | |
| 2014/0355385 A1 | 12/2014 | Inagaki | |
| 2015/0061928 A1 | 3/2015 | Cornic | |
| 2016/0018511 A1 | 1/2016 | Nayyar | |
| 2016/0061942 A1 * | 3/2016 | Rao | G01S 13/583 342/195 |
| 2016/0084941 A1 | 3/2016 | Arage | |
| 2016/0131738 A1 | 5/2016 | Prechtel | |
| 2016/0139254 A1 | 5/2016 | Wittenberg | |
| 2016/0187477 A1 | 6/2016 | Wang | |
| 2016/0285611 A1 | 9/2016 | Fischer | |
| 2016/0334502 A1 * | 11/2016 | Ali | G01S 7/352 |
| 2016/0377711 A1 * | 12/2016 | Arage | G01S 13/26 342/118 |
| 2017/0131394 A1 | 5/2017 | Roger | |
| 2017/0219689 A1 | 8/2017 | Hung | |
| 2017/0307744 A1 | 10/2017 | Loesch | |
| 2017/0343648 A1 | 11/2017 | Trotta | |
| 2018/0045819 A1 * | 2/2018 | Cornic | G01S 13/343 |
| 2018/0095162 A1 | 4/2018 | Fetterman | |
| 2018/0172816 A1 * | 6/2018 | Chiu | G01S 13/26 |
| 2018/0350751 A1 | 12/2018 | Sun | |
| 2019/0004167 A1 * | 1/2019 | Rao | G01S 13/343 |
| 2019/0050372 A1 | 2/2019 | Zeng | |
| 2019/0235066 A1 * | 8/2019 | Iida | G01S 13/34 |
| 2019/0265346 A1 * | 8/2019 | Hakobyan | G01S 13/347 |
| 2020/0011968 A1 | 1/2020 | Hammes | |
| 2020/0176393 A1 | 6/2020 | Ketterson | |
| 2020/0388578 A1 | 12/2020 | Lim | |
| 2020/0393536 A1 | 12/2020 | Stettiner | |
| 2021/0156980 A1 | 5/2021 | Stettiner | |
| 2021/0156982 A1 | 5/2021 | Stettiner | |
| 2021/0184340 A1 | 6/2021 | Stav | |
| 2021/0263147 A1 | 8/2021 | Bauer | |
| 2021/0275056 A1 | 9/2021 | McMahon | |
| 2021/0293923 A1 | 9/2021 | Arkind | |
| 2021/0318413 A1 | 10/2021 | Arkind | |
| 2021/0320425 A1 | 10/2021 | Arkind | |

FOREIGN PATENT DOCUMENTS

| | | |
|---|---|---|
| CN | 106100696 A | 11/2016 |
| CN | 108089163 A | 5/2018 |
| DE | 102013216251 A1 | 2/2015 |
| DE | 102015218538 A1 | 3/2017 |
| DE | 102016224900 A1 | 6/2018 |
| EP | 0132795 A2 | 2/1985 |
| EP | 3165941 A1 | 5/2017 |
| GB | 2462148 A | 2/2010 |
| WO | 2017/069679 A1 | 4/2017 |
| WO | 2017/208670 A1 | 12/2017 |

(56) References Cited

FOREIGN PATENT DOCUMENTS

| WO | 2018/138725 A1 | 8/2018 |
| WO | 2018/142395 A1 | 8/2018 |
| WO | 2018/142396 A1 | 8/2018 |

OTHER PUBLICATIONS

Laribi Amir et al: "A new height-estimation method using FMCW radar Doppler beam sharpening", 2017 25th European Signal Processing Conference (EUSIPCO), EURASIP, Aug. 28, 2017 (Aug. 28, 2017), pp. 1932-1396, XP033236275, DOI: 10.23919/EUSIPC0. 2017.8081546 [retrieved on Oct. 23, 2017].
Miralles E, Multerer T, Ganis A, Schoenlinner B, Prechtel U, Meusling A, Mietzner J, Weckerle C, Esteban H, Vossiek M, Loghik M. Multifunctional and compact 3D FMCW MIMO radar system with rectangular array for medium-range applications. IEEE Aerospace and Electronic Systems Magazine. May 7, 2018;33(4):46-54. Enric Miralles May 7, 2018 (May 7, 2018).
Comparative Performance Analysis of Hamming, Hanning and Blackman Window by Prajoy Podder at International Journal of Computer Applications (0975-8887) vol. 96—No. 18, Jun. 2014 (Year: 2014).

* cited by examiner

FMCW AUTOMOTIVE RADAR INCORPORATING MODIFIED SLOW TIME PROCESSING OF FINE RANGE-DOPPLER DATA

FIELD OF THE DISCLOSURE

The subject matter disclosed herein relates to the field of imaging radar, sonar, ultrasound, and other sensors for performing range measurement via FMCW signals and/or angle measurement via digital beam forming and array processing and more particularly relates to a system and method of FMCW radar that utilizes a nonlinear sequence of fractional bandwidth time multiplexed FMCW signals and related range and Doppler processing.

BACKGROUND OF THE INVENTION

Recently, applications of radars in the automotive industry have started to emerge. High-end automobiles already have radars that provide parking assistance and lane departure warning to the driver. Currently, there is growing interest in self-driving cars and it is currently considered to be the main driving force in the automotive industry in the coming years.

Self-driving cars offer a new perspective on the application of radar technology in automobiles. Instead of only assisting the driver, automotive radars will be capable of taking an active role in the control of the vehicle. They are thus likely to become a key sensor of the autonomous control system of a vehicle.

Radar is preferred over other alternatives such as sonar or LIDAR as it is less affected by weather conditions and can be made very small to decrease the effect of the deployed sensor on the aerodynamics and appearance of the vehicle. Frequency Modulated Continuous Wave (FMCW) radar is a type of radar that offers several advantages compared to the others. For example, it ensures the range and velocity information of the surrounded objects can be detected simultaneously. This information is important for the control system of the self-driving vehicle to provide safe and collision-free operation.

For shorter range detection, as in automotive radar, FMCW radar is commonly used. Several benefits of FMCW radar in automotive applications include: (1) FMCW modulation is relatively easy to generate, provides large bandwidth, high average power, good short range performance, high accuracy, low cost due to low bandwidth processing and permits very good range resolution and allows the Doppler shift to be used to determine velocity, (2) FMCW radar can operate at short ranges, (3) FMCW sensors can be made small having a single RF transmission source with an oscillator that is also used to downconvert the received signal, (4) since the transmission is continuous, the modest output power of solid state components is sufficient.

In linear FMCW radar, the transmission frequency increases linearly with time. The echo signal from a target at a distance $R_0$ will be returned at time (i.e. propagation delay) $\tau = 2R^0/c$. The beat frequency output of a mixer in the receiver due to the range of the target for an up-chirp modulated signal is given as $$f_R = \frac{2R_0}{c} \frac{B_{chirp}}{T} \qquad (1)$$

where
$R_0$ is the range to the target;
$B_{chirp}$ is the modulation frequency bandwidth;
T is the duration of the modulation chirp;
c is the speed of light;

The Doppler frequency causes the frequency-time plot of the radar return signal to be shifted up or down. For a target approaching the radar, the received Doppler frequency is positive. The Doppler frequency is given as $$f_D = -\frac{2V_0 f_0}{c} \qquad (2)$$

where
$V_0$ is the target radial velocity (negative for an approaching target);
$f_0$ is the carrier frequency;

Considering that the radar sensor operates at a frequency $f_0$ The beat frequency $f_b$ due to the range to a target and the Doppler shift, for up-chirps is given as $$f_b = f_R + f_D \qquad (3)$$

$$f_b = \frac{2R_0}{c} \frac{B_{chirp}}{T} - \frac{2V_0 f_0}{c} \qquad (4)$$

Note that a single chirp measurement yields the frequency shift for each target. This value is related to $R_0$ and $V_0$ through Equation 4. Since many R and V combinations can satisfy the equation, the range and velocity estimates are ambiguous.

A radar system installed in a car should be able to provide the information required by the control system in real-time. A baseband processing system is needed that is capable of providing enough computing power to meet real-time system requirements. The processing system performs digital signal processing on the received signal to extract the useful information such as range and velocity of the surrounded objects.

Currently, vehicles (especially cars) are increasingly equipped with technologies designed to assist the driver in critical situations. Besides cameras and ultrasonic sensors, car manufacturers are turning to radar as the cost of the associated technology decreases. The attraction of radar is that it provides fast and clear-cut measurement of the velocity and distance of multiple objects under any weather conditions. The relevant radar signals are frequency modulated and can be analyzed with spectrum analyzers. In this manner, developers of radar components can automatically detect, measure and display the signals in time and frequency domains, even up to frequencies of 500 GHz.

There is also much interest now in using radar in the realm of autonomous vehicles which is expected to become more prevalent in the future. Millimeter wave automotive radar is suitable for use in the prevention of collisions and for autonomous driving. Millimeter wave frequencies from 77 to 81 GHz are less susceptible to the interference of rain, fog, snow and other weather factors, dust and noise than ultrasonic radars and laser radars. These automotive radar systems typically comprise a high frequency radar transmitter which transmits a radar signal in a known direction. The transmitter may transmit the radar signal in either a continuous or pulse mode. These systems also include a receiver connected to the appropriate antenna system which receives echoes or reflections from the transmitted radar signal. Each such reflection or echo represents an object illuminated by the transmitted radar signal.

Advanced driver assistance systems (ADAS) are systems developed to automate, adapt, and enhance vehicle systems for safety and better driving. Safety features are designed to avoid collisions and accidents by offering technologies that alert the driver to potential problems, or to avoid collisions by implementing safeguards and taking over control of the vehicle. Adaptive features may automate lighting, provide adaptive cruise control, automate braking, incorporate GPS/traffic warnings, connect to smartphones, alert driver to other cars or dangers, keep the driver in the correct lane, or show what is in blind spots.

There are many forms of ADAS available; some features are built into cars or are available as an add-on package. Also, there are aftermarket solutions available. ADAS relies on inputs from multiple data sources, including automotive imaging, LIDAR, radar, image processing, computer vision, and in-car networking. Additional inputs are possible from other sources external to the primary vehicle platform, such as other vehicles, referred to as vehicle-to-vehicle (V2V), or vehicle-to-infrastructure system (e.g., mobile telephony or Wi-Fi data network).

Advanced driver assistance systems are currently one of the fastest growing segments in automotive electronics, with steadily increasing rates of adoption of industry wide quality standards, in vehicular safety systems ISO 26262, developing technology specific standards, such as IEEE 2020 for image sensor quality and communications protocols such as the Vehicle Information API.

In recent years many industries are moving to autonomous solutions such as the automotive industry, deliveries, etc. These autonomous platforms operate in the environment while interacting with both stationary and moving objects. For this purpose, these systems require a sensor suite which allows them to sense their surroundings in a reliable and efficient manner. For example, in order for an autonomous vehicle to plan its route on a road with other vehicles on it, the trajectory planner must have a 3D map of the environment with an indication of the moving objects.

Visual sensors are also degraded by bad weather and poor visibility (e.g., fog, smoke, sand, rain storms, snow storms, etc.). They are also limited in estimating radial velocities. Light Detection and Ranging devices (LIDARs) are used to measure distance to a target by illuminating that target with a laser light. These, however, are expensive, as most have moving parts and very limited range. Thus, automotive radar is seen as an augmenting and not replacement technology.

In the automotive field, radar sensors are key components for comfort and safety functions, for example adaptive cruise control (ACC) or collision mitigation systems (CMS). With an increasing number of automotive radar sensors operated close to each other at the same time, radar sensors may receive signals from other radar sensors. The reception of foreign signals (interference) can lead to problems such as ghost targets or a reduced signal-to-noise ratio. Such an automotive interference scenario with direct interference from several surrounding vehicles is shown in FIG. 1.

Up to now, interference has not been considered a major problem because the percentage of vehicles equipped with radar sensors and therefore the probability of interference was low. In addition, the sensors were used mainly for comfort functions. In this case it may be sufficient to detect interference and turn off the function (i.e. the entire radar) for the duration of the interference. On the contrary, safety functions of future systems require very low failure rates.

Therefore, radar-to-radar interference is a major problem in radar sensor networks, especially when several radars are concurrently operating in the same frequency band and mutually interfering with each another. Thus, in spite of a predicted higher number of radar systems, the probability of interference-induced problems must be reduced.

As stated supra, a major challenge facing the application of automotive radar to autonomous driving is the highly likely situation where several unsynchronized radars, possibly from different vendors, operate in geographical proximity and utilize overlapping frequency bands. Note that the currently installed base of radars cannot be expected to synchronize with new automotive radar sensor entrants, nor with any global synchronization schemes.

A well-known way to reduce the number of antenna elements in an array is by using a MIMO technique known as 'virtual array', where separable (e.g., orthogonal) waveforms are transmitted from different antennas (usually simultaneously), and by means of digital processing a larger effective array is generated. The shape of this 'virtual array' is the special convolution of the transmission and reception antennas' positions.

It is also known that by means of bandpass sampling, the de-ramped signal can be sampled with lower A/D frequencies, while preserving the range information of the targets with the ranges matching the designed bandpass filter.

Achieving a high resolution simultaneously in the angular, range and doppler dimensions is a significant challenge due to (inter alia) a linear increment in hardware complexity resolution.

One problem that arises in radar systems is known as range cell migration (RCM) in which the calculated range bin of the radar return signal migrates over time (i.e. slow time) due to the velocity of the target. The width of the range bin depends on the RF bandwidth of the chirp. The wider the bandwidth, the sharper the peaks. If the width of the range bin is large enough then RCM may go unnoticed. For large enough chirp bandwidths, however, RCM may become a problem for sufficiently fast targets or ego velocity.

Another problem that arises is the ambiguity between Doppler velocity and range (described supra) where the peaks for two targets with different velocity and range can occur at the same position in certain conditions, i.e. the target range and velocity are calculated using information from the peak position and the phase difference between the peaks. This will lead to wrong or missed detections.

Yet another issue concerns range resolution where the higher chirp bandwidth, the better the range resolution. Higher chirp bandwidth, however, presents its own problems in that the complexity and cost for circuitry in the receiver at higher bandwidths is significantly higher. Thus, it is desirable to minimize the chirp bandwidth in order to minimize the implementation cost.

There is thus a need for improved range measurement in the field of imaging radar, sonar, ultrasound, etc., via FMCW signals using a modified Fourier-based processing method that overcomes the problems of prior art radar systems.

SUMMARY OF THE INVENTION

The present invention a system and method by which radar angle and range resolution are significantly improved without increasing complexity in critical hardware parts. Standard radar sampling methods use a mono-pulse methodology, i.e. all angular and range information must be fully contained inside each single pulse. FIG. 2 shows the frequency content for mono-pulse processing, which is the same for each chirp throughout the coherent processing interval (CPI).

In contrast, the present invention uses a novel multi-pulse methodology in which each pulse (i.e. chirp) contains only partial angular and range information, as long as all of the range and angular information is obtained though the CPI time. FIG. 3 shows the frequency content of multi-pulse processing, which is the different for each chirp throughout the CPI.

Partial range information means that each pulse contains only a portion of the total CPI bandwidth, thus a single pulse can have significantly reduced bandwidth relative to monoband processing. Using multiple different transmission frequency band across the CPI will hence forth be referred to as multiband (MB) and the chirps transmitted in the CPI are referred to as multiband chirps (MBC). In addition, the multiband chirps are transmitted using a nonlinear (e.g., randomized) start frequency hopping sequence within each CPI.

Partial angular information means that each pulse contains angular information that fills only a portion of the 'virtual array' (in a MIMO based radar system), while the full virtual array information is contained across the CPI. In one embodiment, this is done using only a single transmission antenna per pulse, thus significantly simplifying MIMO hardware realization. Using a different antenna transmission per pulse across the CPI will henceforth be referred to as antenna multiplexing (AM).

It is noted that prior art MIMO solutions such as full MIMO PMCW radar require more complex hardware, including higher frequency ADCs and correlation filters to separate between orthogonal transmission signals and complete the virtual array. Time AM FMCW MIMO is used with all chirps starting at the same one or two frequencies, in a way that the aggregate bandwidth is equal to the individual chirp bandwidth (i.e. which is not multiband).

The radar of the present invention utilizes multiband chirps (e.g., frequency hopping radar) to increase range resolution while maintaining a low sampling rate. As will be shown in more detail infra, by introducing nonlinearity (e.g., randomization) into the carrier frequencies of the multiband transmission, as well as into the antenna order of the AM, a radar image with the angular range resolution of the full virtual array and the range resolution of the full CPI bandwidth can be recovered. This image contains well characterized randomization noise that can roughly be modeled as phase noise and is dependent only on the target's power and the number of pulses in the CPI. By appropriately adjusting the radar transmission parameters, the pulse repetition interval (PRI) can be minimized. This enables increasing the number of pulses in the CPI and enables keeping the noise at an acceptable level that does not limit performance while enabling a superior tradeoff between performance and hardware complexity and cost.

The invention, being much simpler in terms of analog hardware, processing and memory, per virtual channel, allows a relatively large MIMO radar to be built with a plurality of TX and RX physical array elements. This directly translates to larger virtual arrays providing better spatial accuracy and discrimination, and lower spatial sidelobes level. The latter is key to minimizing possible masking of weak targets by stronger ones, while keeping false detections in check.

In one embodiment, the present invention is a radar sensor incorporating the ability to detect, mitigate and avoid mutual interference from other nearby automotive radars. The normally constant start frequency sequence for linear large bandwidth FMCW chirps is replaced by a sequence of lower bandwidth, short duration chirps with start frequencies spanning the wider bandwidth and ordered nonlinearly (e.g., randomly) in time (as opposed to an ever increasing sequence of start frequencies) to create a pseudo random chirp hopping sequence. The reflected wave signal received is then reassembled using the known nonlinear hop sequence.

Note that FMCW radar offers many advantages compared to the other types of radars. These include (1) the ability to measure small ranges with high accuracy; (2) the ability to simultaneously measure the target range and its relative velocity; (3) signal processing can be performed at relatively low frequency ranges, considerably simplifying the realization of the processing circuit; (4) functioning well in various types of weather and atmospheric conditions such as rain, snow, humidity, fog, and dusty conditions; (5) FMCW modulation is compatible with solid-state transmitters, and moreover represents the best use of output power available from these devices; and (6) having low weight and energy consumption due to the absence of high circuit voltages.

To mitigate interference, a dedicated receiver is provided with wideband listening capability. The signal received is used to estimate collisions with other radar signals. If interference is detected, a constraint is applied to the nonlinearization (e.g., randomization) of the chirps. The hopping sequence and possibly also the slope of individual chirps are altered so that chirps would not interfere with the interfering radar's chirps. Offending chirps are either re-randomized, dropped altogether or the starting frequency of another non-offending chirp is reused.

In addition, if interference is detected, windowed blanking is used to zero the portion of the received chirp corrupted with the interfering radar's chirp signal. In addition, the victim radar ceases its own transmission while interference is detected with the purpose of minimizing the interference inflicted by itself received at the interfering radar.

The present invention also provides an example technique for generating the nonlinear start frequency hopping sequence of chirps as well as a novel technique for slow time processing of the multiband chirps in the receiver resulting in significantly improved fine range resolution and reduced sidelobes. Reducing the RF bandwidth of the chirps results in broader range peaks which helps mask range cell migration (RCM). In addition, transmitting the chirps in a nonlinear sequence changes the detected phase for each chirp for the same target, even if stationary at the same range. These phase changes due to the different start frequency of each chirp provides additional resolution. In this manner, the phase evolution of the individual broad peaks of the chirps calculated in fast time is combined in slow time across the CPI to produce a single sharp peak with fine resolution. A modified Fourier transform is used to calculate the improved fine resolution.

In addition, a windowing technique is provided that further improves sidelobe performance without disturbing Doppler data processing. In this technique, rather than apply a window function to the receive data, a spectral probability window (SPW) is generated and applied in the transmitter to the transmitted chirps. This is effectively equivalent to applying the windowing function to the receive data.

There is thus provided in accordance with the invention, a method of processing receive data in a radar system adapted to transmit a multiband chirp signal utilizing a nonlinear start frequency hopping sequence, the method comprising receiving sampled input data processed in a fast time dimension to generate coarse range information, and performing slow time processing on said sampled input data utilizing a modified Fourier transform to generate both Doppler data and fine range data.

There is also provided in accordance with the invention, a method of receive processing in a radar system adapted to transmit a multiband chirp signal utilizing a nonlinear start frequency hopping sequence, the method comprising receiving radar digital input data samples, performing a Fourier transform on the input data samples in a fast time dimension to generate coarse range bin data therefrom, and for each coarse range bin, performing slow time processing on said coarse range bin data utilizing a modified Fourier transform to generate both Doppler data and fine range data.

There is further provided in accordance with the invention, an apparatus for processing receive data in a radar system adapted to transmit a multiband chirp signal utilizing a nonlinear start frequency hopping sequence, comprising a circuit operative to receive input data samples processed in a fast time dimension to generate coarse range information therefrom, and a processor operative to perform slow time processing on said input data samples utilizing a modified Fourier transform to generate both Doppler data and fine range data.

BRIEF DESCRIPTION OF THE DRAWINGS

The present invention is explained in further detail in the following exemplary embodiments and with reference to the figures, where identical or similar elements may be partly indicated by the same or similar reference numerals, and the features of various exemplary embodiments being combinable. The invention is herein described, by way of example only, with reference to the accompanying drawings, wherein.

DETAILED DESCRIPTION

Figure 1:
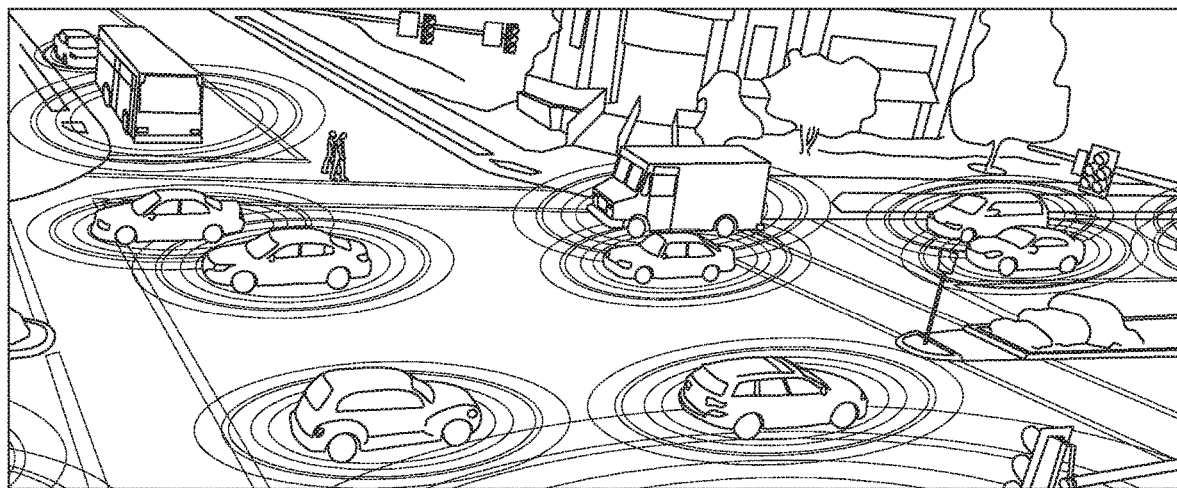
FIG. 1 is a diagram illustrating an example street scene incorporating several vehicles equipped with automotive radar sensor units.
Figure 2:
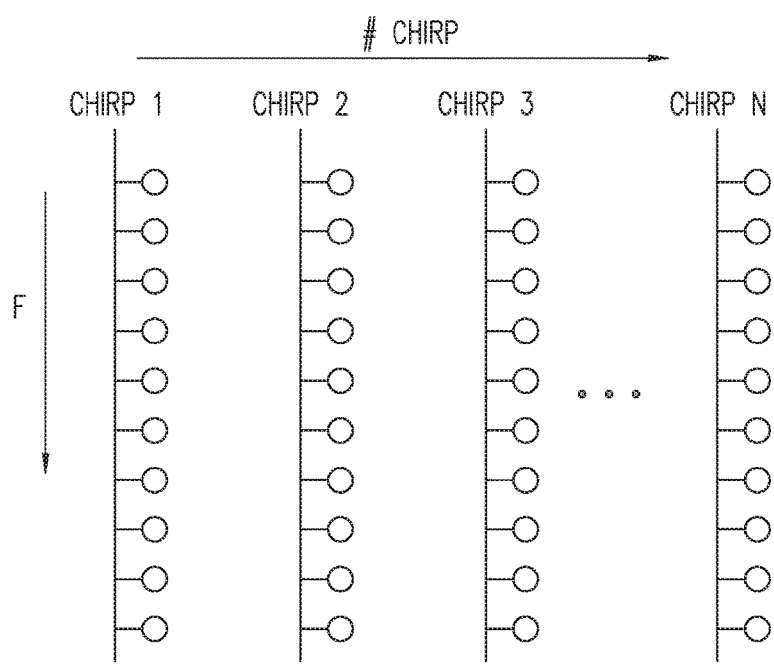
FIG. 2 is a diagram illustrating example frequency content of mono-band chirps transmission.
Figure 3:
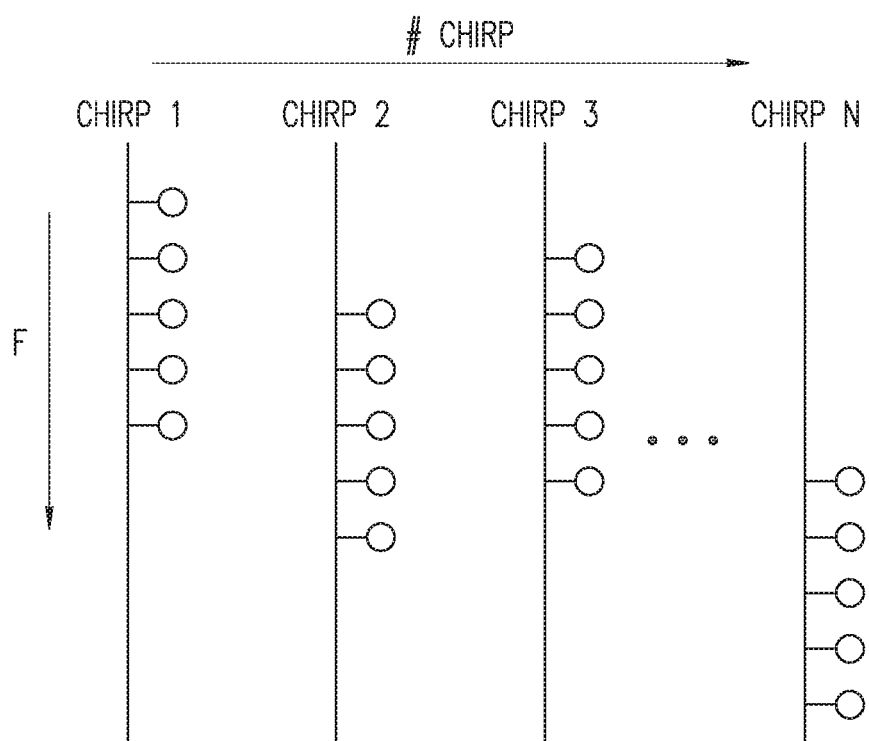
FIG. 3 is a diagram illustrating example possible frequency content of multi-band chirps transmission.

In the following detailed description, numerous specific details are set forth in order to provide a thorough understanding of the invention. It will be understood by those skilled in the art, however, that the present invention may be practiced without these specific details. In other instances, well-known methods, procedures, and components have not been described in detail so as not to obscure the present invention.

Among those benefits and improvements that have been disclosed, other objects and advantages of this invention will become apparent from the following description taken in conjunction with the accompanying figures. Detailed embodiments of the present invention are disclosed herein. It is to be understood, however, that the disclosed embodiments are merely illustrative of the invention that may be embodied in various forms. In addition, each of the examples given in connection with the various embodiments of the invention which are intended to be illustrative, and not restrictive.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

The figures constitute a part of this specification and include illustrative embodiments of the present invention and illustrate various objects and features thereof. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary, for the understanding and appreciation of the underlying concepts of the present invention and in order not to obfuscate or distract from the teachings of the present invention.

Any reference in the specification to a method should be applied mutatis mutandis to a system capable of executing the method. Any reference in the specification to a system should be applied mutatis mutandis to a method that may be executed by the system.

Throughout the specification and claims, the following terms take the meanings explicitly associated herein, unless the context clearly dictates otherwise. The phrases "in one embodiment," "in an example embodiment," and "in some embodiments" as used herein do not necessarily refer to the same embodiment(s), though it may. Furthermore, the phrases "in another embodiment," "in an alternative embodiment," and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Figure 4:
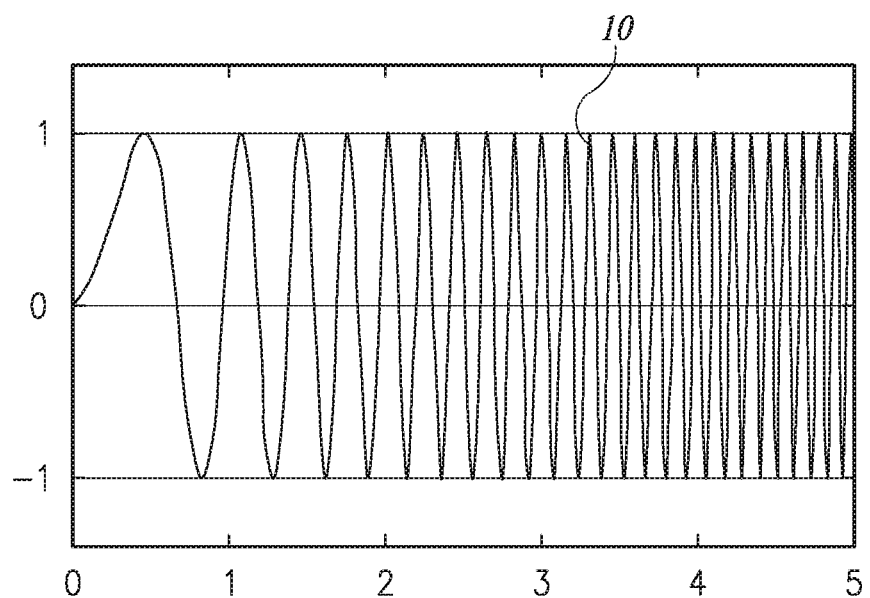
FIG. 4 is a diagram illustrating an example CW radar chirp waveform.
Figure 5:
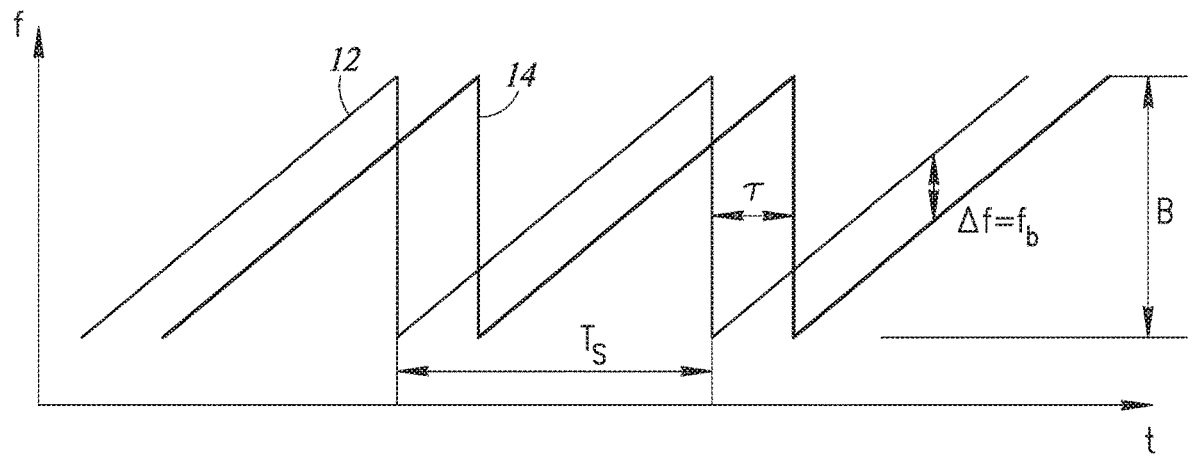
FIG. 5 is a diagram illustrating an example transmitted chirp and received reflected signal.

Frequency modulated continuous wave (FMCW) radars are radars in which frequency modulation is used. The theory of operation of FMCW radar is that a continuous wave with an increasing (or decreasing) frequency is transmitted. Such a wave is referred to as a chirp. An example of a chirp waveform 10 is shown in FIG. 4. A transmitted wave after being reflected by an object is received by a receiver. An example of a transmitted 12 and received (i.e. reflected) 14 chirp waveforms at the receiver is shown in FIG. 5.

Considering the use of radar for automotive applications, vehicle manufacturers can currently make use of four frequency bands at 24 GHz and 77 GHz with different bandwidths. While the 24 GHz ISM band has a maximum bandwidth of 250 MHz, the 76-81 GHz ultrawideband (UWB) offers up to 5 GHz. A band with up to 4 GHz bandwidth lies between the frequencies of 77 to 81 GHz. It is currently in use for numerous applications. Note that other allocated frequencies for this application include 122 GHz and 244 GHz with a bandwidth of only 1 GHz. Since the signal bandwidth determines the range resolution, having sufficient bandwidth is important in radar applications.

Conventional digital beam forming FMCW radars are characterized by very high resolution across radial, angular and Doppler dimensions. Imaging radars are based on the well-known technology of phased arrays, which use a Uniformly Linearly distributed Array (ULA). It is well known that the far field beam pattern of a linear array architecture is obtained using the Fourier transform. Range measurement is obtained by performing a Fourier transform on the de-ramped signal, generated by multiplying the conjugate of the transmitted signal with the received signal. The radar range resolution is determined by the RF bandwidth of the radar and is equal to the speed of light c divided by twice the RF bandwidth. Doppler processing is performed by performing a Fourier transform across the slow time dimension, and its resolution is limited by the Coherent Processing Interval (CPI). i.e. the total transmission time used for Doppler processing.

When using radar signals in automotive applications, it is desired to simultaneously determine the speed and distance of multiple objects within a single measurement cycle. Ordinary pulse radar cannot easily handle such a task since based on the timing offset between transmit and receive signals within a cycle, only the distance can be determined. If speed is also to be determined, a frequency modulated signal is used, e.g., a linear frequency modulated continuous wave (FMCW) signal. A pulse Doppler radar is also capable of measuring Doppler offsets directly. The frequency offset between transmit and receive signals is also known as the beat frequency. The beat frequency has a Doppler frequency component $f_D$ and a delay component $f_T$. The Doppler component contains information about the velocity, and the delay component contains information about the range. With two unknowns of range and velocity, two beat frequency measurements are needed to determine the desired parameters. Immediately after the first signal, a second signal with a linearly modified frequency is incorporated into the measurement.

Determination of both parameters within a single measurement cycle is possible with FM chirp sequences. Since a single chirp is very short compared with the total measurement cycle, each beat frequency is determined primarily by the delay component $f_T$. In this manner, the range can be ascertained directly after each chirp. Determining the phase shift between several successive chirps within a sequence permits the Doppler frequency to be determined using a Fourier transform, making it possible to calculate the speed of vehicles. Note that the speed resolution improves as the length of the measurement cycle is increased.

Multiple input multiple output (MIMO) radar is a type of radar which uses multiple TX and RX antennas to transmit and receive signals. Each transmitting antenna in the array independently radiates a waveform signal which is different than the signals radiated from the other antennae. Alternatively, the signals may be identical but transmitted at non overlapping times. The reflected signals belonging to each transmitter antenna can be easily separated in the receiver antennas since either (1) orthogonal waveforms are used in the transmission, or (2) because they are received at non overlapping times. A virtual array is created that contains information from each transmitting antenna to each receive antenna. Thus, if we have M number of transmit antennas and N number of receive antennas, we will have M·N independent transmit and receive antenna pairs in the virtual array by using only M+N number of physical antennas. This characteristic of MIMO radar systems results in several advantages such as increased spatial resolution, increased antenna aperture, and possibly higher sensitivity to detect slowly moving objects.

As stated supra, signals transmitted from different TX antennas are orthogonal. Orthogonality of the transmitted waveforms can be obtained by using time division multiplexing (TDM), frequency division multiplexing, or spatial coding. In the examples and description presented herein, TDM is used which allows only a single transmitter to transmit at each time.

The radar of the present invention is operative to reduce complexity, cost and power consumption by implementing a time multiplexed MIMO FMCW radar as opposed to full MIMO FMCW. A time multiplexed approach to automotive MIMO imaging radar has significant cost and power benefits associated with it compared to full MIMO radars. Full MIMO radars transmit several separable signals from multiple transmit array elements simultaneously. Those signals need to be separated at each receive channel, typically using a bank of matched filters. In this case, the complete virtual array is populated all at once.

With time multiplexed MIMO, only one transmit (TX) array element transmits at a time. The transmit side is greatly simplified, and there is no need for a bank of matched filters for each receive (RX) channel. The virtual array is progressively populated over the time it takes to transmit from all the TX elements in the array.

Note, however, that time multiplexed MIMO is associated with several problems including coupling between Doppler and the spatial directions (azimuth and elevation). In one embodiment, this is addressed by applying a nonlinear (e.g., random) order to the TX array element transmission. Starting with a nonlinearly ordered transmit sequence which cycles over all TX elements, then repeats for the CPI duration a 'REUSE' number of times. The TX sequence in each repetition is permuted nonlinearly (e.g., randomly). Each repetition uses a different permutation. Thus, it is ensured that each TX element transmits the same number of times during a CPI and that the pause between transmission, per each TX element, is never longer than two periods. This is important in order to keep Doppler sidelobes low. It is marginally beneficial though not necessary to change the permutations from one CPI to the next.

The decoupling effectiveness is largely determined by the number of chirps in the CPI. Hence, this is another incentive for using short duration chirps. Doppler ambiguities occur at lower target speeds. In one embodiment, this is solved by using a nonlinear (e.g., random) transmit (TX) sequence (as described supra) and by using relatively short chirps. A lower bound on chirp duration is the propagation delay to the farthest target plus reasonable overlap time. In one embodiment, a PRI of seven usec is used to cover targets located up to 300 meters away. Note that shorter chirps also increase the required sampling rate as explained in more detail infra.

In one embodiment, sensitivity is addressed by (1) increasing transmit power, (2) increasing both TX and RX gain, (3) obtaining a low noise figure, and (4) minimizing processing losses. Reducing the sampling rate has a direct and proportional impact on computational complexity and memory requirements. It is thus preferable to keep the IF sampling rate low to keep complexity, cost and power consumption at reasonable levels. The required sampling rate is determined by the maximum IF (i.e. not RF) bandwidth of each chirp post de-ramping. The maximum IF bandwidth is determined by the slope of the chirp (i.e. bandwidth over duration) times the propagation delay to the furthest target and back. Thus, it is preferable to keep the chirp slope low, either by low chirp bandwidth, or by long chirp duration, or a combination thereof. This, however, contradicts the requirements for good range resolution (which requires large RF bandwidth) and low Doppler ambiguity (which requires short chirps).

Figure 6:
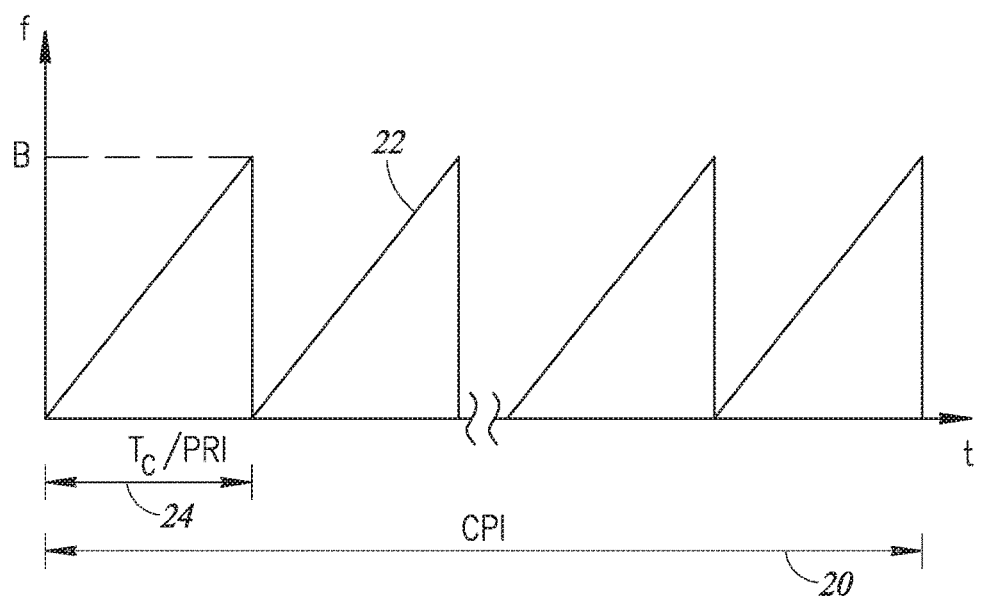
FIG. 6 is a diagram illustrating an example CPI with a plurality of chirps al having the same start frequency and full bandwidth.
Figure 7:
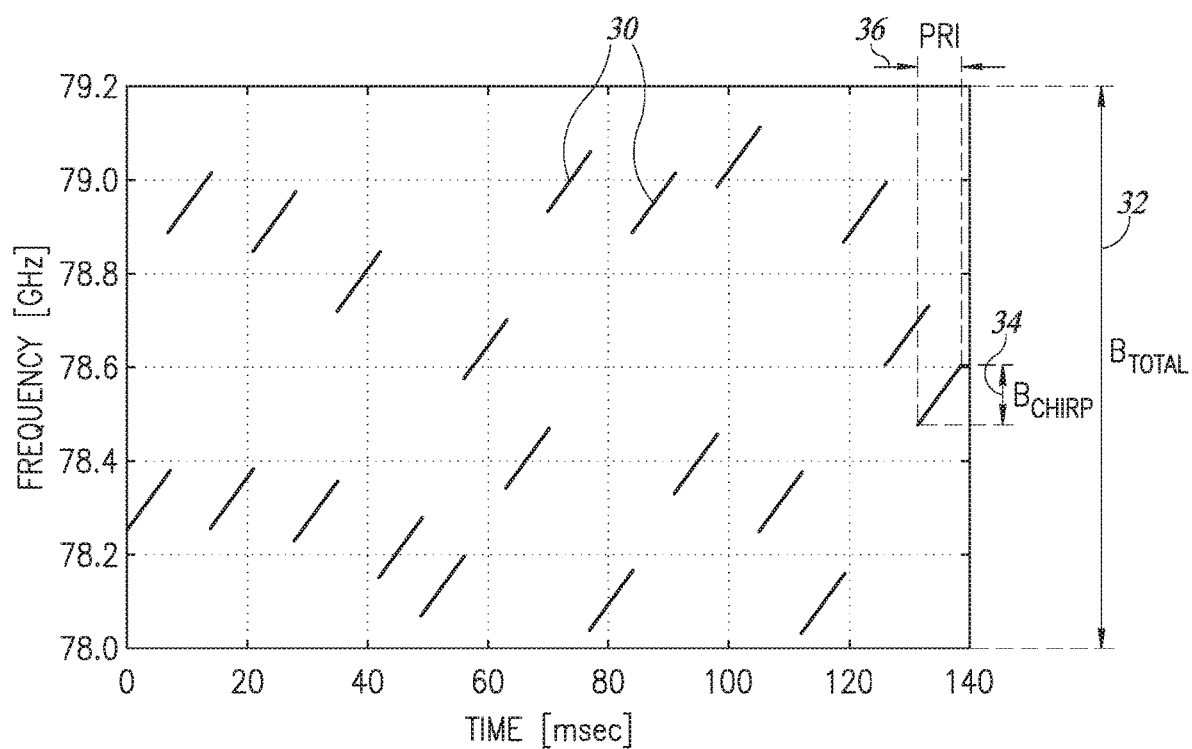
FIG. 7 is a diagram illustrating an example CPI with a plurality of fractional bandwidth chirps transmitted in a nonlinear sequence.

In one embodiment, this contradiction is resolved by using low bandwidth chirps with different start frequencies, such that the aggregate frequency band spanned by all the chirps is much larger. FIG. 6 illustrates a sequence of long, high bandwidth chirps with identical start frequency. A plurality of chirps 22, each of duration $T_C$ (PRI) and having a bandwidth (1 GHz in the example presented herein) are transmitted during the coherent processing interval (CPI) 20. FIG. 5 illustrates the echo signal 14 delayed from the transmitted signal 12. FIG. 7 illustrates an example sequence of short, low bandwidth chirps 30 with nonlinear (e.g., randomized) start frequencies. Each chirp 30 has a shorter duration $T_C$ (PRI) and a smaller bandwidth $B_{chirp}$ 34. In this example, the bandwidth of each chirp is reduced from 1 GHz to 125 MHz. Each chirp has a starting frequency $f_s$ and an ending frequency $f_e$. Although no chirps within a CPI overlap in time, they can overlap in frequency. Thus, considering the frequency range between 80-81 GHz, the start frequencies of two chirps may be 80.11 GHz and 80.12 GHz with each chirp having a bandwidth of 125 MHz.

Using receive processing algorithms described in detail infra, range resolution is determined by the aggregate bandwidth whereas sampling rate is determined by the much smaller chirp bandwidth. This technique is referred to herewith as multiband chirp (MBC).

An advantage of the MBC techniques of the present invention is that mutual interference is reduced when chirps are shorter and of lower bandwidth. Mutual interference techniques are described in more detail infra.

Range Cell Migration (RCM) is a well-known undesirable phenomenon that is preferably avoided. Designing a radar to avoid RCM, however, typically conflicts with the requirement for good (i.e. fine) range resolution when coping with fast relative radial speeds between radar and targets. In one embodiment, the use of MBC resolves this contradiction. The maximum relative radial speeds between radar and targets that do not result in RCM is determined by the range resolution corresponding to the chirp bandwidth rather than the aggregate bandwidth (i.e. the coarse range resolution). The final range resolution for the entire CPI is determined by the aggregate bandwidth (i.e. fine range resolution).

In one embodiment, the processing stages include: (1) fast time Fourier processing per chirp to generate coarse range information; (2) simultaneous Doppler and fine range estimation using modified Fourier processing including phase correction per coarse bin and fine range where phase correction is a function of each chirp start frequency and coarse range; and (3) digital beam forming (DBF). Note that the term zoom range is another term for fine range.

Regarding MBC, the total bandwidth is broken into separate yet partially overlapping bands where each chirp has a nonlinear (e.g., random) start frequency and relatively low bandwidth (e.g., 50, 75, 100, 125 MHz). All chirps, once aggregated, cover a much larger total bandwidth (e.g., 1 GHz).

Use of the MBC technique of the present invention is operative to break one or more couplings and resolve one or more ambiguities, e.g., Doppler, azimuth, and elevation. Regarding Doppler-coarse range, this coupling is typically low since in most automotive FMCW radars operation modes, frequency deviation due to range is much larger than frequency deviation due to Doppler. Therefore, decoupling can be done post detection. Doppler-fine range processing is described in more detail infra.

Regarding coupling between Doppler and the spatial directions (i.e. azimuth and elevation), SAR and other time multiplexed radars commonly have Doppler coupling with spatial directions (i.e. azimuth and elevation). In time multiplexed MIMO radars, coupling is broken by the use of multiple RX antennas being sampled simultaneously. This changes the ambiguity function from blade-like to bed-of-nails like, where exact configuration depends, inter alia, on RX array element spacing.

It is important to note that in one embodiment further decoupling is achieved by randomizing the TX sequence. Doppler ambiguities are pushed to higher, irrelevant speeds by keeping the PRI low enough so that a row (or column) of TX antennas is linearly scanned in less than the Doppler ambiguity period (25 usec for 40 m/s). In one embodiment, having six TX elements in a row, switched linearly, mandates a PRI of less than 6.25 usec.

Note however, that by fully randomizing the transmit sequence (i.e. both horizontally and vertically), Doppler ambiguities are still determined by a single chirp duration rather than a full scan duration. Single dimension randomizations (i.e. only horizontally or vertically) are also possible but are inferior to full randomization in terms of how far the Doppler ambiguities are pushed.

Consider an example of the randomization process. Starting with an ordered transmit sequence which cycles over all TX elements, then repeated for the CPI duration REUSE times. The TX sequence in each repetition is randomly permuted. Each repetition uses a different permutation. Thus, it is ensured that each TX element transmits the same number of times during a CPI, and that the pause between transmission, per each TX element, is never longer than two periods. Note that it is beneficial to change the permutations from one CPI to the next. Decoupling effectiveness is largely determined by the number of chirps in the CPI. Hence, an additional motivation to use short chirps.

Regarding fine range, decoupling fine range and Doppler is preferable because fine range and Doppler processing are both performed in slow time. If chirp start frequencies linearly increase with time, for example, then the slow time phase evolution cannot be distinguished from that of some Doppler velocities. Thus, it is preferable for fine range processing to provide the target position at the end of the CPI (i.e. more information available).

Note that decoupling is achieved by using a nonlinear start frequency hopping sequence where decoupling effectiveness is largely determined by the number of chirps in the CPI. Hence, this is another motivation to use short chirps. In addition, in one embodiment, fine range sidelobe performance is further improved by shaping the distribution of chirp start frequencies in the transmitter. This provides the benefits of (1) no window loss on the receiver side; and (2) no interaction with Doppler window processing since the gain does not change.

Figure 8:
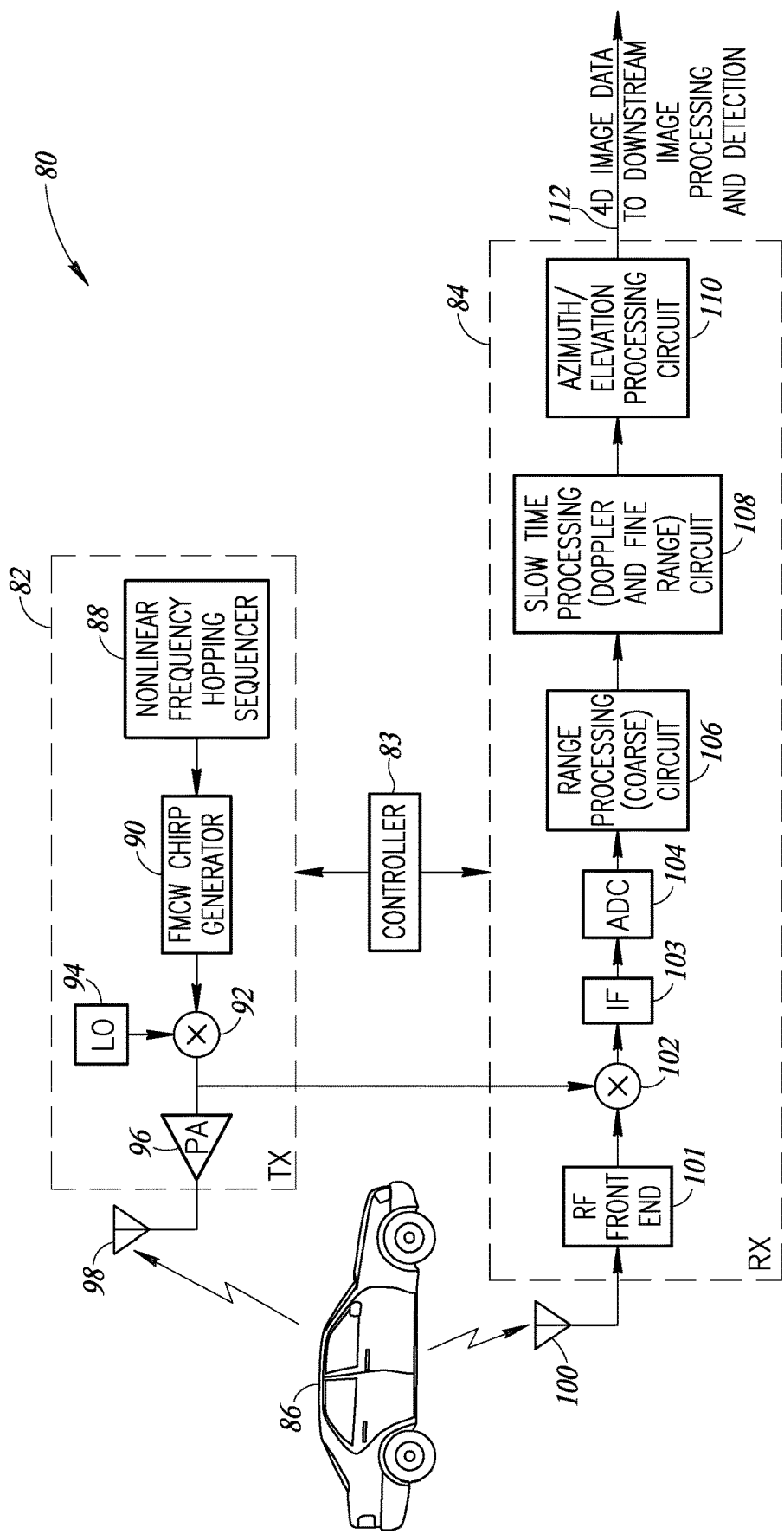
FIG. 8 is a diagram illustrating an example radar transceiver constructed in accordance with the present invention.

A diagram illustrating an example radar transceiver constructed in accordance with the present invention is shown in FIG. 8. The radar transceiver, generally referenced 80, comprises transmitter 82, receiver 84, and controller 83. The transmitter 82 comprises nonlinear frequency hopping sequencer 88, FMCW chirp generator 90, local oscillator (LO) 94, mixer 92, power amplifier (PA) 96, and antenna 98.

The receiver 84 comprises antenna 100, RF front end 101, mixer 102, IF block 103, ADC 104, fast time range processing 106, slow time processing (Doppler and fine range) 108, and azimuth and elevation processing.

In operation, the nonlinear frequency hopping sequencer 88 generates the nonlinear start frequency hop sequence. The start frequency for each chirp is input to the FMCW chirp generator 90 which functions to generate the chirp waveform at the particular start frequency. The chirps are upconverted via mixer 92 to the appropriate band in accordance with LO 94 (e.g., 80 GHz band). The upconverted RF signal is amplified via PA 96 and output to antenna 98 which may comprise an antenna array in the case of a MIMO radar.

On the receive side, the echo signal arriving at antenna 100 is input to RF front end block 101. In a MIMO radar, the receive antenna 100 comprises an antenna array. The signal from the RF front end circuit is mixed with the transmitted signal via mixer 102 to generate the beat frequency which is input to IF filter block 103. The output of the IF block is converted to digital via ADC 104 and input to the fast time processing block 106 to generate coarse range data. The slow time processing block 108 functions to generate both fine range and Doppler velocity data. Azimuth and elevation data are then calculated via azimuth/elevation processing block 110. The 4D image data 112 is input to downstream image processing and detection.

Figure 9:
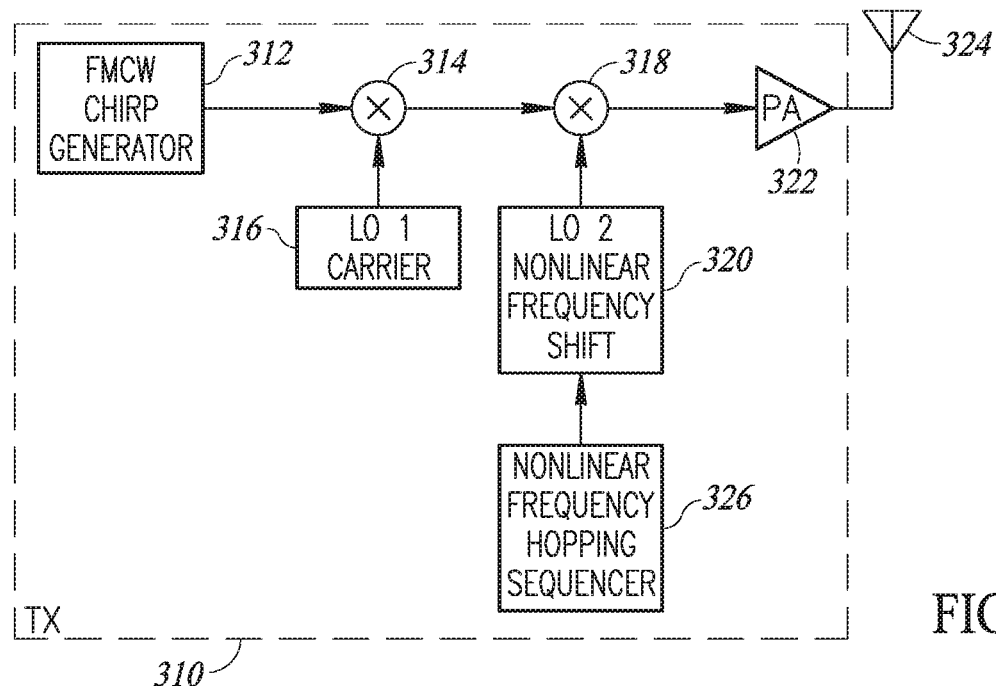
FIG. 9 is a diagram illustrating an example alternative transmitter constructed in accordance with the present invention.

An alternative transmitter block diagram is shown in FIG. 9. The transmitter, generally referenced 310, comprises FMCW chirp generator block 312 which functions to generate the chirp waveform via multiplication with a first LO 316 comprising the carrier signal (e.g., 80 GHz). A nonlinear frequency hopping sequence 326 is operative to generate the nonlinear start frequency hopping sequence. The start frequency is input to a second LO 320 which functions to generate the actual nonlinear frequency shift that is applied to the carrier waveform. The LO 2 signal is mixed via mixer 318 with the output of the first mixer 314 resulting in a chirp at RF with an appropriate start frequency. This signal is amplified and input to the transmit antenna 324.

Figure 10:
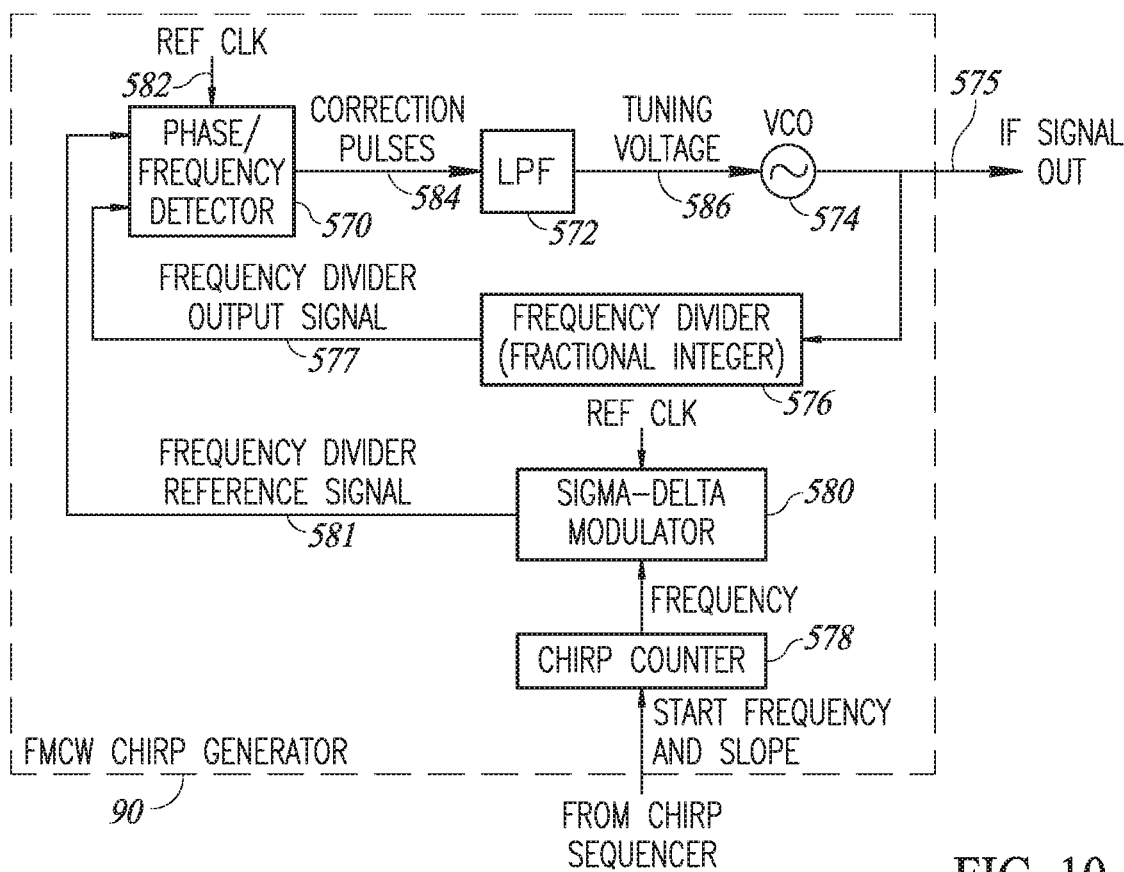
FIG. 10 is a diagram illustrating the FMCW chirp generator in more detail.

A diagram illustrating the FMCW chirp generator of FIG. 8 in more detail is shown in FIG. 10. The phase locked loop (PLL) based chirp generator, generally referenced 90, the circuit comprises phase/frequency detector (PFD) 570, loop filter 572, voltage controlled oscillator (VCO) 574, frequency divider 576, chirp counter 578, and sigma-delta modulator (SDM) 580.

In operation, the chirp counter receives the start frequency and slope 579 of the required chirp from the chirp sequencer. The output 573 is a digital sequence of frequency values (increasing with time) updated at each clock cycle. The SDM functions to translate the digital value of the chirp counter into an analog reference signal 581 that is input to the PFD 570. The frequency divider (fractional integer) 576 functions to divide the IF output signal 575 to generate a frequency divided signal 577 that is input to the PFD. The PFD produces pulses with voltages representing the frequency difference between its two inputs. The correction pulses from the PFD are filtered via low pass filter (LPF) 572 to generate a tuning voltage 586. The LPF (i.e. loop filter) smooths the tuning voltage response such that the VCO synthesizes smooth linear frequency modulation (LFM). The VCO is operative to receive the tuning voltage which controls the frequency of the output signal 575. Note that the chirp generator circuit shares a common clock reference signal for synchronized operation.

Figure 11:
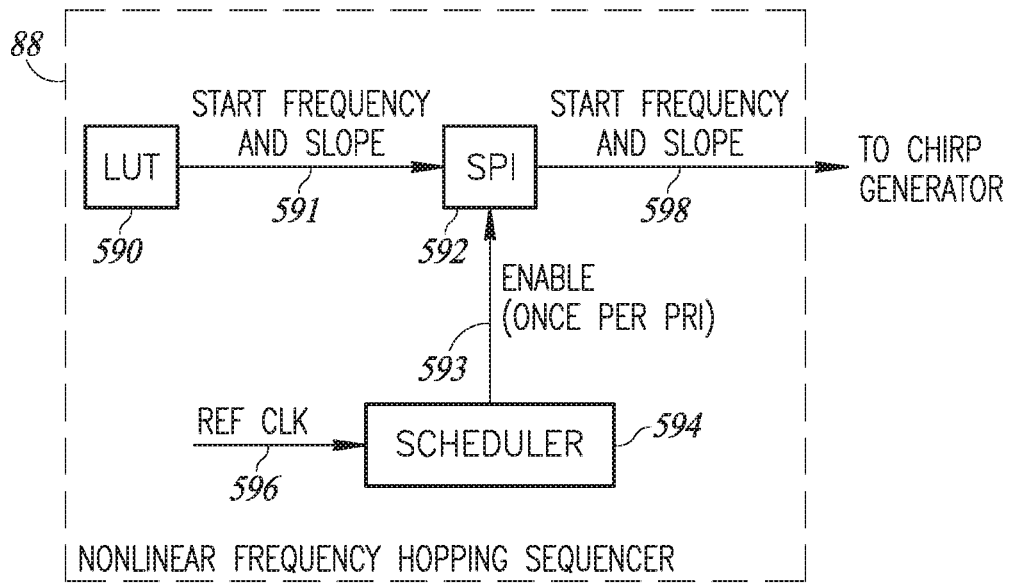
FIG. 11 is a diagram illustrating the nonlinear frequency hopping sequencer in more detail.

A diagram illustrating the nonlinear frequency hopping sequencer of FIG. 8 in more detail is shown in FIG. 11. The nonlinear frequency hopping sequencer, generally referenced 88, comprises a look up table (LUT) (e.g., RAM, ROM, NVRAM, etc.) 590, serial peripheral interface (SPI) 592, and scheduler 594 which may comprise hardware, software, or a combination thereof.

In operation, the LUT 590 contains a list of all the predefined starting frequencies. The SPI 592 is a well-known asynchronous serial communication interface protocol used primarily in embedded systems. The SPI reads a digital word 591 containing the values of the start frequency and slope for each chirp. It is activated once per chirp (PRI) via an enable signal 593 and updates the output 598 with the values of chirp start frequency and chirp slope that is fed to the chirp generator. The scheduler functions as a control unit for providing timing control for the SPI. The scheduler is synchronized with the chirp generator via a common clock reference signal.

Figure 12:
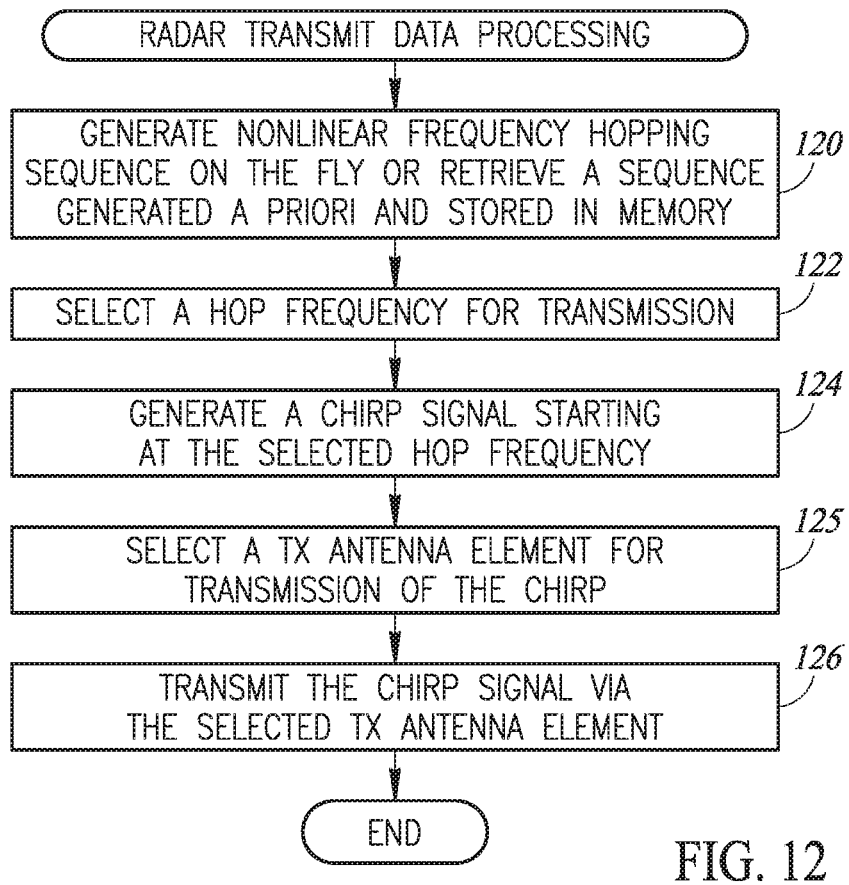
FIG. 12 is a flow diagram illustrating an example radar transmitter data processing method of the present invention.

A flow diagram illustrating an example radar transmitter data processing method of the present invention is shown in FIG. 12. First, a nonlinear hopping sequence for the chirp start frequencies are generated either on the fly or retrieved from memory storage (step 120). In the latter case, the nonlinear hopping sequence are generated a priori and stored in ROM, RAM, or any other suitable storage system. In an example embodiment, the hop sequence is randomized. The hops may be equally or non-equally (i.e. evenly or non-evenly, or uniformly or nonuniformly) distributed over all or one or more portions of the aggregate bandwidth of the CPI. In one embodiment, the aggregate bandwidth may be divided into one or more blocks of frequency that the hop sequence is restricted to. The sequence of chirps covers all or part of the total bandwidth such that the lowest frequency (i.e. the lowest start frequency) and the highest combined frequency (i.e. the highest start frequency plus the chirp bandwidth) define the total aggregate bandwidth. In other words, the actual frequency coverage, out of the total bandwidth, can be partial as long as the 'edge' frequencies are used (i.e. the bottom and top of the total bandwidth). For example, if the transmitted chirps are contained within a single portion of the total bandwidth, then the total bandwidth used for the chirps becomes the portion itself (which is smaller than the aggregate bandwidth). Note that in this case, the range resolution decreases and the fine range bin width increases. Note also that the use of a portion of the bandwidth may be necessary due to any number of reasons such as interference, jamming, etc. Reducing the coverage of the frequency range for the hop sequence, however, will degrade the slow time side lobe performance.

Note that in one embodiment, a window function is applied to the hop sequence to reduce the sidelobes of the fine range data, as described in more detail infra.

A hop frequency for the start of the chirp to be transmitted is then chosen (step 122). The transmitter then generates the chirp waveform at the selected hop frequency (step 124). In the optional case of a MIMO radar system, a TX antenna element is randomly selected for transmission of the chirp (step 125). Note that the use of TX element nonlinear sequencing is optional as the MBC technique of the present invention can be used in a radar with or without TX element sequencing. The chirp at the selected start frequency is then transmitted via the selected TX antenna element (step 126).

Figure 13:
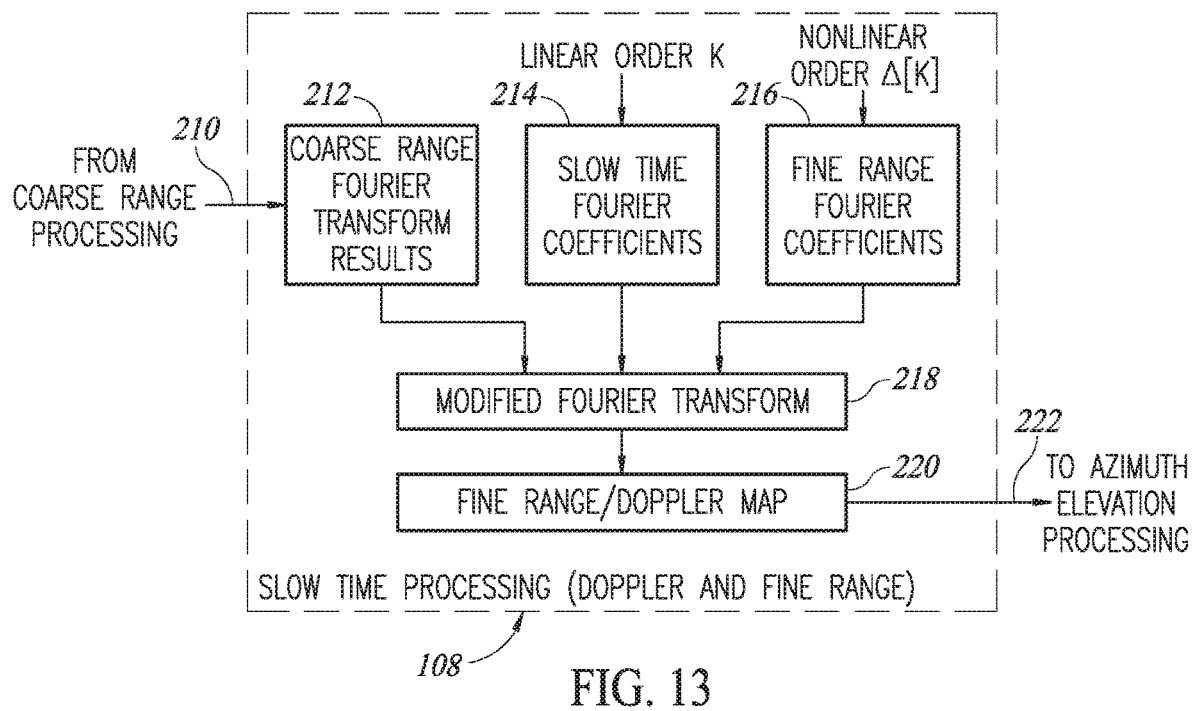
FIG. 13 is a diagram illustrating example slow time processing to obtain Doppler and fine range data.

In the receiver, a more detailed block diagram of the slow time processing to obtain Doppler and fine range data is shown in FIG. 13. In accordance with the present invention and described in more detail infra, the slow time processing 108 is operative to generate fine range data with significantly higher resolution than the fast time coarse range processing. This is achieved by use of a modified Fourier transform 218. In operation, the modified Fourier transform processing involves three terms: (1) the coarse range data 212 received from fast time coarse range processing block 106 (FIG. 8); (2) slow time Fourier coefficients 214 in linear (i.e. chronological) order; and (3) fine range Fourier coefficients 216 in nonlinear order (i.e. according to the nonlinear frequency hopping sequence). The result of the modified Fourier transform is a fine range-Doppler map 220 which is subsequently input to downstream azimuth/elevation processing.

A 4D FMCW imaging radar essentially performs a 4D Fourier transform of the input data. It is a desired goal for multiband (or multipulse) processing to subsample the full information across three dimensions: (1) range (i.e. transmission frequency); (2) elevation angle; and (3) azimuth angle. In one embodiment, the slow time (i.e. Doppler) dimension is not subsampled since the multipulse system gathers information through the CPI and skipping pulses will affect this.

General subsampling can be modeled per subsampled dimension by two operations: (1) randomly sampling a single point across the full dimension span, according to a certain distribution function; and (2) convolution of the sampling point with a sampling kernel (such as the single pulse bandwidth in multiband). When examined at the CPI level (after Doppler processing), it will be shown that the resultant signal is the target signal convolved with the Fourier transform of the random sampling distribution function plus noise closely resembling phase noise. Note that it is equivalent to fully random phase noise outside a one bin resolution cube from the target randomly sampled dimensions. The convolution with the sampling kernel colors both the signal and the 'phase noise' being the result of a convolution.

For the purpose of sidelobe estimation it is useful to estimate the effective range window using the following formula:

$$R_{window} = \left(\mathcal{F}(\text{start frequency distribuiton window}) + \frac{1}{sqrt(\#pulses)}\right). \quad (5)$$

$\mathcal{F}$ (range sampling kernel)

Figure 14:
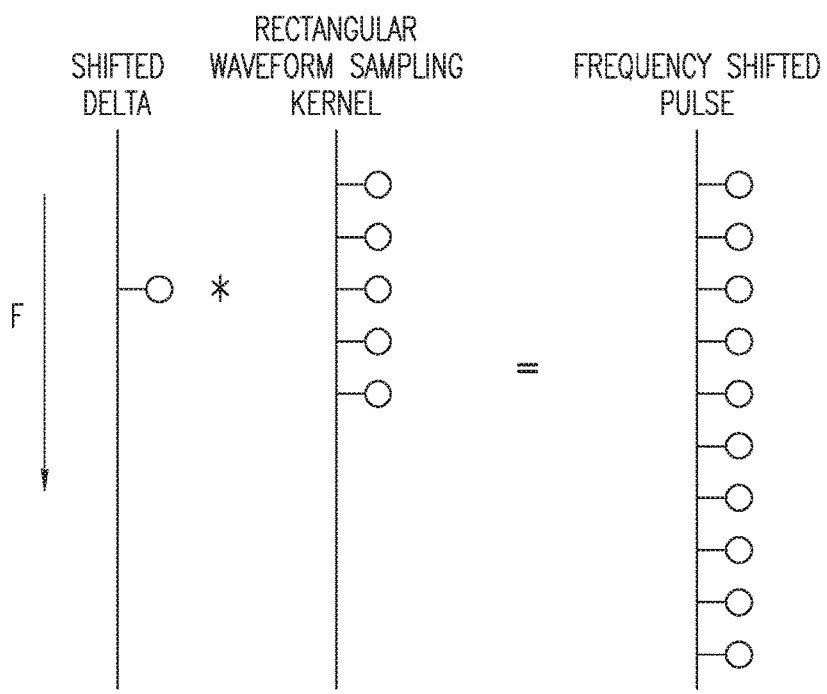
FIG. 14 is a diagram illustrating how each frequency shifted pulse can be described as the convolution of a single sampling kernel waveform with a frequency shifted delta function.

Note that the sampling kernel may comprise a rectangular window (shown in FIG. 14), a window such as a Hann window, Hamming window, or even a delta function (in which case it will have no effect). The entity $$\frac{1}{sqrt(\#pulses)}$$

denotes the phase noise which is white and has a constant mean value for all frequencies. From Equation 5 for $R_{window}$ above it can be seen that it would be beneficial to have a specially designed distribution of frequencies, which together with the sampling kernel yields the desired window characteristics.

Figure 15:
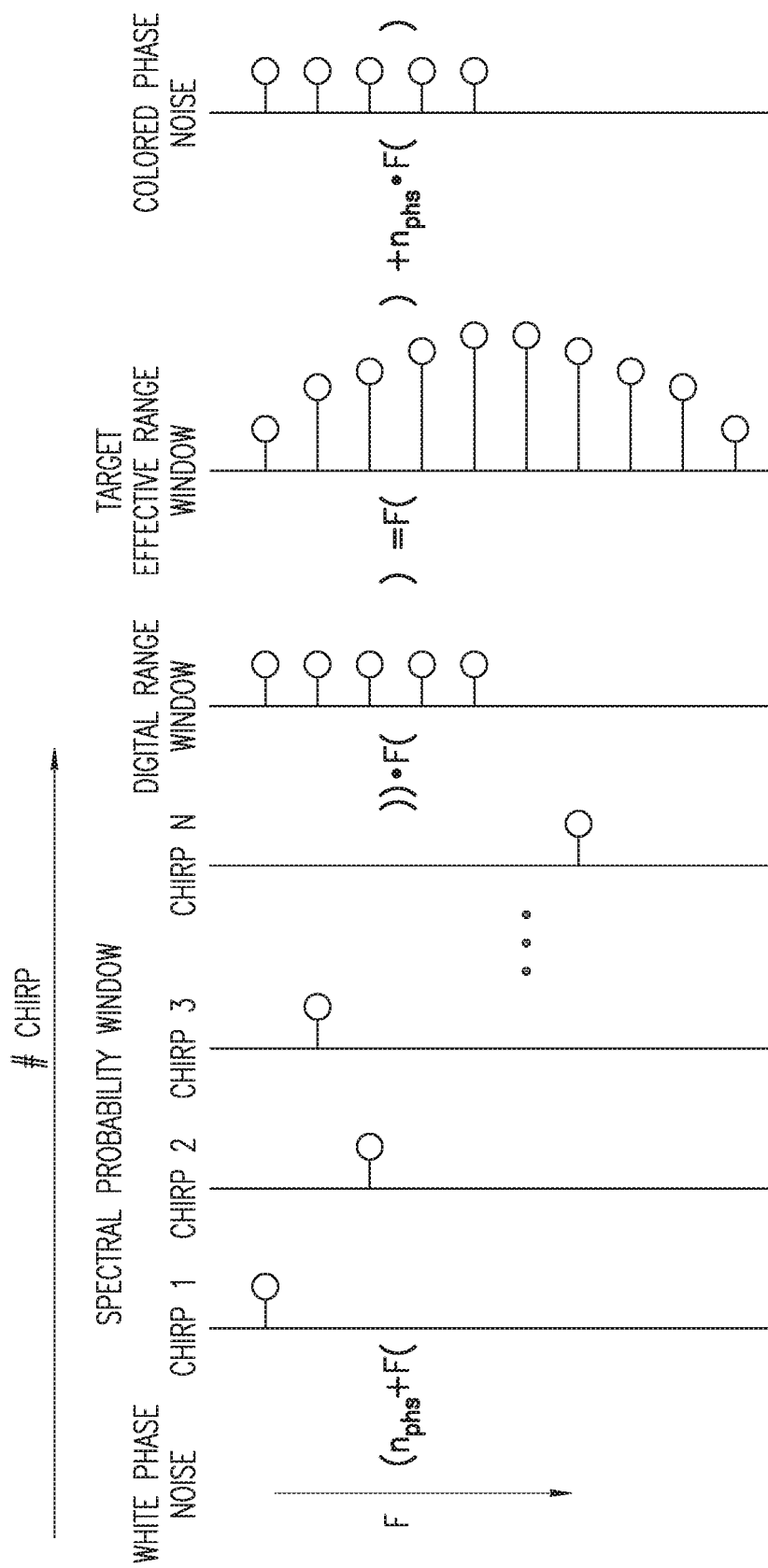
FIG. 15 is a diagram illustrating a visualization for the construction of the effective range window of multiband transmission, including the effect of phase noise frequency distribution and the digital range window applied per pulse.
Figure 16:
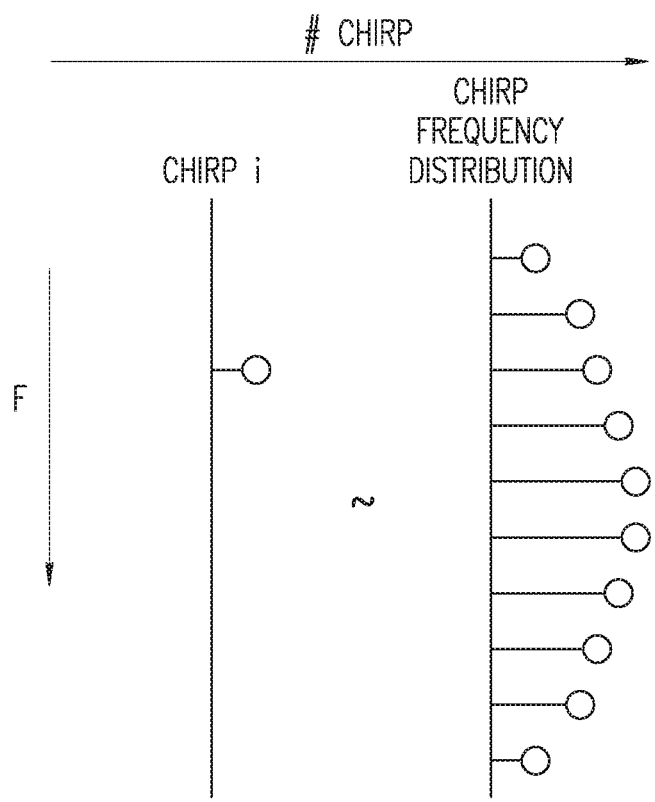
FIG. 16 is a diagram illustrating an example visualization of a chirp frequency distribution window.
Figure 17:
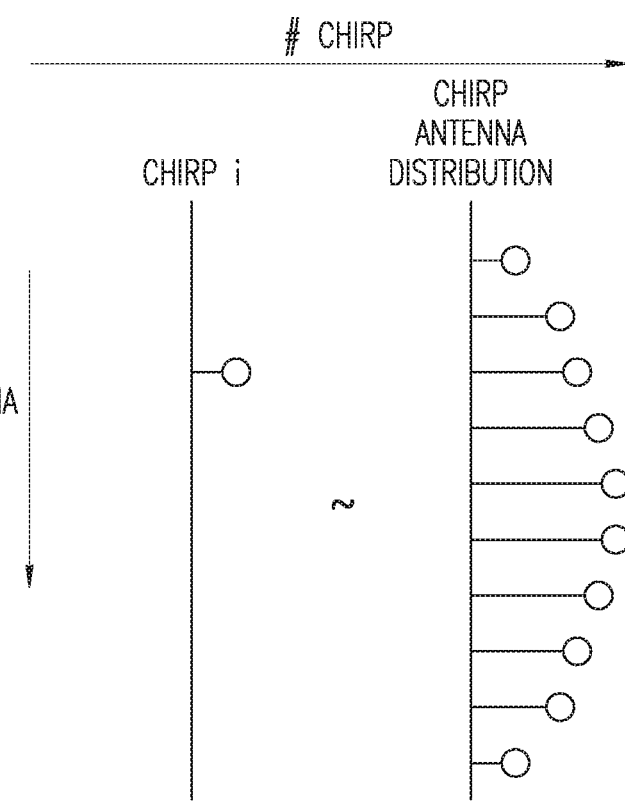
FIG. 17 is a diagram illustrating an example visualization of a chirp antenna distribution window.

FIG. 15 illustrates modifying the effective range window using the Fourier transform of the chirp frequency distribution plus phase noise, multiplied by the Fourier transform of the per chirp sampling kernel, which in this example comprises a rectangular window. FIG. 16 illustrates an example chirp frequency distribution window. FIG. 17 illustrates an example chirp antenna distribution window. By controlling the distribution of the antenna transmissions, the effective angular window can be determined, similarly to the case of range, for example in elevation assuming a cross shaped antenna array where the receive elements are horizontal and the transmit elements are vertical. Note that in this case, the elevation sampling kernel is relatively simple and comprises a delta function, as follows $$EL_{window} = \left(\mathcal{F}(Tx \text{ antenna distribuiton window}) + \frac{1}{sqrt(\#pulses)}\right). \quad (6)$$

$\mathcal{F}$ (elevation sampling kernel) cross array $\mathcal{F}(Tx \text{ antenna distribuiton window}) + \frac{1}{sqrt(\#pulses)}$ It is important to note that the effective window contains the term $$\frac{1}{sqrt(\#pulses)}$$

because it is the standard deviation of the white phase noise which has a mean value of zero for all frequencies and permits us to show how the noise is colored. Note that this is not to be confused with a deterministic part of the window. As can be seen from Equation 6 for $R_{window}$ above, the effective slope of the window is determined by the sampling kernel (i.e. the per chirp digital range window). Due to the nature of the radar equation where received target power is proportional to the range to the power of minus four, a range window with a slope of at least 12 dB/octave is preferable, so that targets at close ranges will not mask targets at ranges further away.

Figure 18:
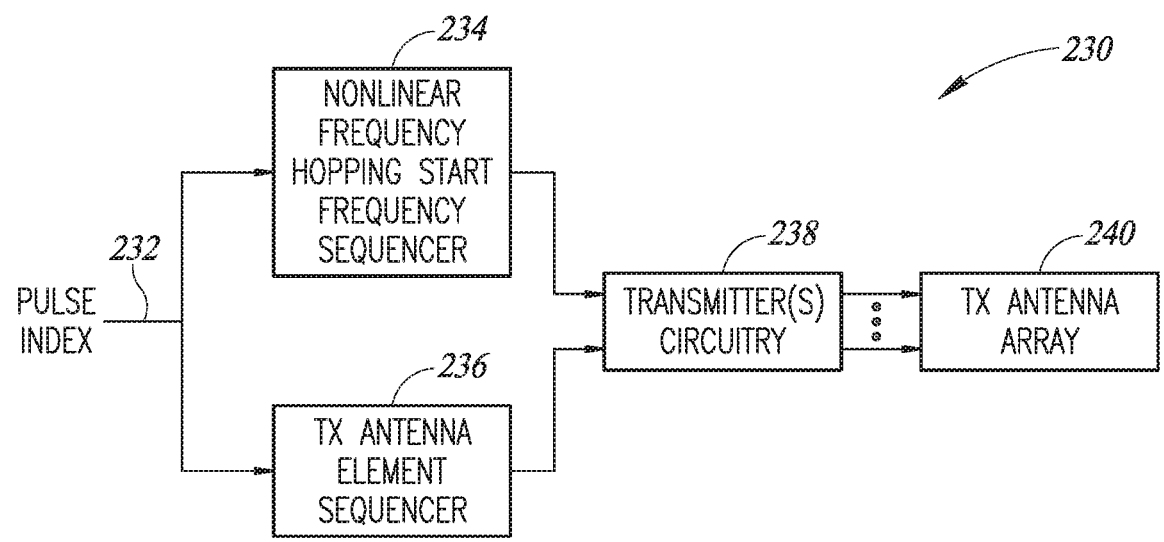
FIG. 18 is a high-level block diagram illustrating example transmission antenna and frequency hop selection.

The range resolution of $R_{window}$ on the other hand, is determined mostly by the frequency distribution window $\mathcal{F}$ (start frequency Distribution window), which drops very quickly and is proportional to the total (aggregate) bandwidth in the CPI. Example frequency distribution windows include the well-known Hann and Hamming windows. When using a frequency distribution window, the initial frequency of each chirp is chosen from a window shaped distribution. Alternatively, the start frequencies can be chosen such that their histogram is shaped in an exact window shape (without randomness). The order of frequency transmission can then be chosen as a nonlinear pseudo random permutation. One possible realization for the nonlinearity (e.g., randomization) is to use predetermined antennas and transmission frequencies, preconfigured in memory tables, as shown in FIG. 18. The transmit scheme, generally referenced 230, comprises nonlinear frequency hopping start frequency sequencer 234 and TX antenna element sequencer 236 which receive the pulse (chirp) index 232. The start frequency and TX element data are input to the transmitter(s) circuitry 238 and the resulting one or more transmit signals are output to the appropriate elements in the TX antenna array 240.

Note that it is preferable to reduce scalloping loss of the range Fourier transform as much as possible. This can be achieved either by using a digital window function, which has the disadvantage of increasing the equivalent noise bandwidth and decreasing the coherent gain but is efficient in terms of memory usage. An alternative way of reducing scalloping loss is by using zero-padding, which does not increase the equivalent noise bandwidth nor does it decrease coherent gain but does increase the memory requirement. By using multiband processing, however, which reduces the bandwidth of each pulse, zero padding is used without increasing memory requirements, since the increase is compensated for by the use of a smaller chirp bandwidth.

A model for 3D random sparse sampling will now be provided. Note this model can be extended to 4D without difficulty. A simplified 3D version of the problem is presented, assuming the dimensions of the radar image are range, doppler and elevation, and sub sampling is done only on the range and elevation dimensions.

Note we are interested in a particular type of 3D sparse sampling, with 3D signal $s \in \mathcal{C}^{N_R \times N_D \times N_E}$. The term $C_p$ is the sparse sampling index group, with a group of two indexes. The term s is randomly down sampled by a factor $N_R$ across the row dimension, by a factor of one (i.e. no down sampling) across the columns dimension, and by a factor $N_E$ across the third dimension. Note that the random down sampling is not performed necessarily with equal distribution, but according to a general distribution, which can take the form of a window function $f_{distribution\ window}$ such as a Hann or Hamming window. The sparse sampling indexes are in accordance with $C_p$, using the operator $RD_{N_R,1}$ $$s_p = RD_{N_R, 1N_E}(s) = \begin{cases} s(i,j,k), (i,j,k) \in C_p \\ 0, (i,j,k) \notin C_p \end{cases} \quad (7)$$

Let us assume s has a constant amplitude and a linear phase $s(p, q, r) = e^{j(w_m p + w_n q + w_o r)}$ which exactly matches the frequency of the (m, n, o) 3D DFT coefficient. For simplicity sake we assume $f_{distribution\ window} = 1/(N_R N_E)$ (i.e. they are uniformly distributed). We can therefore express the value of different DFT coefficients as follows:

$$W_{N_R} = \exp\left(-2\pi \cdot \frac{1i}{N_R}\right), W_{N_D} = \exp\left(-2\pi \cdot \frac{1i}{N_D}\right), W_{N_E} = \exp\left(-2\pi \cdot \frac{1i}{N_E}\right) \quad (8)$$

$$S_p^F(m,n,o) = \sum_{i=1}^{N_r}\sum_{j=1}^{N_D}\sum_{k=1}^{N_E} S_p(i,j,k) W_{N_R}^{im} W_{N_D}^{jn} W_{N_E}^{ko} = \quad (9)$$

$$\sum_{i=1}^{N_R}\sum_{j=1}^{N_D}\sum_{k=1}^{N_E} \left(1_{(i,j,k)\in C_p} e^{\frac{1i\cdot 2\pi(ip+jq+kr)}{N}}\right) W_{N_R}^{im} W_{N_D}^{jn} W_{N_E}^{ko} =$$

$$\sum_{i=1}^{N_R}\sum_{j=1}^{N_D}\sum_{k=1}^{N_E} \left(1_{(i,j,k)\in C_p} W_{N_R}^{-ip} W_{N_D}^{-jq} W_{N_D}^{-kr}\right) W_{N_R}^{im} W_{N_D}^{jn} W_{N_E}^{ko} =$$

$$\begin{cases} N_D, (p,q,r) = (m,n,o) \\ \sim N(0, N_D), (p,q,r) \neq (m,n,o) \end{cases}$$

For this case the signal precisely matches the DFT frequencies thus the transform of the rectangular window function is sampled at the nulls and at other frequencies outside the target frequency to obtain noise, proportional to number of pulses.

In general, the 3D random sparse sampling can be approximated as follows where $\mathcal{F}_3$ is a three dimensional fourier transform:

$$\mathcal{F}_3(RD_{N_R,1N_E}(s)) = \frac{\mathcal{F}_3(s)\mathcal{F}_3(f_{distribution\ window})}{N_R N_E} + \tilde{n}(0, \sigma_n) \quad (10)$$

$$\tilde{n}(0, \sigma_n) \sim \begin{cases} 0, \text{ exact frequencies} \\ N(0, \sigma_n), \text{ frequencies outside one resolution} \\ \text{cube from the exact target frequencies} \end{cases} \quad (11)$$

$$\sigma_n^2 = \frac{1}{N_R N_E}\sum_{i=1}^{N}\sum_{j=1}^{N}\sum_{k=1}^{N} s(i,j,k)^2 \quad (12)$$

Figure 19:
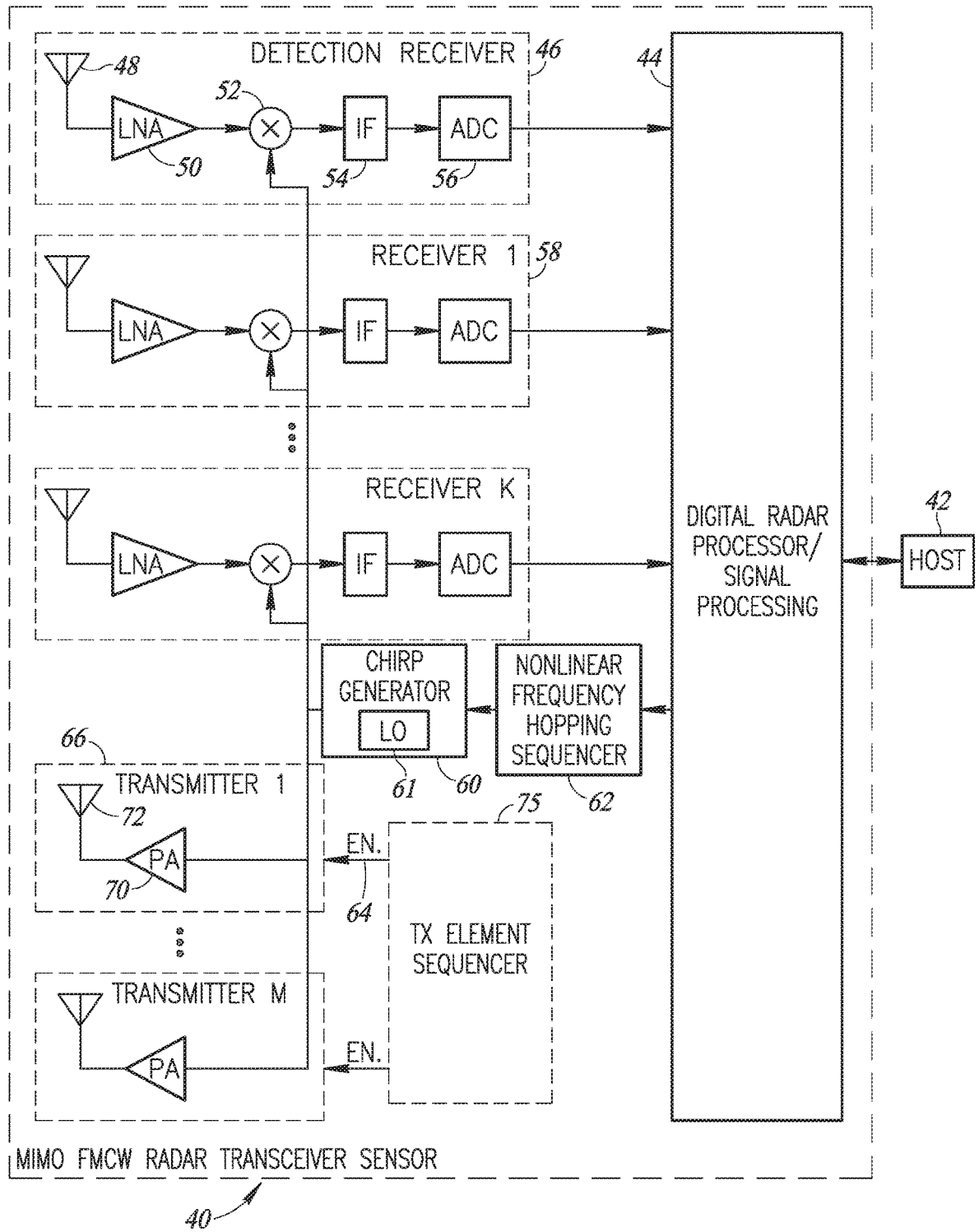
FIG. 19 is a high-level block diagram illustrating an example MIMO FMCW radar in accordance with the present invention.

A high-level block diagram illustrating an example MIMO FMCW radar in accordance with the present invention is shown in FIG. 19. The radar transceiver sensor, generally referenced 40, comprises a plurality of transmit circuits 66, a plurality of receive circuits 46, 58, local oscillator (LO) 74, ramp or chirp generator 60 including local oscillator (LO) 61, nonlinear frequency hopping sequencer 62, optional TX element sequencer 75 (dashed), and signal processing block 44. In operation, the radar transceiver sensor typically communicates with and may be controlled by a host 42. Each transmit block comprises power amplifier 70 and antenna 72. The transmitters receive the transmit signal output of the chirp generator 60 which is fed to the PA in each transmit block. The optional TX element sequencer (dashed) generates a plurality of enable signals 64 that control the transmit element sequence. It is appreciated that the MBC techniques of the present invention can operate in a radar with or without TX element sequencing and with or without MIMO operation.

Each receive block comprises an antenna 48, low noise amplifier (LNA) 50, mixer 52, intermediate frequency (IF) block 54, and analog to digital converter (ADC) 56. In one embodiment, the radar sensor 40 comprises a separate detection wideband receiver 46 dedicated to listening. The sensor uses this receiver to detect the presence of in-band interfering signals transmitted by nearby radar sensors. The processing block uses knowledge of the detected interfering signals to formulate a response (if any) to mitigate and avoid any mutual interference.

Signal processing block 44 may comprise any suitable electronic device capable of processing, receiving, or transmitting data or instructions. For example, the processing units may include one or more of: a microprocessor, a central processing unit (CPU), an application-specific integrated circuit (ASIC), field programmable gate array (FPGA), a digital signal processor (DSP), graphical processing unit (GPU), or combinations of such devices. As described herein, the term "processor" is meant to encompass a single processor or processing unit, multiple processors, multiple processing units, or other suitably configured computing element or elements.

For example, the processor may comprise one or more general purpose CPU cores and optionally one or more special purpose cores (e.g., DSP core, floating point, gate array, etc.). The one or more general purpose cores execute general purpose opcodes while the special purpose cores execute functions specific to their purpose.

Attached or embedded memory comprises dynamic random access memory (DRAM) or extended data out (EDO) memory, or other types of memory such as ROM, static RAM, flash, and non-volatile static random access memory (NVSRAM), removable memory, bubble memory, etc., or combinations of any of the above. The memory stores electronic data that can be used by the device. For example, a memory can store electrical data or content such as, for example, radar related data, audio and video files, documents and applications, device settings and user preferences, timing and control signals or data for the various modules, data structures or databases, and so on. The memory can be configured as any type of memory.

Transmitted and received signals are mixed (i.e. multiplied) to generate the signal to be processed by signal processing unit 44. The multiplication process generates two signals: one with a phase equal to the difference of the multiplied signals, and the other one with a phase equal to the sum of the phases. The sum signal is filtered out and the difference signal is processed by the signal processing unit.

The signal processing unit performs all the required processing of the received digital signals and controls the transmitted signal as well. Several functions performed by the signal processing block include determining coarse range, velocity (i.e. Doppler), fine range, elevation, azimuth performing interference detection, mitigation and avoidance, performing simultaneous locating and mapping (SLAM), etc.

Figure 20:
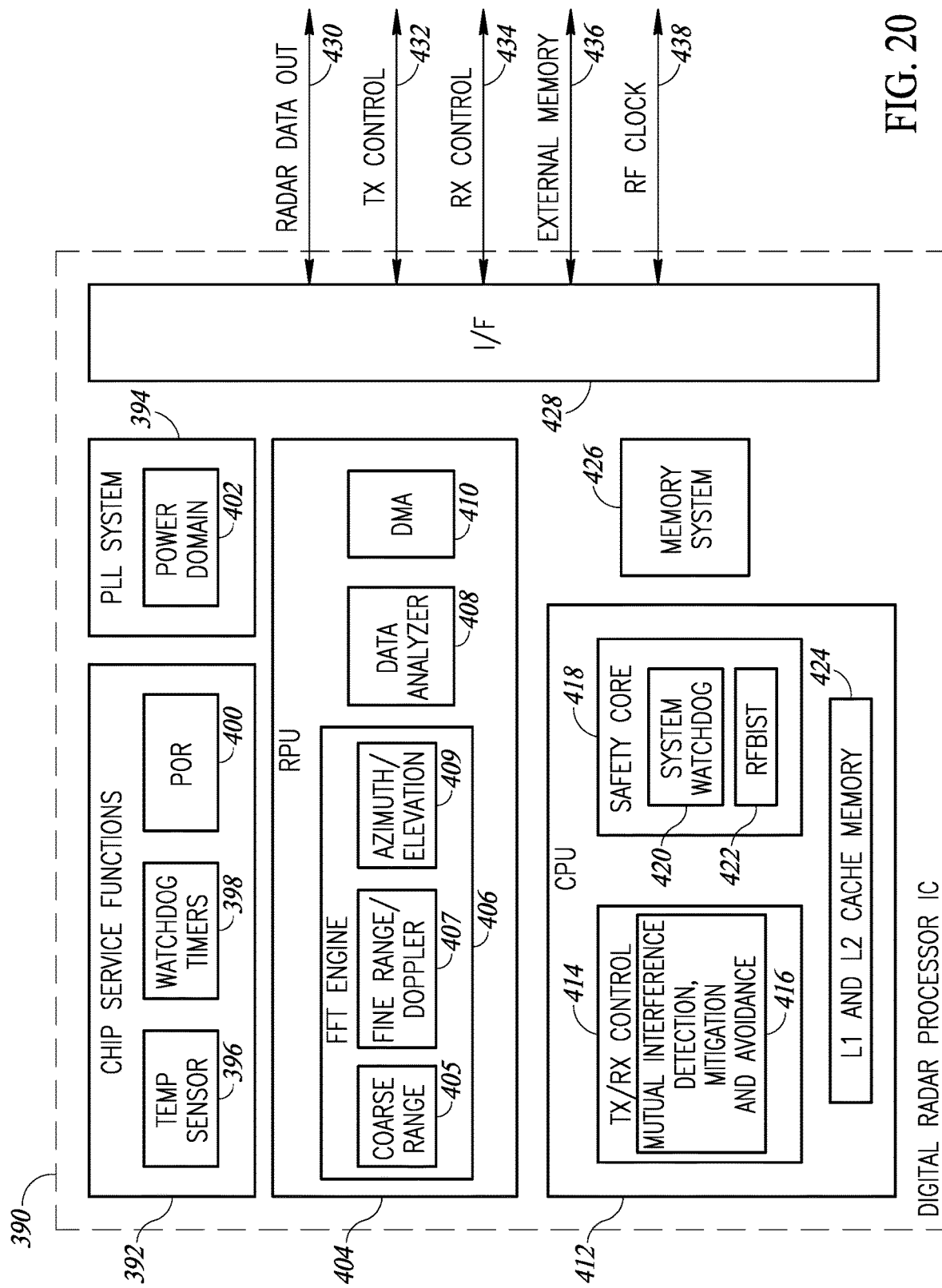
FIG. 20 is a block diagram illustrating an example digital radar processor (DRP) IC constructed in accordance with the present invention.

A block diagram illustrating an example digital radar processor IC of the present invention is shown in FIG. 20. The radar processor IC, generally referenced 390, comprises several chip service functions 392 including temperature sensor circuit 396, watchdog timers 398, power on reset (POR) circuit 400, etc., PLL system 394 including power domain circuit 402, radar processing unit (RPU) 404 including parallel FFT engine 406, data analyzer circuit 408, direct memory access (DMA) circuit 410 and two-stage processing/control circuit 411, CPU block 412 including TX/RX control block 414, safety core block 418, and L1 and L2 cache memory circuit 424, memory system 426 and interface (I/F) circuit 428.

The TX/RX control circuit 414 incorporates settling time control block 416 for eliminating frequency source settling time. The safety core block 418 includes system watchdog timer circuitry 420 and RFBIST circuit adapted to perform continuous testing of the RF elements in the radar system. The I/F circuit includes interfaces for radar output data 430, TX control 432, RX control 434, external memory 436, and RF clock 438.

Note that the digital radar processor circuit 390 can be implemented on monolithic silicon or across several integrated circuits, depending on the particular implementation. Similarly, the transmitter and receiver circuits can be implemented on a single IC or across several ICs depending on the particular implementation.

In one embodiment, the DRP 390 is used in an automotive radar FMCW MIMO based system. Such a system requires a plurality of transmitter and receiver channels to achieve desired range, azimuth, elevation and velocity. The higher the number of channels, the better the resolution performance. Depending on the implementation, multiple transmit channels may be incorporated in a single chip and multiple receive channels may be incorporated in a single chip. The system may comprise multiple TX and RX chips. Each TX and RX chip is operable as part of a larger system adapted to achieve maximum system performance. In one embodiment, the system also includes at least one control channel. The control channel is operative to configure the both TX and RX devices.

Figure 21:
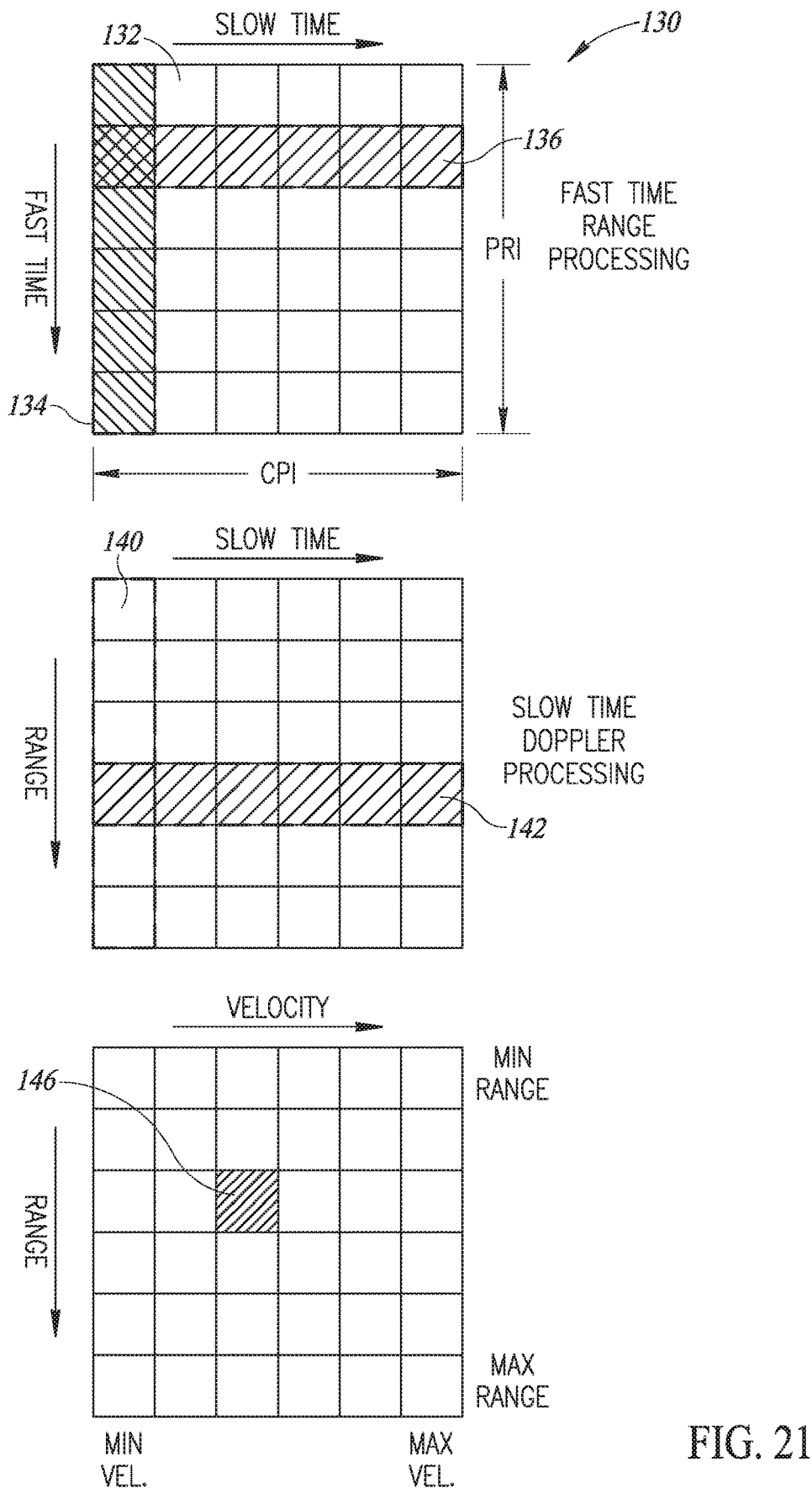
FIG. 21 is a diagram illustrating example fast time and slow time processing.

In one embodiment, in the receiver processing, the digital input data samples 132 representing the beat frequency after the mixer fill a 2D data grid. A diagram illustrating example fast time and slow time processing is shown in FIG. 21. The columns 134 of the 2D data grid 130 represent the data samples received in the fast time dimension (i.e. over each PRI) and the rows 136 of the grid represent the data samples received in a slow time dimension (i.e. over each CPI).

Range data 140 is generated by performing a Fourier transform on each column of data in the fast time dimension. After range processing, Doppler processing is performed on each row 142 to generate a range-Doppler data map 146.

Figure 22:
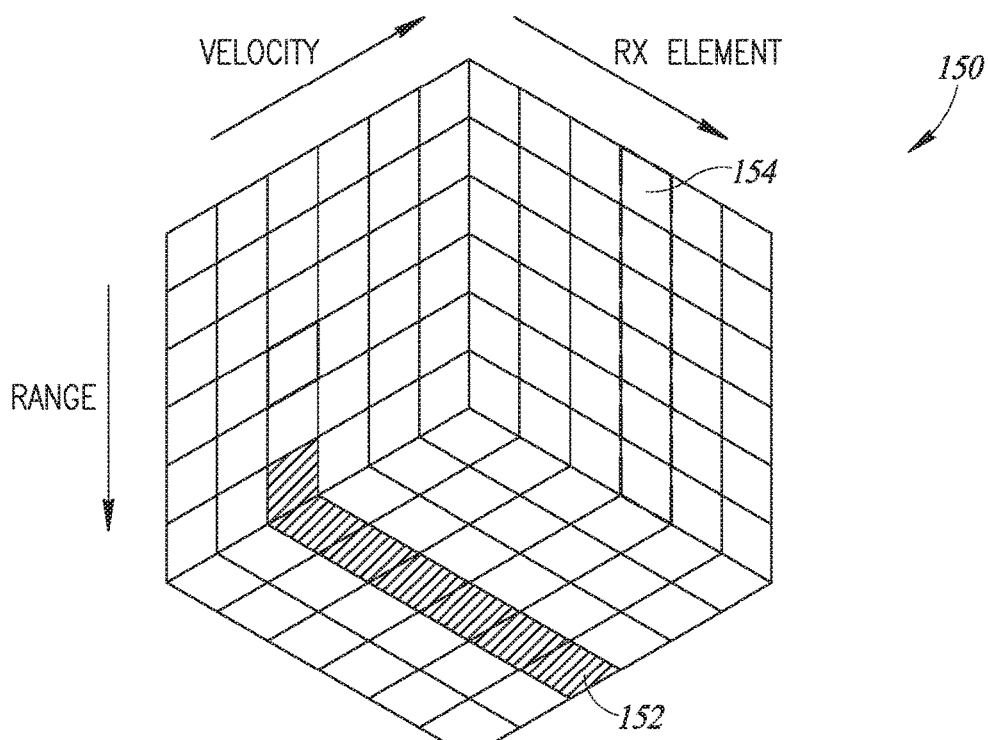
FIG. 22 is a diagram illustrating range-velocity data block for multiple receive antenna elements.

In the case of a MIMO radar system, multiple receive antenna elements add a third dimension to the 2D data grid. A diagram illustrating range-velocity data block for multiple receive antenna elements is shown in FIG. 22. In the 3D data grid 150, the depth dimension 154 is used to store range-Doppler data from each antenna element. For example, hatched area 152 represents range-Doppler data across all receive antenna elements.

Figure 23:
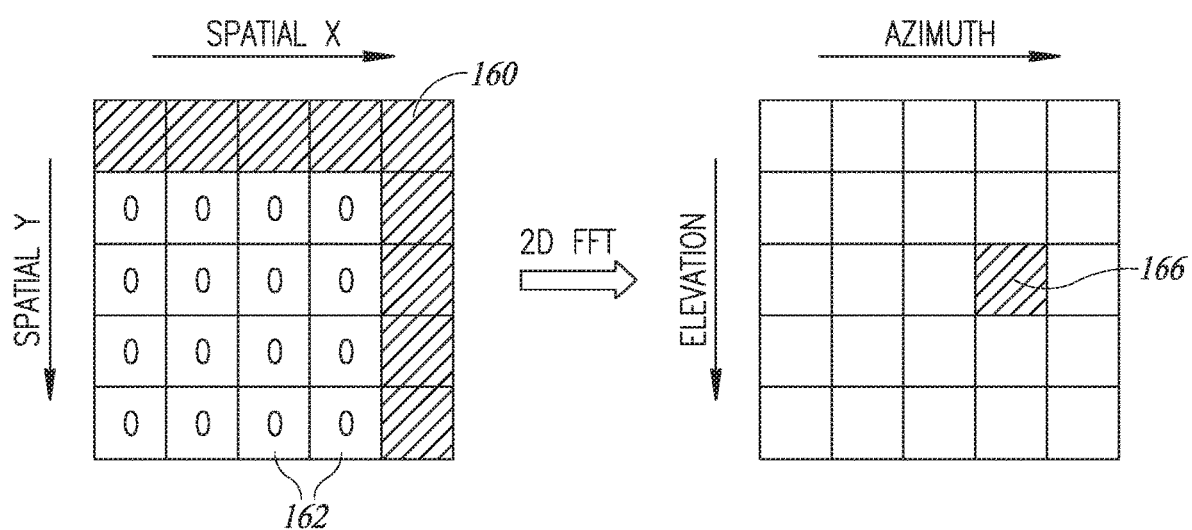
FIG. 23 is a diagram illustrating example azimuth and elevation processing for a MIMO antenna array.

A diagram illustrating example azimuth and elevation processing for a MIMO antenna array is shown in FIG. 23. Considering a 2D antenna array, a 2D Fourier transform can be performed on the range-Doppler data in the spatial x and y directions to yield an azimuth and elevation data map 166.

To aid in understanding the principles of the present invention, a more detailed description of the multiband chirp technique is presented below. In particular, an expression for the received signal is derived when using a linear FM (LFM) continuous wave (CW) signal over several frequency bands using time-multiplex frequency hopping within the coherent processing interval (CPI) (as opposed to transmitting full bandwidth at each pulse) and the modified range-Doppler processing framework which enables small bandwidth digital processing of large bandwidth RF measurements.

To derive the received signal model, without loss of generality, we consider the contribution of the range and doppler effects only, equivalent to a single transmitter and receiver (as opposed to a MIMO system). It is appreciated, however, that all results are readily applicable to MIMO radar transmit-receive systems as well. The transmitted signal at the $k^{th}$ pulse is an LFM pulse (i.e. chirp) with frequency rate $\beta$ and pulse width T expressed as:

$$s[t, k] = e^{j2\pi[f_k t + \frac{1}{2}\beta t^2]} \qquad (13)$$

with k=0, ..., K−1 and 0≤t≤T.

Where s[t, k] is the transmitted pulse or chirp at time t and having frequency index k;

t denotes time (i.e. fast time within a chirp);

T is the period of a pulse or chirp;

k is the pulse (chirp) index and denotes slow time;

K is the number of pulses (chirps) in a CPI;

$\beta$ represents the slope of the chirp;

$f_k$ is the frequency of the chirp (i.e. start frequency) at index k;

The frequency rate which is the slope of the chirp is given by $$\beta = \frac{B_{chirp}}{T},$$

where $B_{chirp}$ is the chirp bandwidth. In accordance with the invention, the carrier frequency $f_k$ (i.e. start frequency) is not constant each pulse (PRI) but rather varies nonlinearly in value, such that the aggregated bandwidth over the CPI is $B_{total} > B_{chirp}$. In one embodiment, the nonlinear variation in start frequency is randomized. Alternatively, any sequence or evolution of start frequencies may be used as long as the sequence is nonlinear.

After reception by the receive antenna element, the received signal is multiplied by the transmitted signal via a mixer 102 (FIG. 8) in what is referred to as de-ramping or de-chirping.

$$y[t, k] = x \cdot s^*[t - \Delta t] \cdot s[t, k] = \quad (14)$$

$$x \cdot e^{j2\pi[f_k \Delta t_k + \frac{1}{2}\beta(t^2 - (t - \Delta t_k)^2)]} = x \cdot e^{j2\pi\left[f_k \Delta t_k + \beta \cdot \Delta t_k \cdot t - \underbrace{\frac{1}{2}\beta \Delta t_k^2}_{discard}\right]}$$

where y[t, k] is the received signal at time t and for frequency index k;

x is the radar cross section (RCS) complex coefficient of the target with range attenuation included;

Δt represents the time delay of the pulse reflected from the target;

$\Delta t_k$ represents the time delay of pulse k reflected from the target;

The time delay $\Delta t_k$ is given by the propagation delay $$\Delta t_k = \frac{2}{c}(R_0 - kV_0 T),$$

where $R_0$ is the initial range (beginning of the CPI) and $V_0$ is the radial velocity. Note that the term $$\frac{1}{2}\beta \Delta t_k^2$$

is discarded assuming negligible contribution to the Doppler frequency and negligible Doppler frequency shift given by $$\left|\frac{4\beta V_0 T}{c^2}(R_0 - kV_0 T)\right| << 1 \text{ and } \left|\frac{4\beta (V_0 T)^2}{c^2}\right| << \frac{1}{K},$$

respectively. In one embodiment, the chirp start frequency changes between pulses in accordance with a nonlinear (e.g., random) hopping sequence, given by $f_k = f_0 + \Delta_k$, with center carrier frequency $f_0$ and shift Δ[k] expressed in Hertz which is a nonlinearly distributed (e.g., random) sequence within $$\left[-\frac{B_{total}}{2}, \frac{B_{total}}{2} - B_{chirp}\right].$$

Note that the frequency shift Δ[k] is known to both transmitter and receiver. In one embodiment, during a single CPI, the total bandwidth $B_{total}$ is fully covered, possibly with one or more overlaps. The received signal can be rewritten as follows:

$$y[t, k] = x \cdot e^{j2\pi\left[\frac{2(R_0 - kV_0 T)}{c} f_0 + \frac{2(R_0 - kV_0 T)}{c}\Delta[k] + \frac{2(R_0 - kV_0 T)}{c}\beta t\right]} = \quad (15)$$

$$\underbrace{x \cdot e^{j2\pi \frac{2R_0}{c} f_0}}_{constant} \cdot e^{-j2\pi \frac{2kV_0 T}{c} f_0} \cdot$$

$$e^{j2\pi \frac{2(R_0 - kV_0 T)}{c}\Delta[k]} \cdot e^{j2\pi \frac{2(R_0 - 2kV_0 T)}{c}\beta t} =$$

$$\tilde{x} \cdot \underbrace{e^{-j2\pi \frac{2kV_0 T f_0}{c}}}_{\substack{Doppler \\ Term \\ (slow\ time)}} \cdot \underbrace{e^{j2\pi \frac{(2R_0 - 2kV_0 T)}{c}\Delta[k]}}_{\substack{Fine\ Range\ Term \\ (slow\ time)}} \cdot \underbrace{e^{j2\pi \frac{(2R_0 - 2kV_0 T)}{c}\beta t}}_{\substack{Beat\ Frequency \\ Range\ Term \\ (fast\ time)}}$$

where $f_0$ is the carrier center frequency;

$R_0$ is the initial range;

$V_0$ is the radial velocity;

c is the speed of light;

Δ[k] denotes the frequency shift at pulse k;

It is noted that without the multiband chirp technique of the present invention, the fine range term in Equation 15 is equal to one and a conventional received radar signal remains.

As is common in the operation of radar, the phenomenon of range cell migration (RCM) may arise due to coupling between a target range and its radial velocity. A target with a constant radial speed $V_0$ has a range that changes through the CPI given as $R_k = R_0 + kV_0 T$, with $R_0$ being the initial range at the beginning of the CPI. This means that depending on the length of the CPI the target may move through several range bins, effectively reducing sensitivity and range resolution.

Figure 24:
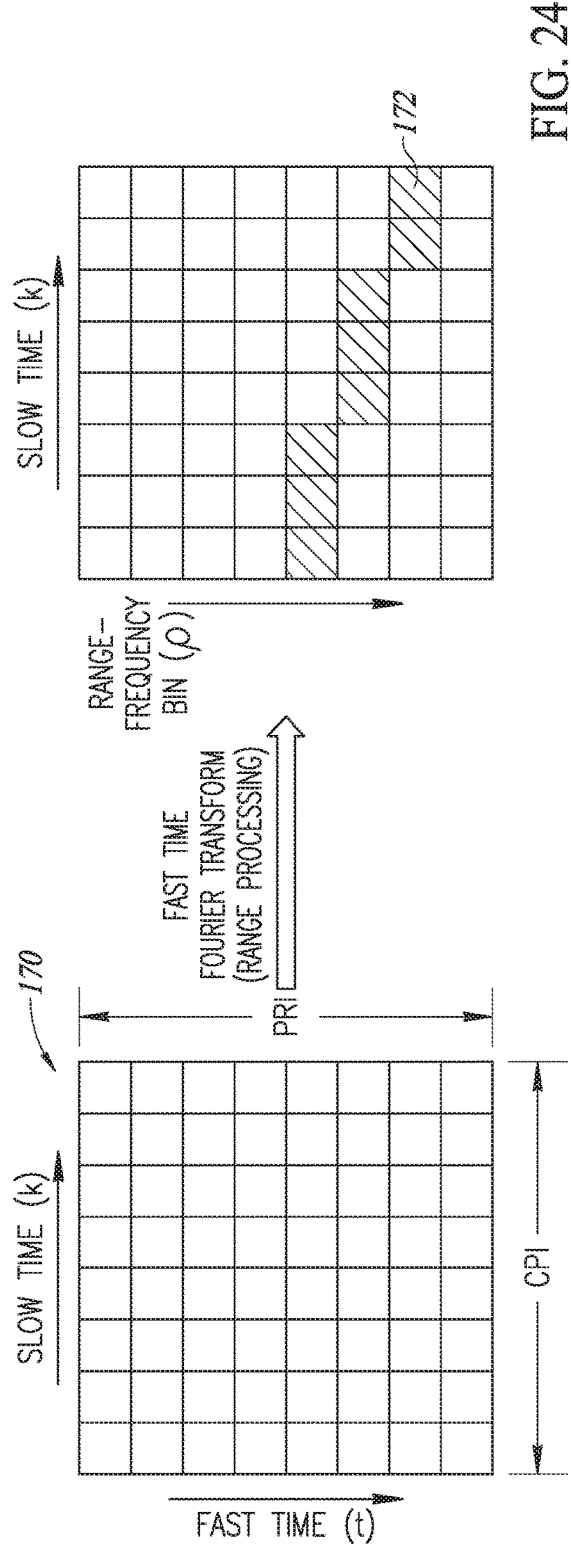
FIG. 24 is a diagram illustrating an example of range cell migration over slow time.

The processing paradigm of conventional radar systems is composed of range-Doppler processing: (1) fast time (i.e. range) FFT processing over index t, and (2) slow time (i.e. velocity/Doppler) FFT processing over index k. The RCM effect exists as the term $kV_0 T$ becomes more dominant and closer (in magnitude) to the range resolution (after K pulses). In this case, the target peak power range bin may shift during the CPI frame. As a result, the slow-time Fourier processing will result in a "smeared" signal power spectrum over several bins resulting in attenuated coherent processing gain, as shown in FIG. 24.

In order to perform a two-step Fourier transform on fast time and slow time dimensions with minimal loss of coherent processing gain, the LFM transmit parameters (K, $B_{chirp}$, T) are selected such that in the majority of scenarios the range-frequency will be smeared (i.e. shift) less than the width of a single range bin. This can be expressed as follows:

$$K \cdot V_0 \cdot T < \frac{c}{2 \cdot B_{chirp}} \quad (16)$$

The above inequality is equivalent to a maximal loss of 3 db in the slow-time Fourier integration and can be regarded as the slow-target assumption.

It is noted that the wider the width of the coarse range bin, the less an effect RCM has since a wider degree of "smearing" can be tolerated and still remain in a single coarse range bin. The size of the coarse range bin is mainly determined by the chirp bandwidth. A higher bandwidth results in a narrower coarse range bin creating a higher likelihood of range cell migration. A lower chirp bandwidth results in a wider coarse range bin and less of a problem of range cell migration. Note that performing a Doppler FFT across slow time in the presence of RCM yields results that are spread across multiple range bins, i.e. the energy is smeared over several range bins and range resolution and sensitivity is degraded. For example, the determination of the location of the peaks for point targets is less accurate.

In one embodiment, the use of multiband processing supports use of a relatively small bandwidth and hence wider range bins and coarse resolution per pulse. This allows the migration to be less than half the fast time coarse range resolution. Using multiband processing, the full range resolution is restored, and RCM with respect to the fine range resolution is prevented by applying a phase based motion compensation as part of the slow-time processing of the multiband echo signal.

Note that this RCM compensation method can be combined with other methods, such as shifting between range bins in the event the accumulated motion exceeds half the range bin resolution. This can be particularly useful when zero-padding is used because than the shifting between range bins is finer and creates less amplitude modulation (due to scalloping loss) of the target along the slow time axis, relative to when no zero padding is used.

The modified range-Doppler processing paradigm of the present invention will now be described in more detail. In one embodiment, the modified range-Doppler (i.e. fine range and Doppler) processing consists of: (1) fast-time Fourier processing with index t whereby a coarse range dimension is generated, and (2) a modified or extended slow-time Fourier processing whereby both a residual range dimension and a velocity dimension are generated simultaneously.

In one embodiment, three frequency grids are defined: (1) coarse range represented by $\rho$; (2) velocity (Doppler) represented by V; and (3) residual or fine range represented by $R_\varepsilon$. The actual true range value is defined as follows:

$$R_0 - kV_0 T \triangleq \rho_0 + (R_{\varepsilon_0} - kV_0 T) \qquad (17)$$

where $\rho_0$ denotes the range-frequency value of the target at the center of the coarse range bin (i.e. the coarse quantization of the range frequency) and $R_{\varepsilon_0}$ denotes the residual range value or fine quantization.

$$y[t, k] = \tilde{x} \cdot \underbrace{e^{j2\pi \frac{(2\rho_0 + (2R_{\varepsilon_0} - 2kV_0 T))}{c} \beta t}}_{\text{Course Range Time (fast time)}} \cdot \qquad (18)$$

$$\underbrace{e^{-j2\pi \frac{2kV_0 Tf_0}{c}}}_{\substack{\text{Doppler} \\ \text{Term} \\ \text{(slow time)}}} \cdot \underbrace{e^{j2\pi \frac{(2R_{\varepsilon_0} - 2kV_0 T)}{c} \Delta[k]} \cdot e^{j2\pi \frac{2\rho_0}{c} \Delta[k]}}_{\substack{\text{Fine Range Term} \\ \text{(slow time)}}}$$

Note that it is assumed that the RCM effect for the immediate chirp bandwidth is negligible. In this case, the term $R_0 - kV_0 T$ changes less than the width of a coarse range bin during the entire CPI. Equation 17 can thus be rewritten as:

$$y[t, k] \cong \tilde{x} \cdot \underbrace{e^{j2\pi \frac{2(\rho_0 + R_{\varepsilon_0})}{c} \beta t}}_{\text{Course Range Time (fast time)}} \cdot \qquad (19)$$

$$\underbrace{e^{-j2\pi \frac{2kV_0 Tf_0}{c}}}_{\substack{\text{Doppler} \\ \text{Term} \\ \text{(slow time)}}} \cdot \underbrace{e^{j2\pi \frac{(2R_{\varepsilon_0} - 2kV_0 T)}{c} \Delta[k]} \cdot e^{j2\pi \frac{2\rho_0}{c} \Delta[k]}}_{\substack{\text{Fine Range Term} \\ \text{(slow time)}}}$$

Figure 25:
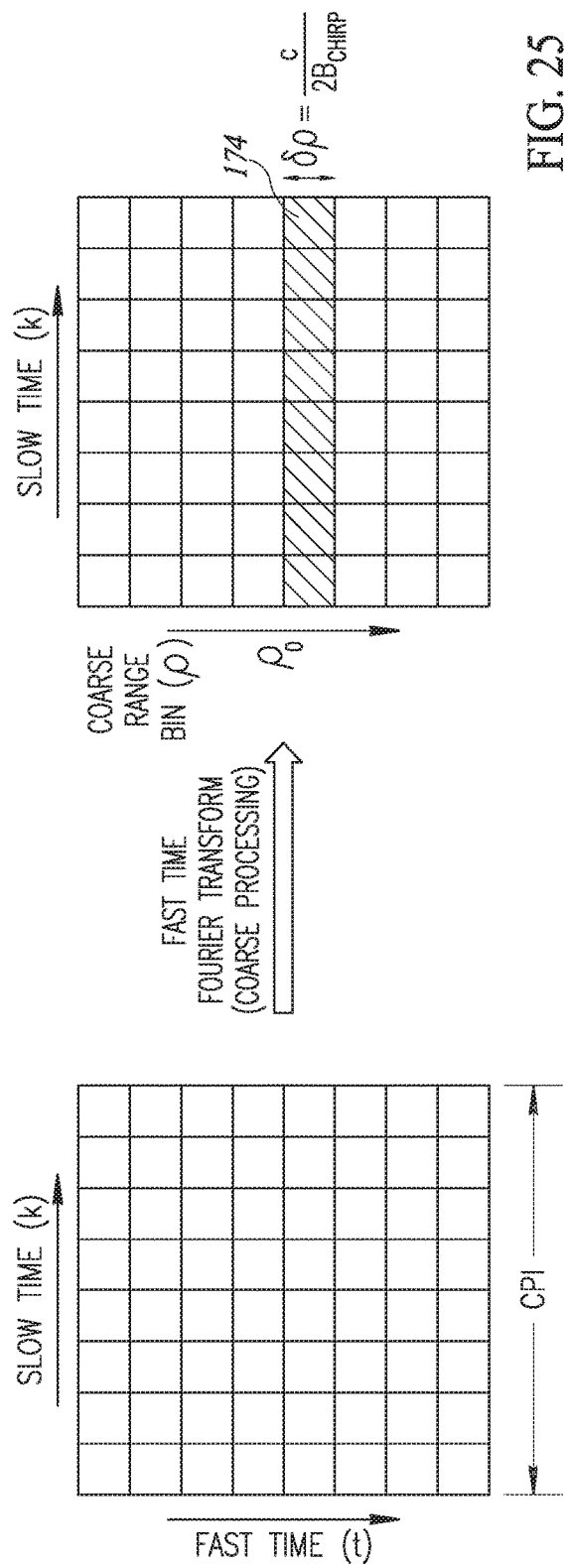
FIG. 25 is a diagram illustrating example fast time Fourier processing.

In a first stage, the fast-time Fourier processing of the received signal is given by the following and is shown in FIG. 25:

$$\psi[\rho, k] = \qquad (20)$$

$$\Sigma_{0 \le t \le T} y[t, k] \cdot \underbrace{e^{-j2\pi \frac{2\rho}{c} \beta t}}_{\substack{\text{Coarse Range} \\ \text{Fourier Coefficient} \\ \text{(fast time)}}} = \tilde{x} \cdot \underbrace{W_\rho[\rho - (\rho_0 + R_{\varepsilon_0})]}_{\substack{\text{Fourier transform of the} \\ \text{fast time window function}}} \cdot$$

$$\underbrace{e^{-j2\pi \frac{2kV_0 Tf_0}{c}}}_{\substack{\text{Doppler} \\ \text{Term} \\ \text{(slow time)}}} \cdot \underbrace{e^{j2\pi \frac{(2R_{\varepsilon_0} - 2kV_0 T)}{c} \Delta[k]} \cdot e^{j2\pi \frac{2\rho_0}{c} \Delta[k]}}_{\substack{\text{Fine Range Term} \\ \text{(slow time)}}}$$

where $W_\rho[\cdot]$ is the one dimensional discrete time Fourier transform (DTFT) of a window in the fast-time dimension (e.g., sin c), and the coarse range axis $\rho$ has bin width $\delta\rho = c/(2B_{chirp})$.

Figure 26:
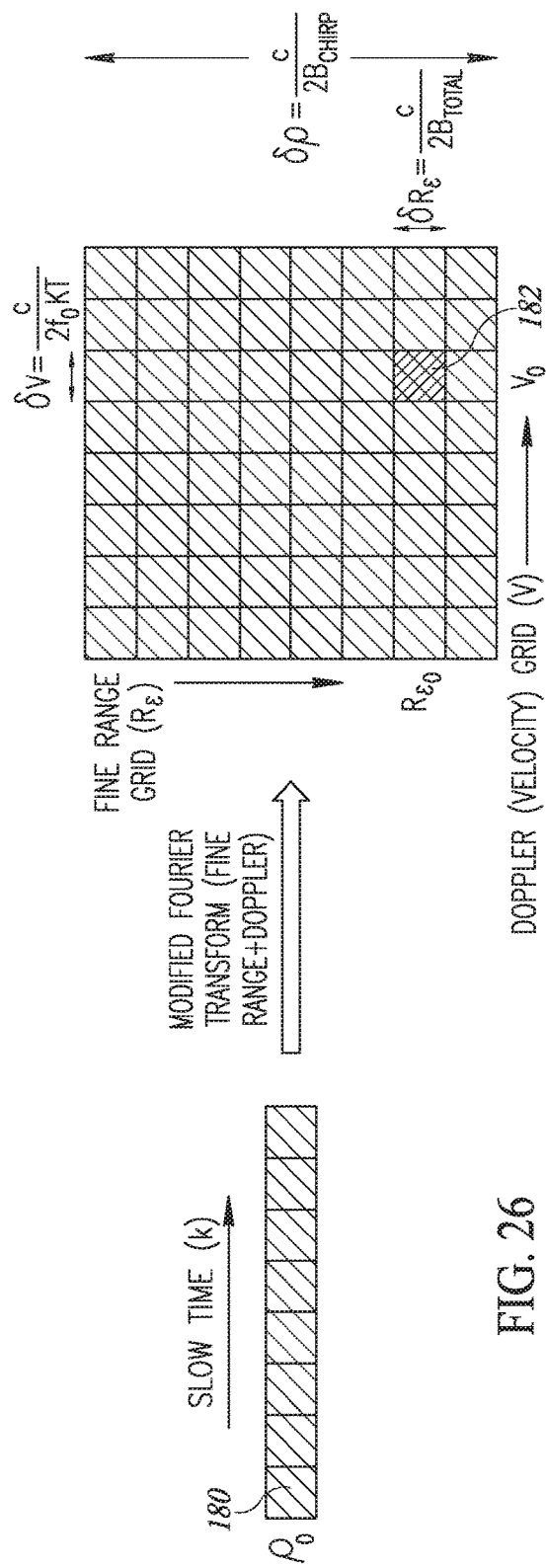
FIG. 26 is a diagram illustrating example modified Fourier processing over a slow time dimension.

In a second stage (shown in FIG. 26), a "modified" slow-time (over index k) Fourier processing is performed where the frequency spectrum is a two dimensional function of $R_\varepsilon$ and V. Note that in conventional radar, only a single dimension V is associated with slow-time processing. In addition to the Fourier coefficients which would be considered in the conventional slow-time Fourier transform, given by $$e^{j2\pi \frac{2kV_0 Tf_0}{c}},$$

another sequence of coefficients is added which accounts for the "fine range" term, as follows:

$$\mathcal{Y}[\rho, V, R_\varepsilon] \underset{\substack{\text{Modified} \\ \text{Fourier} \\ \text{Transform}}}{=} \Sigma_{k=0:K-1} \psi[\rho, k] \cdot \qquad (21)$$

$$\underbrace{e^{j2\pi \frac{2Tf_0}{c} Vk}}_{\substack{\text{Doppler} \\ \text{Fourier} \\ \text{Coefficient} \\ \text{(slow time)}}} \cdot \underbrace{\left( e^{-j2\pi \frac{(2R_\varepsilon - 2kTV)}{c} \Delta[k]} \cdot e^{-j2\pi \frac{2\rho}{c} \Delta[k]} \right)}_{\substack{\text{Fine Range Fourier Coefficient} \\ \text{(slow time)}}}$$

where $R_\varepsilon$ is the residual (or fine) range axis which is limited by $$\left[ -\frac{c}{4B_{chirp}}, \frac{c}{4B_{chirp}} \right]$$

which is the width of the coarse range bin, and having a residual bin width of $$\delta R_\varepsilon = \frac{c}{2B_{total}}.$$

The velocity frequency grid V is limited by $$\left[ -\frac{c}{4Tf_0}, \frac{c}{4Tf_0} \right]$$

and has a bin width $$\delta V = \frac{c}{2f_0 KT}.$$

Note that the Doppler (i.e. velocity) term has linear phase evolution with respect to the pulse index k. The second term comprises the "fine" or "residual" range in which the phase sequence is nonlinear with respect to the pulse index k. Note that the nonlinear sequence is known to both transmitter and receiver.

It is important to note that due to the nonlinear phase sequence with respect to index k, the Doppler and range dimensions are uncoupled, i.e. unambiguous. This results in a single peak value, which stems from the target reflection, only in the true or actual range-Doppler pair $R_{\varepsilon_0}, V_0$ frequency location.

The result of the two step modified Fourier transform of the present invention is given by the following:

$$\mathcal{Y}[\rho, V, R_\varepsilon] = \underbrace{\tilde{x} \cdot W_\rho[\rho - (\rho_0 + R_{\varepsilon_0})]}_{\substack{\text{peak value bin} \\ \text{centered around } \rho_0}} \cdot \underbrace{\tilde{W}_{\rho, R_\varepsilon, V}[\rho - \rho_0, R_\varepsilon - R_{\varepsilon_0}, V - V_0]}_{\substack{\text{peak value bin} \\ \text{at } \rho_0, R_{\varepsilon_0}, V_0}} \quad (22)$$

where the fine range and Doppler frequency term $\tilde{W}_{\rho, R_\varepsilon, V}$ is given by:

$$\tilde{W}_{\rho, R_\varepsilon, V}[\rho - \rho_0, R_\varepsilon - R_{\varepsilon_0}, V - V_0] = \quad (23)$$

$$\begin{cases} K, \rho = \rho_0, R_\varepsilon = R_{\varepsilon_0}, V = V_0 \\ W_{R_\varepsilon}[R_\varepsilon - R_{\varepsilon_0}], \rho = \rho_0, V = V_0 \\ \sim \mathcal{N}(0, K), \text{otherwise} \end{cases}$$

where $W_{R_\varepsilon}[\cdot]$ is given by the following $$W_{R_\varepsilon}[R_\varepsilon - R_{\varepsilon_0}] = \sum_{k=0:K-1} e^{-j2\pi \frac{2(R_\varepsilon - R_{\varepsilon_0})}{c} \Delta[k]} \quad (24)$$

for $$R_\varepsilon \in \left[-\frac{c}{4B_{chirp}}, \frac{c}{4B_{chirp}}\right].$$

Figure 27A:
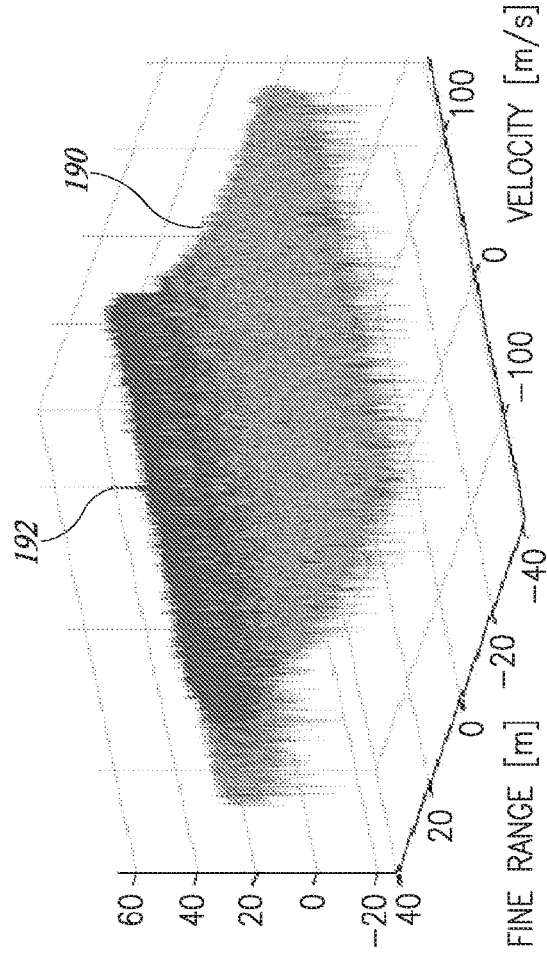
FIG. 27A is a graph illustrating a perspective view of example results of modified Fourier processing.
Figure 27B:
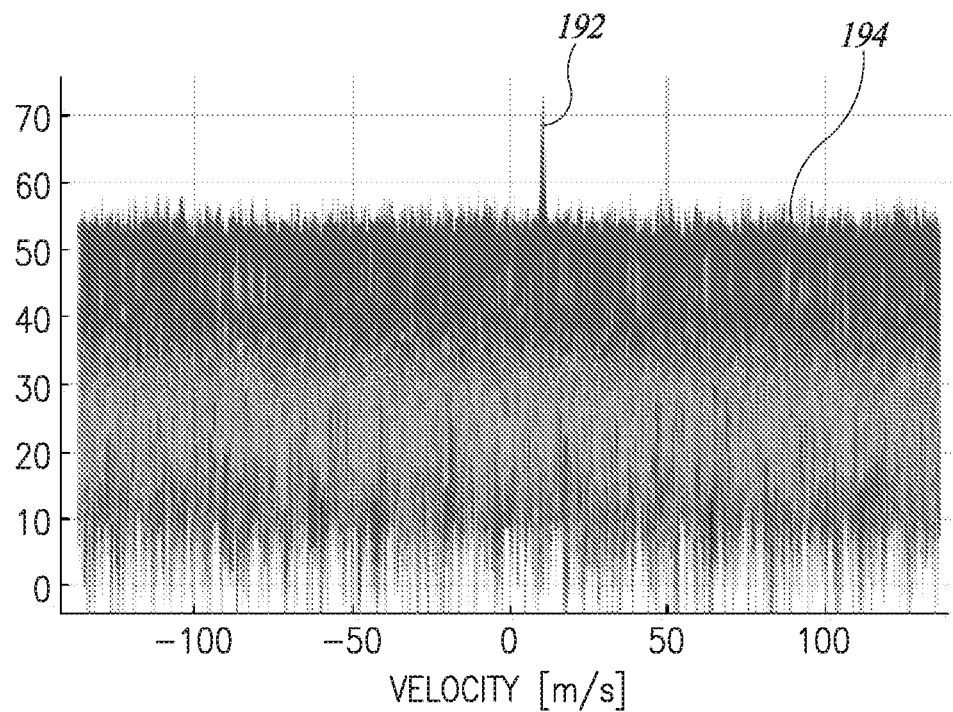
FIG. 27B is a graph illustrating velocity results of modified Fourier processing.
Figure 27C:
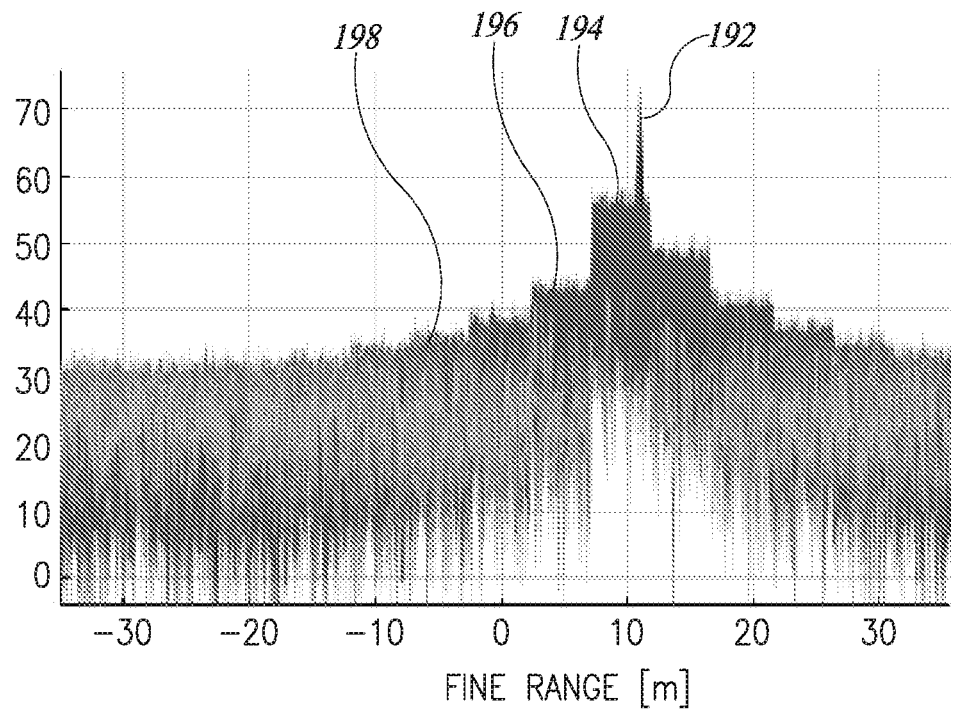
FIG. 27C is a graph illustrating fine range results of modified Fourier processing.

FIGS. 27A, 27B, 27C illustrate an example of the combined range (i.e. coarse and fine)/Doppler map $\mathcal{Y}[\rho, V, R_\varepsilon]$ for a single target scenario. In particular, a perspective graph of an example modified fine range-Doppler map is shown in FIG. 27A. A graph showing the velocity portion of an example modified fine range-Doppler map is shown in FIG. 27B. A graph showing the fine range portion of an example modified fine range-Doppler map is shown in FIG. 27C.

Figure 28:
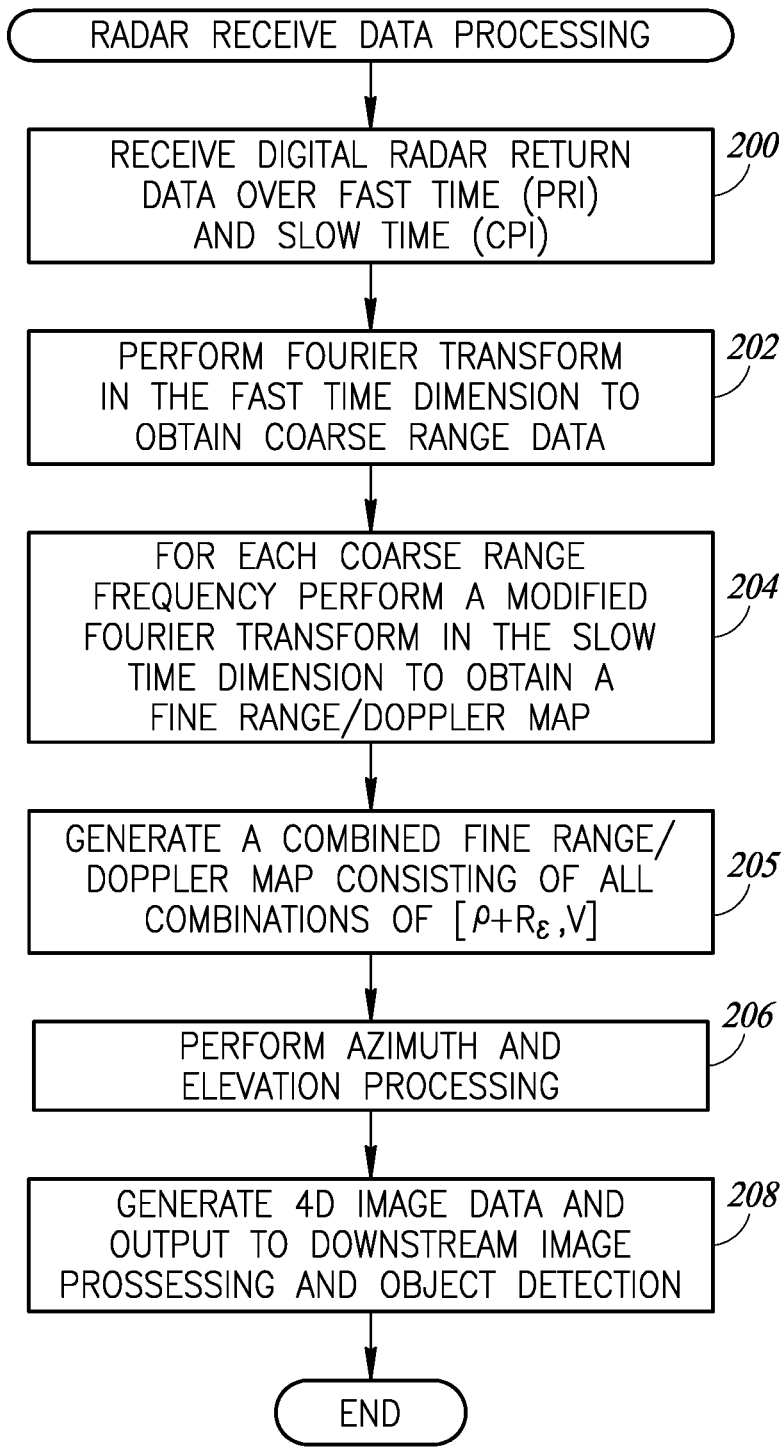
FIG. 28 is a flow diagram illustrating an example radar receiver data processing method of the present invention.

A flow diagram illustrating an example radar receive data processing method of the present invention is shown in FIG. 28. The receive digital radar return data is obtained over fast time (i.e. PRI) and slow time (i.e. CPI) utilizing Equation 20 (step 200). A Fourier transform is then performed over the fast time dimension to obtain coarse range-slow time data map (step 202). For each coarse range frequency data ρ, a modified Fourier transform is performed in the slow time dimension to obtain a fine range-Doppler map utilizing Equation 21 (step 204). A combined fine resolution range-Doppler map is generated consisting of all combinations of [ρ+R_ε, V] (step 205). Azimuth and elevation processing are then performed on the combined fine resolution range-Doppler map (step 206). Four dimensional (4D) image data is then generated and output to subsequent downstream image processing and object detection (step 208).

Note that for a single frequency band transmission (i.e. non-MBC), the modified fine range and Doppler processing converges to conventional Doppler processing, i.e. standard slow-time Fourier transform.

Further, the limit of the range resolution of the modified fine range-Doppler processing paradigm is dominated by the CPI aggregated bandwidth $$\delta R \cong \frac{c}{2B_{total}}.$$

Therefore, the mechanism of the present invention is operative to obtain a relatively fine range resolution using relatively small bandwidth processing. This allows for transmit and receive modules having lower bandwidth and sampling rate, thus lowering cost and complexity compared with full chirp bandwidth systems.

Note also that the RCM constraint is determined by the reduced chirp bandwidth $B_{chirp}$, and not the larger aggregated bandwidth $B_{total}$. This allows for a higher range resolution radar with more robust detection probability in high velocity scenarios.

Note further that due to the use of a nonlinear hopping sequence, the resulting the sidelobes (in one embodiment also referred to as randomization sidelobes) within the (V, $R_\varepsilon$) domain are the result of the Fourier processing combined with the nonlinear (e.g., random) phase sequence (due to nonlinear frequency shift order). The peak to average sidelobe ratio is K, the number of pulses in the CPI. The peak to maximum sidelobe ratio is proportional to K.

Note also that there are no randomization sidelobes for $V=V_0$, i.e. when the velocity is perfectly matched.

For simplicity and without loss of generality, it is assumed that each dimension is sampled at approximately the Nyquist rate. Therefore, the mentioned frequency bin widths for coarse range, Doppler and residual range were given by $$\delta \rho \cong \frac{c}{2B_{chirp}}, \delta V \cong \frac{c}{2f_0 KT} \text{ and } \delta R_\varepsilon \cong \frac{c}{2B_{total}},$$

respectively. If the Fourier transforms are performed with oversampling or zero-padding in order to avoid scalloping losses (a common practice in digital signal processing), then the frequency bin width is less than the mentioned values for coarse range, Doppler, and residual range. Nevertheless, the beam width for each dimension is a physical characteristic and is independent of the amount of frequency bins/zero padding. The resolution beam widths are given by the values for rectangular windowing mentioned supra.

In one embodiment, within the multiband chirp transmission framework described supra, a mechanism to improve the behavior of sidelobes in the residual range dimension $R_\varepsilon$ (i.e. the fine range) is provided. In one embodiment, digital windowing consists of multiplying the sampled time domain signal 250 with a weight function 254 (dashed) in order to reduce sidelobes of strong signals and prevent masking of weaker signals.

Figure 29:
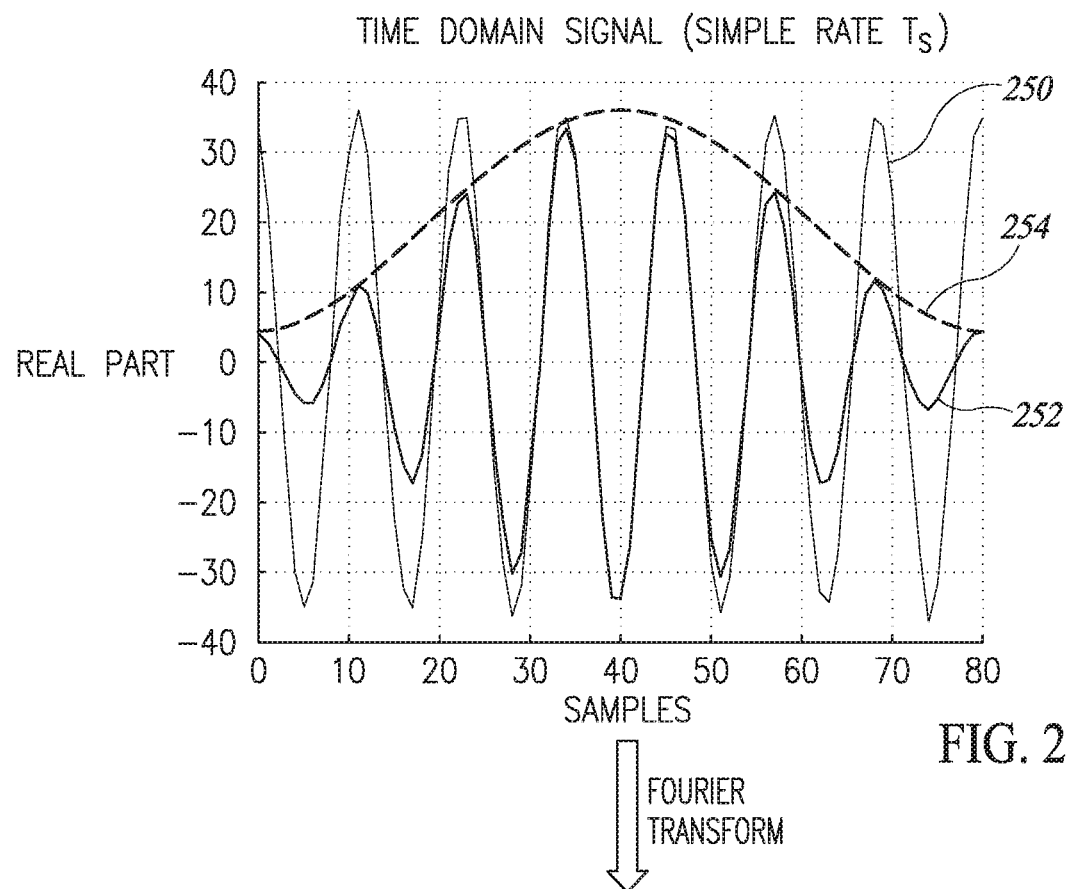
FIG. 29 is a graph illustrating an example time domain signal with windowing.
Figure 30:
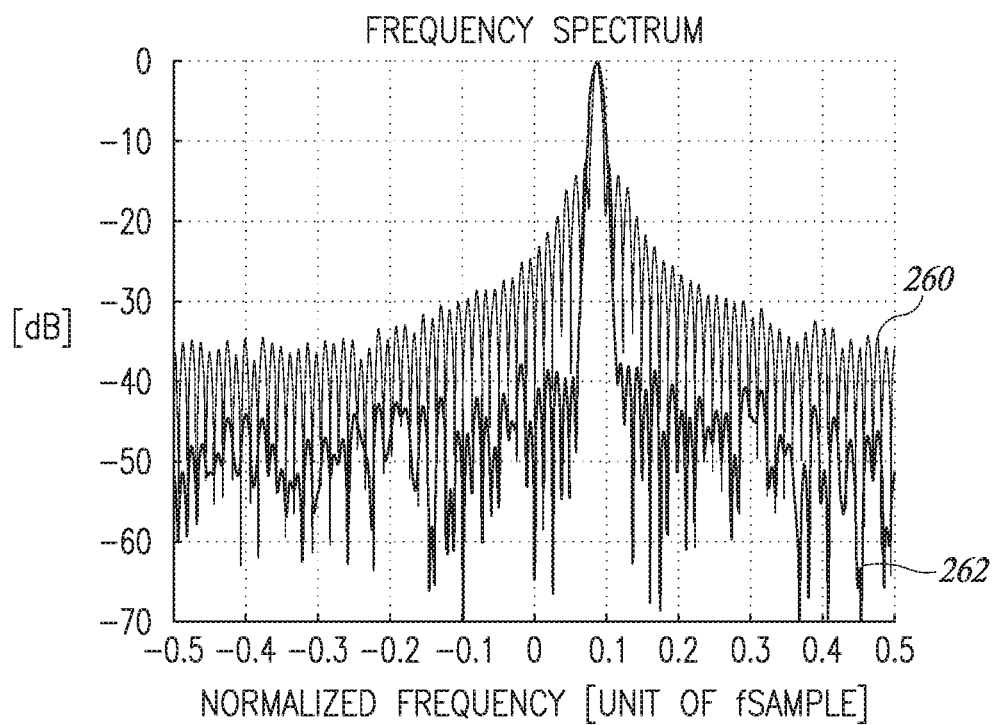
FIG. 30 is a graph illustrating the resulting frequency spectrum after Fourier processing.

An example of the effectiveness of windowing in general is shown in FIG. 29. The time domain samples of trace 250 are essentially multiplied by a rectangular window. Multiplying the samples by a contoured window or weight function 254 (dashed) results in the contoured signal of trace 252. Applying Fourier transform processing yields the frequency spectrum shown in FIG. 30 where trace 260 represents the spectrum with rectangular windowing having relatively high sidelobes 13 dB below the peak. Trace 262 represents the spectrum with windowing having significantly lower sidelobes almost 40 dB below the peak. Higher sidelobes results in lower dynamic range.

It is thus desirable to apply windowing to the receive processing of the radar system. Although windowing can be applied to the coarse range processing, it is not that effective in improving range resolution. To reduce the sidelobes, windowing is preferably applied to the fine range processing.

Generally, for a fully nonlinear (e.g., randomized) permutation of the frequency hopping sequence, the residual range and velocity $[R_\varepsilon, V]$ are not separable in the slow-time dimension. Therefore, digital windowing which is applied in order to reduce sidelobes in the Doppler dimension V will introduce additional "processing noise" to the residual range dimension $R_\varepsilon$, and vice-versa.

In one embodiment, combined design of digital window and frequency sequence permutation results in acceptable levels of processing noise, for practical considerations. The present invention provides a method for sidelobe reduction in the residual range dimension $R_\varepsilon$ without increasing Doppler sidelobes.

In one embodiment, to address this problem, rather than apply a windowing function in the receive processing, it is applied in the transmitter to the transmitted chirps. In particular, the distribution of the frequency hopping sequence used in the transmitter is configured appropriately to reduce sidelobes in the residual range spectrum $R_\varepsilon$ without effecting the Doppler spectrum. Thus, the windowing is performed in the transmission stage rather than in the reception stage.

Note that utilizing a uniform start frequency hopping sequence is equivalent to applying a rectangular window function to the fine range data. Appling a nonuniform sequence in accordance with a window function is equivalent to applying the window function to the fine range data. In accordance with the present invention, a hopping sequence is determined such that the aggregate sequence over a CPI is not uniform.

The aggregated power spectrum shape directly determines the sidelobe behavior of the residual range $R_\varepsilon$ and is determined by the frequency hopping spectral distribution. We define the 'spectral probability window' (SPW) as the envelope shape of the aggregated power spectrum.

Figure 31:
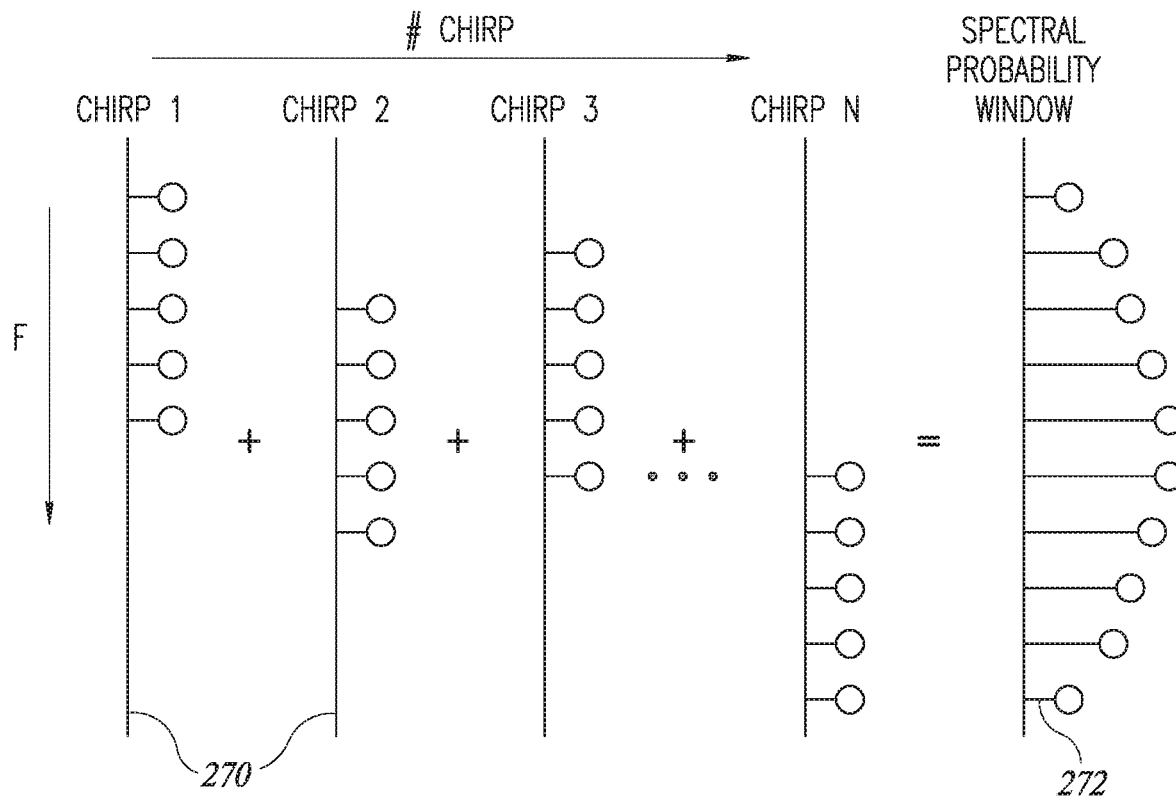
FIG. 31 is a diagram illustrating example nonuniform spectral distribution of a multiband linear FM (LFM) chirp.

In the case of a uniform distribution, the SPW has an approximate rectangular shape. But by designing the SPW to have a non-rectangular envelope shape (e.g., any one of commonly used window functions), an effective windowing of the fine range samples is achieved. A diagram illustrating the nonuniform spectral distribution for an example multiband LFM chirp is shown in FIG. 31. The multiband chirps 270 are shown along with the spectral probability window 272. Each chirp comprises multiple ticks 274 denoting that each spans a finite frequency range. The starting frequency of each chirp is different and forms a nonlinear sequence. The result is a spectral probability window 272 showing higher frequency reuse in the center of the aggregate frequency band compared to the edges.

It is assumed that the aggregated bandwidth and the immediate chirp bandwidth are given by $B_{total}$ and $B_{chirp}$, respectively. Additionally, the hopping sequence of nonlinear (e.g., random) starting frequencies of each chirp is given by $\Delta[k] \in [0, B_{total} - B_{chirp}]$, where $0 \le k \le K-1$.

The probability density function (pdf) of the spectral probability window (SPW) for an LFM chirp is the convolution of the multiband chirp starting frequencies with a rectangular window representing the bandwidth of a single chirp.

$$\text{SPW}(f) = \Sigma_{k=0:K-1} \delta(f - \Delta[k]) \otimes \text{rect}_{[0, B_{chirp}]}(f) \qquad (25)$$

where $\otimes$ represents the convolution operator. Therefore, the required window can be generated by choosing a desired start frequency probability density function (PDF) $\Pr(\Delta[k]=f)$, whose convolution with a rectangular window with a single chirp bandwidth yields the required window envelope shape. A start frequency hopping sequence is then generated in accordance with the window envelope shape (i.e. the SPW) to yield a windowed start frequency hopping sequence. The chirps are then generated utilizing the windowed start frequency hopping sequence.

Figure 32:
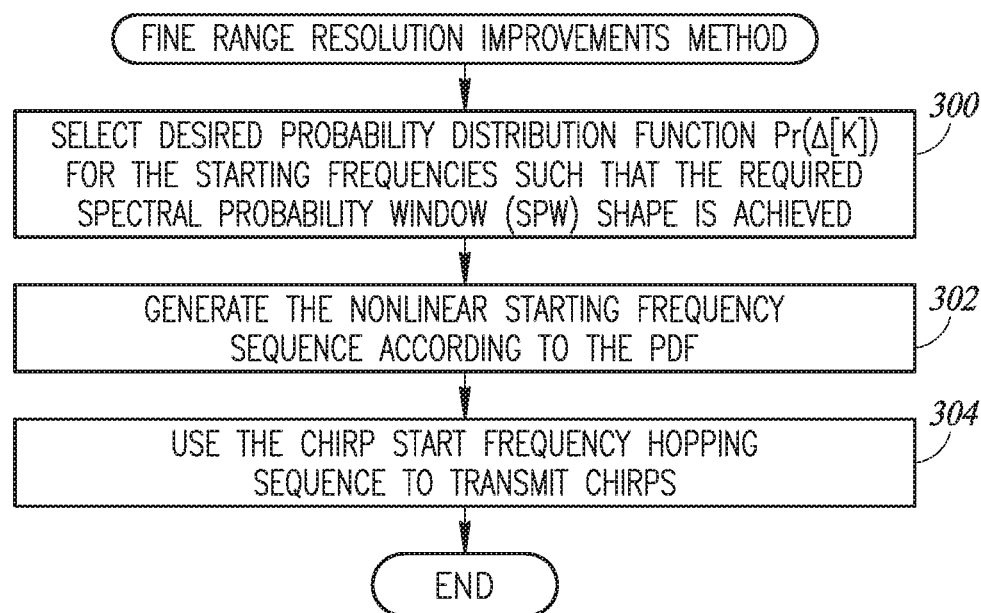
FIG. 32 is a flow diagram illustrating an example fine resolution enhancement method.

A flow diagram illustrating an example fine resolution improvement method is shown in FIG. 32. First, the desired probability density function (PDF) $\Pr(\Delta[k])$ (e.g., Hamming) is selected for the starting frequencies such that the required spectral probability window (SPW) is achieved (step 300). Note that mathematically, the PDF for the start frequencies is designed such that the convolution with a rectangular window of size $B_{chirp}$ will yield the desired window shaped spectral probability window (SPW). The nonlinear starting frequency sequence is then generated according to the PDF (step 302). The chirp signals are generated and transmitted using the chirp start frequency hopping sequence (step 304).

Consider the following illustrative example. In this example assume that K=512 LFM pulses (i.e. chirps) were transmitted where the bandwidth of each chirp $B_{chirp}$=125 MHz during a PRI of T=7 μs. The aggregated bandwidth is $B_{total}$=1 GHz. The resulting coarse range resolution is calculated as $\delta\rho$=1.2 m, and the velocity resolution $\delta V$=0.53 m/s. A single target was positioned at an initial range $R_0$=11 m with velocity $V_0$=10 m/s.

Figure 33:
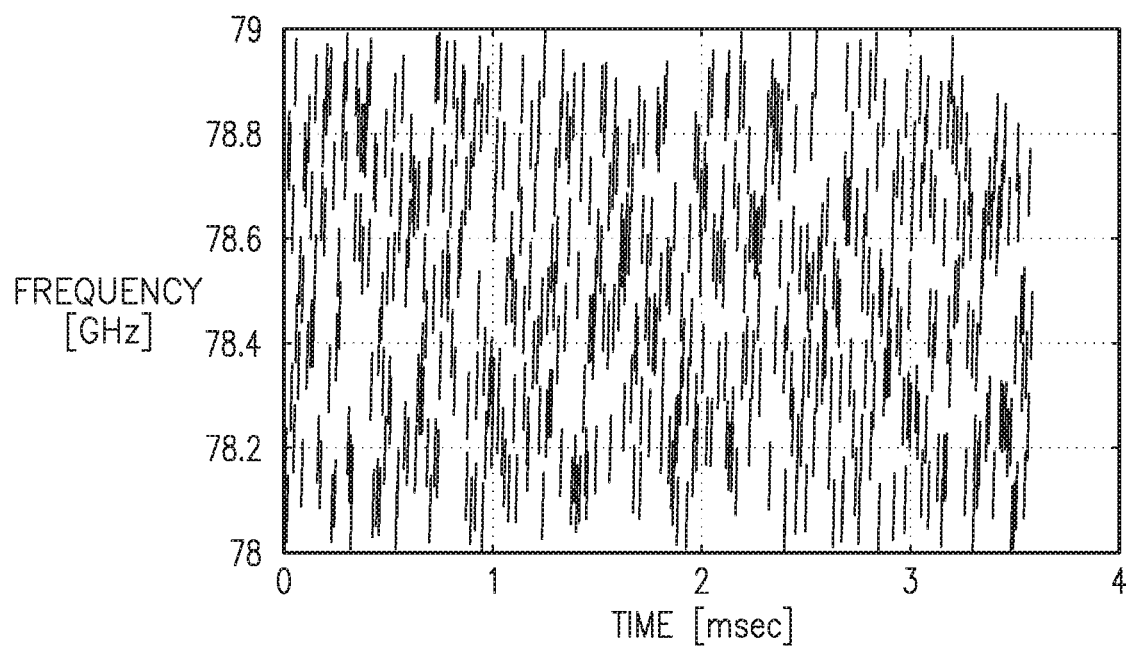
FIG. 33 is a graph illustrating immediate frequency versus time for a uniform distribution.
Figure 34:
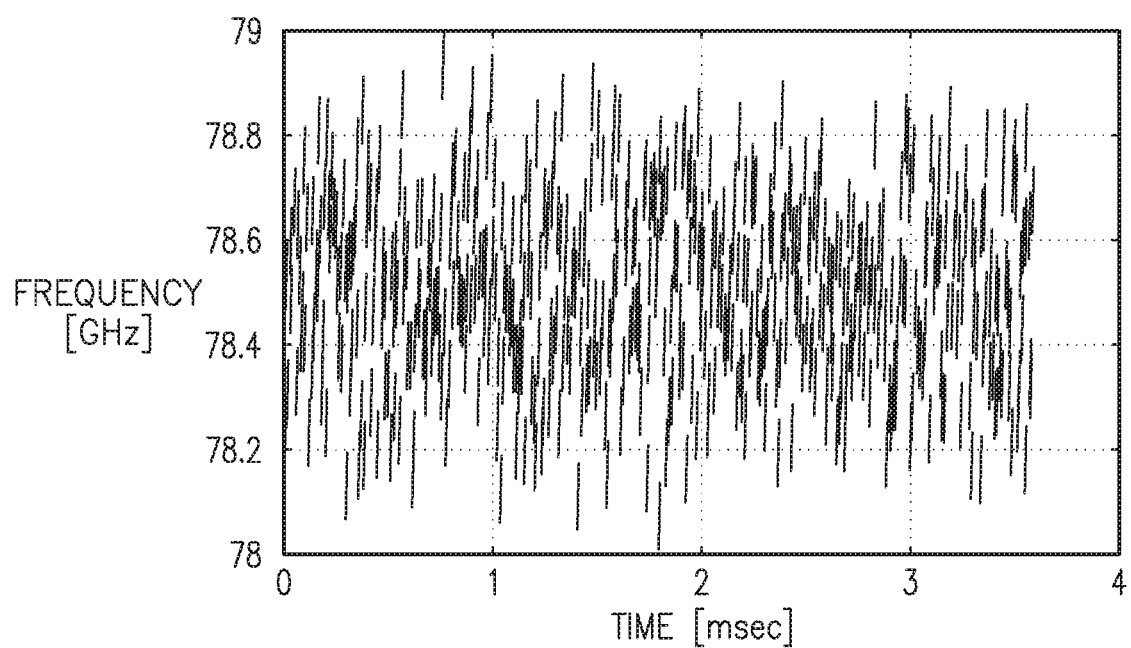
FIG. 34 is a graph illustrating immediate frequency versus time for a Hann distribution.

A graph of frequency versus time for the multiband chirp with a rectangular distribution window is shown in FIG. 33. Note that in accordance with the invention, the chirps have a fractional bandwidth and their start frequency hop according to a nonlinear sequence. Applying a Hann distribution window yields the graph shown in FIG. 34. Note a clustering of chirps around the center of the aggregate frequency band with fewer chirps appearing at the edges of the band.

Figure 35:
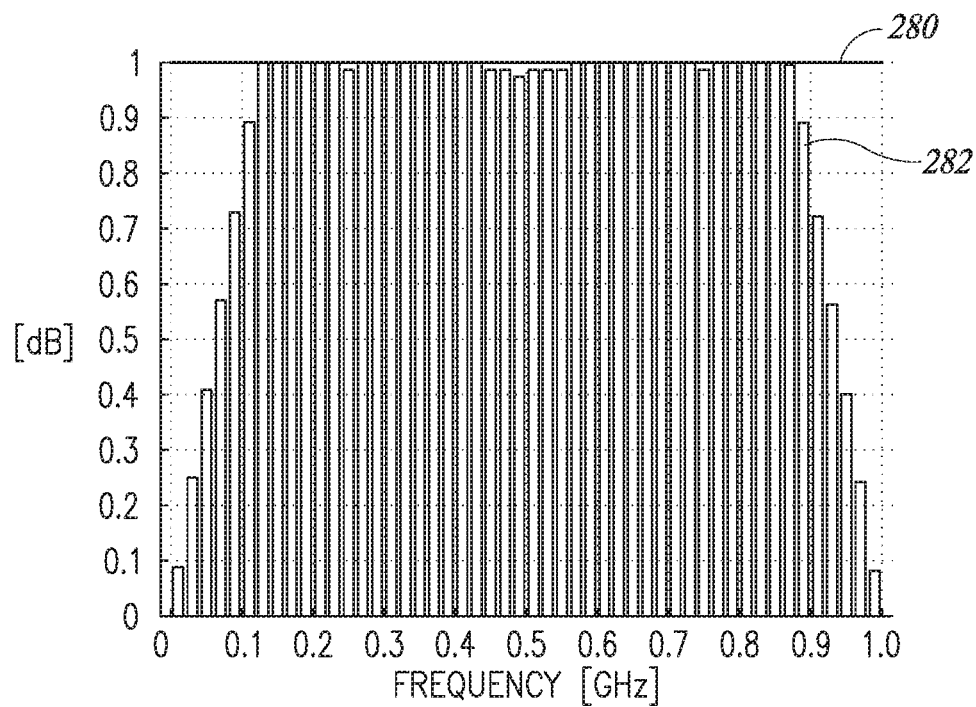
FIG. 35 is a graph illustrating an example histogram of aggregated frequency distribution for a uniform distribution.

Consider a single target positioned at initial range $R_0$=11 m with velocity $V_0$=10 m/s. The performance of the peak sidelobe level is compared between a uniform distribution of the SPW and a SPW of the well-known Hann window. A graph of the histogram 282 of the aggregated uniform frequency distribution 280 of the spectral probability window is shown in FIG. 35. Note that the histogram represents the degree of reuse of frequencies of the chirps across the CPI. It also is related to the power spectrum of the chirp sequence over a CPI. Note the slight reduction in frequency reuse near the edges of the aggregate frequency band.

Figure 36:
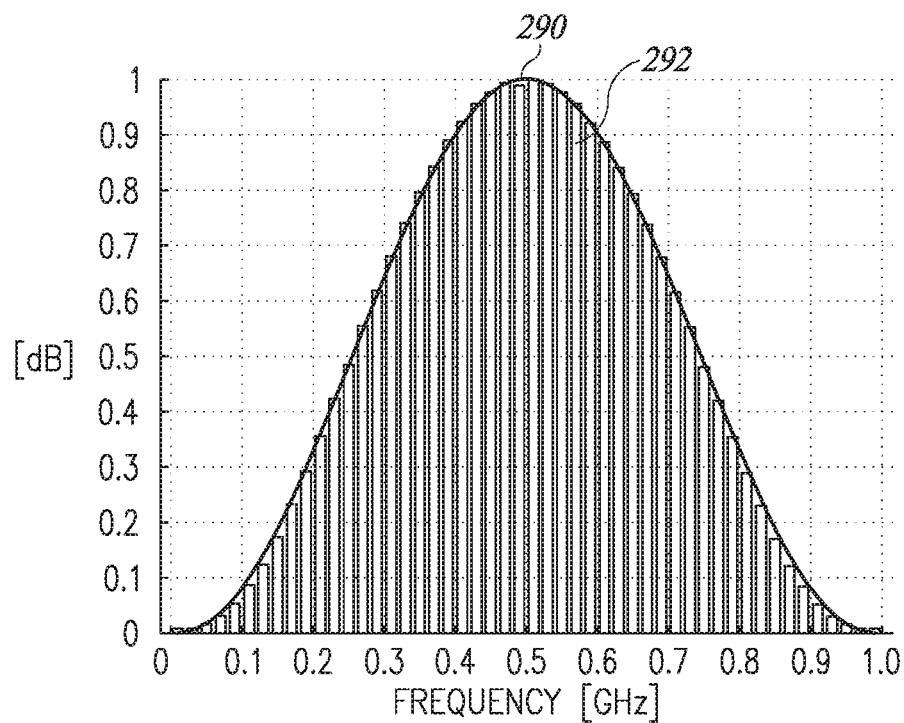
FIG. 36 is a graph illustrating an example histogram of aggregated frequency distribution for a Hann distribution.

A graph of the histogram 292 of the aggregated Hann frequency distribution 290 of the spectral probability window is shown in FIG. 36. Note that the histogram shows much higher frequency reuse around the center of the aggregate frequency band with far less frequency reuse near the edges. This graph also relates to the power spectrum of the chirps in a CPI.

Accordingly, the Hann shaped SPW is obtained via a suitable sine function for distribution probability of the chirp starting frequencies as follows $$Pr(\Delta[k] = f) = \sin^{1.5}\left(\pi \frac{f}{B_{total} - B_{chirp}}\right) \quad (26)$$

The convolution of the frequency hopping sequence (generated according to Equation 26) with a rectangular window of size $B_{chirp}$ yields the required Hann window shaped SPW. It is appreciated that the invention is not limited to the use of the Hann window function, as any desired window function may be used as is well-known in the art, e.g., Hamming, Blackman, Nuttall, Gaussian, Kaiser, Taylor, etc.

Figure 37:
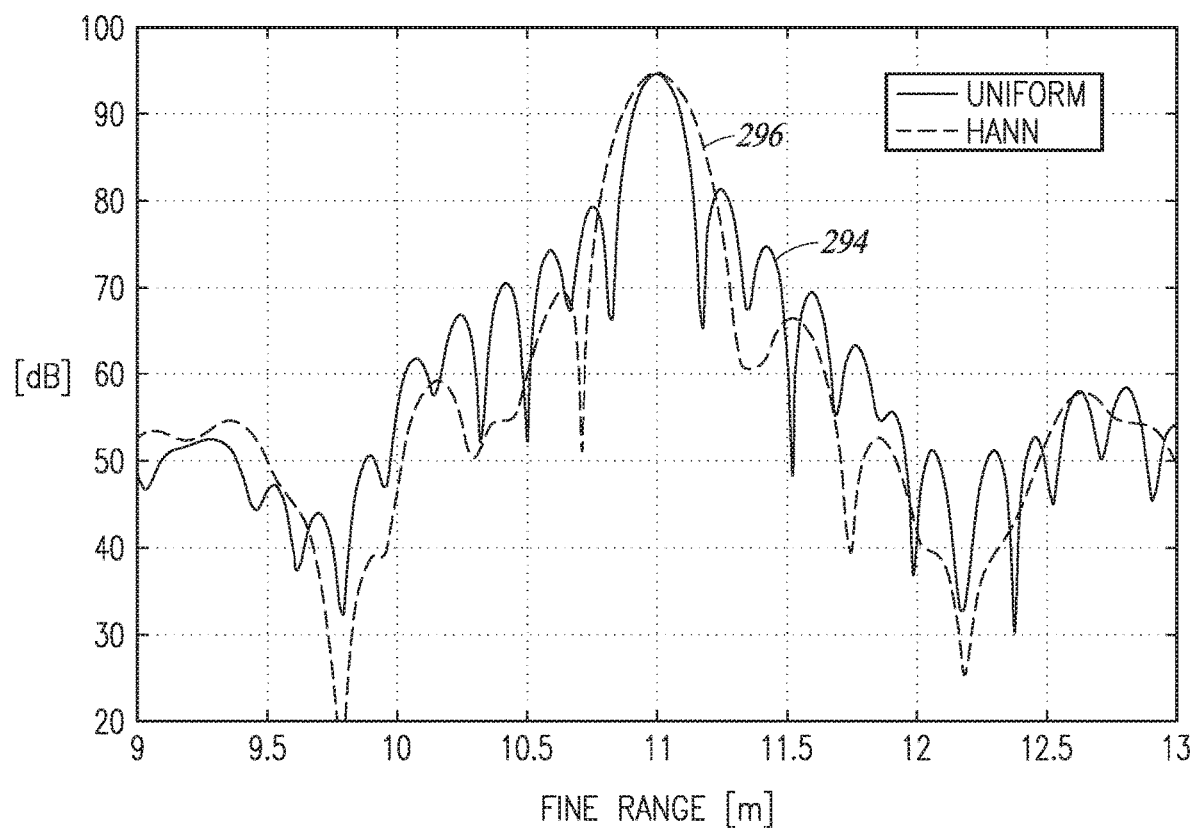
FIG. 37 is a graph illustrating an example fine range power spectrum at a peak Doppler bin for both uniform and Hann distributions.

A graph illustrating another example fine range power spectrum at a peak Doppler bin for both uniform and Hann distributions is shown in FIG. 37. The spectrum 294 for the uniform distribution has a first sidelobe approximately 15 dB below the peak. The spectrum 296 for the Hann distribution has a sidelobe approximately 25 dB below the peak, an improvement of 10 dB. Note the slightly wider main lobe on the Hann spectrum.

Thus, transmitting a windowed chirp sequence in accordance with the invention effectively applies a window function to the fine range data (and not the Doppler data) thereby lowering sidelobes. The cost is a relatively small reduction in aggregate bandwidth resulting in a slightly wider main lobe.

Note that unlike conventional digital windowing, the spectral probability window maintains coherent integration gain for any desired selection of window. This is due to the same amount of total power transmitted during the CPI as in the uniform frequency distribution.

Note further that the total range spectrum (i.e. coarse and fine) is given by the multiplication of the Fourier transforms of the fast time window and the slow time fine range window, i.e. the Fourier transform of the SPW(•).

In addition, the 'cost' of lower sidelobes is a slightly wider main lobe due to the effective reduction in the aggregated bandwidth $$\delta R > \frac{c}{2B_{total}},$$

assuming a windowed frequency hopping distribution is employed.

Mutual Interference

Regarding resistance to mutual interference, mutual interference is typically a problem for radar systems intended to operate in a very crowded spectrum, partially occupied by other radar systems. Two ways to reduce mutual interferences include:
1. Avoiding mutual interference all together, by predicting the frequency and time of interferences. It is preferable to have short pulses with small bandwidth, allowing the radar to use even small slices of open spectrum and time slots. This is enabled by the use of multiband chirp in accordance with the present invention.
2. Canceling interfered signal portions along the CPI by multiplying the interfered signal by zero (possibly using a window function). In the case of multiband chirp, even if large portions of the signal need to be cancelled, the performance of the system degrades gracefully and in both noise and sidelobe terms.

The MBC mechanism of the present invention addresses the mutual interference problem. One mutual interference suppression method is to shift the radar carrier frequency to a frequency range that is not contaminated by the radar-to-radar interferences. This approach, however, has a problem in that it is usually difficult to find a free frequency band with sufficient bandwidth to operate for distributed radar sensor networks. It also requires the use of higher bandwidth antennas which are more difficult to design and manufacture.

Another interference suppression method removes all the signals, except for the interference, similar to switching off the transmitter, for subtraction from the original radar signal. This technique has the limitation that the peaks must be separated from, or at least not totally occupied by, the interference.

In another interference suppression method, an iterative filtering algorithm is first used to suppress the radar-to-radar interferences and then a separately matched filtering for each radar is used.

Other interference suppression methods in the time or frequency domain include time-frequency blanking, reconstructing and then subtracting, and range domain orthogonal projection filtering. In a multistatic adaptive pulse compression algorithm, concurrently received radar signals within the same frequency band are separated given the knowledge of the individual radar waveforms. This algorithm is based on a recursive implementation of a minimum mean-square error formulation. An adaptive receive filter is estimated for each resolution cell of each received radar signal by utilizing the estimated values of the contemporaneous resolution cells. These methods, however, are not suitable for dealing with wideband or nonstationary interferences, particularly wideband radar-to-radar interferences that typically occur in distributed radar sensor networks.

In another interference suppression method, the normally transmitted chirp is significantly reduced in bandwidth and duration. A diagram illustrating an example CPI with a plurality of chirps is shown in FIG. 6.

In an effort to mitigate mutual interference as well as to improve the decoupling of the Doppler processing and reduce the sample rate required in the IF stage, the individual transmitted chirps are reduced in bandwidth and duration as shown in FIG. 7 described supra.

In one embodiment, to improve processing gain and to mitigate interference, the starting frequency of each chirp is arranged nonlinearly (e.g., randomized) over the CPI or some other desired interval. Preferably, the randomized sequence covers the entire bandwidth $B_{total}$ 32, e.g., 1 GHz in this example.

As an illustrative example, consider a radar sensor having an aggregate bandwidth of 1 GHz which translates to a range resolution of 15 cm, a coherent processing interval (CPI) of 20 ms, and a chirp duration $T_C$ of 6 microseconds. This yields a chirp sequence of CPI÷$T_C$=3,333 chirps. If it is assumed that each chirp has a bandwidth of 125 MHz and that the allocated RF band extends from 80 to 81 GHz, the start frequencies of the chirps are in range 80 to 80.875 GHz, otherwise the chirps spill over the allocated range.

Next, the 80 to 80.875 GHz frequency band is divided into 3,333 evenly spaced starting frequencies $f_s$. Note that alternatively, the starting frequencies may be non-evenly spaced. Next, the 3,333 start frequencies are reordered in nonlinear fashion (e.g., random) and used to transmit the sequence of chirps. Note that the nonlinear ordering is needed to break the coupling between Doppler induced and range induced phase evolution from one chirp to the next. This is commonly referred to as slow time phase or video phase. If a chirp sequence is transmitted with monotonically increasing start frequency ordering, it would be virtually impossible to determine whether the video phase evolution stems from range versus Doppler. Thus, a form of 'frequency hopping' or 'chirp hopping' is applied to the chirps. The hopping pattern is nonlinear, e.g., random, over the CPI but is not limited to this. In one embodiment, the SPW technique described supra can be used in conjunction with the interference mitigation described herein.

Figure 38:
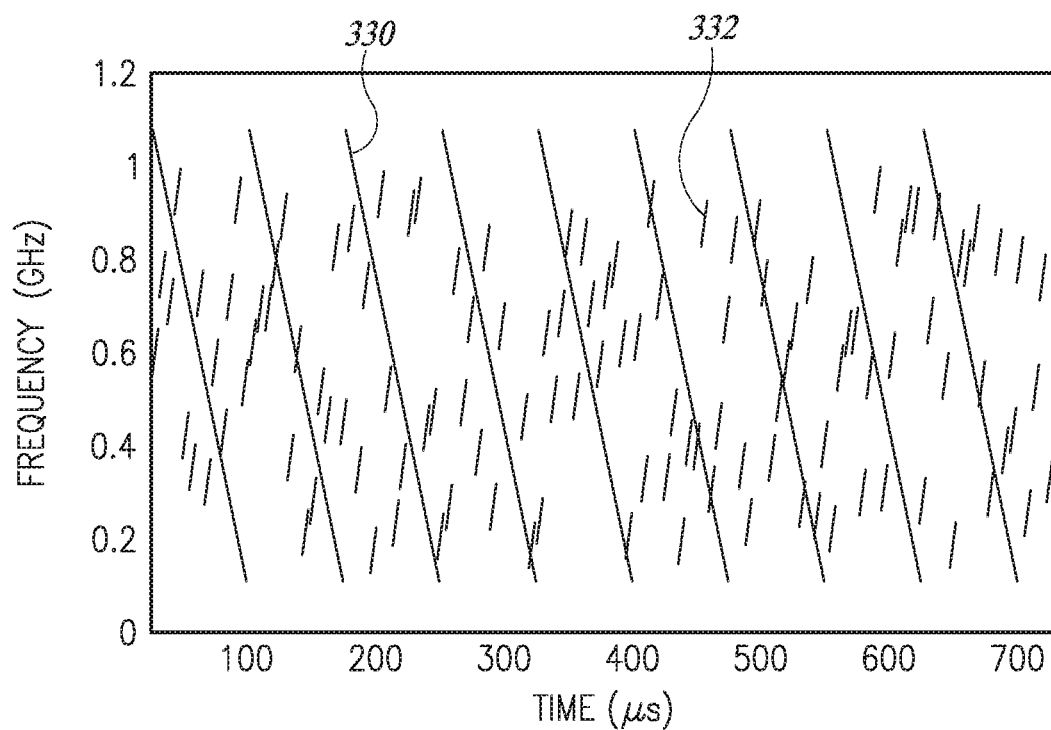
FIG. 38 is a diagram illustrating an example victim view.

A diagram illustrating an example victim view is shown in FIG. 38. This spectrogram (i.e. frequency versus time along with power as color shading) shows example slow, high bandwidth chirps 330 of the other nearby interfering radars and the fast, small bandwidth sub-chirps of the victim radar of the present invention. In this example, the victim radar transmits upward chirps (positive slope) and the interfering radar transmits downward chirps (negative slope). Shown is the nonlinear hopping of the shorter chirps of the victim radar compared to the regular long chirps of the interfering radar. Interference occurs when a long downward sloping chirp 330 crosses a short forward sloping chirp 332 which occurs in numerous locations in the spectrogram.

Note that it is evident from the spectrogram that even without the use of any interference avoidance techniques, some of the interfering radar chirps do not interfere with the victim radar chirps. Thus, a much better situation is achieved compared to the radar using conventional long chirps that span the full band (e.g., 1 GHz in this example). In the case of full 1 GHz chirps, crossing between the two radars would be inevitable, unless the radars are synchronized. Note also that avoidance techniques in this case would only work if the two radars have similar slopes and do not overlap in time. Such an avoidance technique, however, would only work for a one-on-one situation. Avoiding two or more other radars with different slopes would be virtually impossible.

Figure 39:
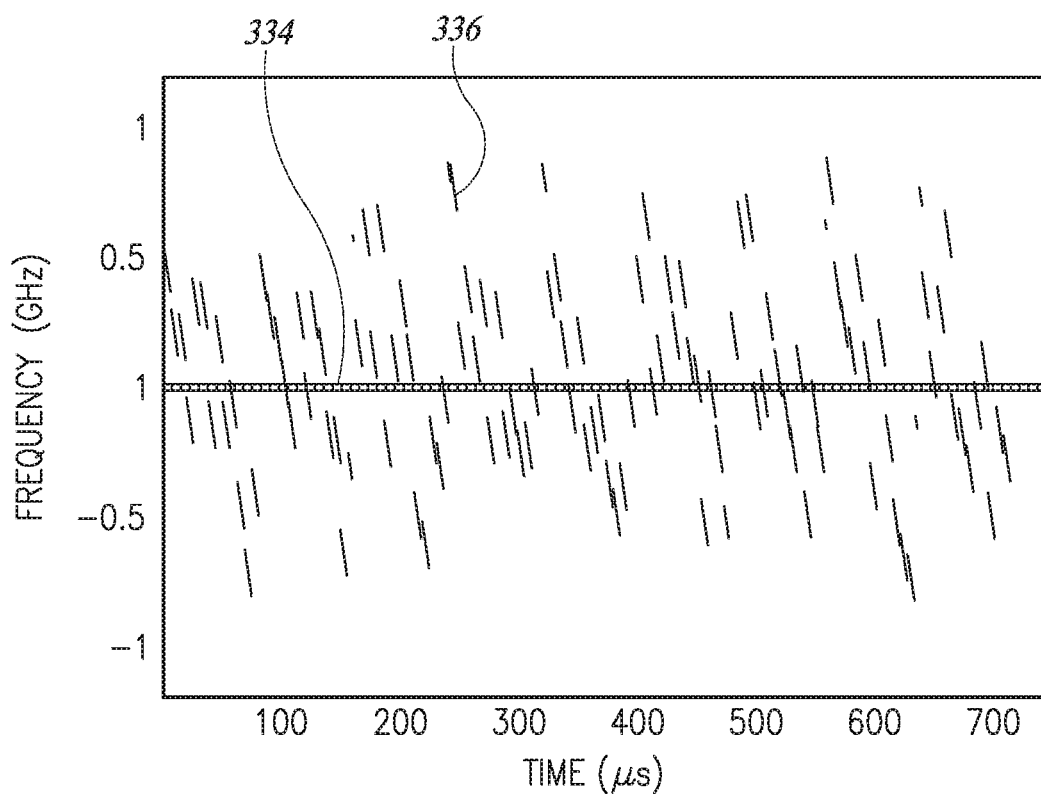
FIG. 39 is a diagram illustrating an example victim view after de-ramping.

A diagram illustrating an example victim view after de-ramping is shown in FIG. 39. This spectrogram (i.e. frequency versus time along with power as color shading) shows the spectrogram of FIG. 38 post de-ramping process including the victim radar desired signal 334 and the interfering radar signal 336. Note that during processing by the victim radar, the chirp transmitted by the interfering radar is chopped during the chirp reassembly process of the victim radar. Note also that the interference to the victim radar occurs around zero frequency and within the IF bandwidth of 12 MHz where any of the lines 336 cross line 334.

Figure 40:
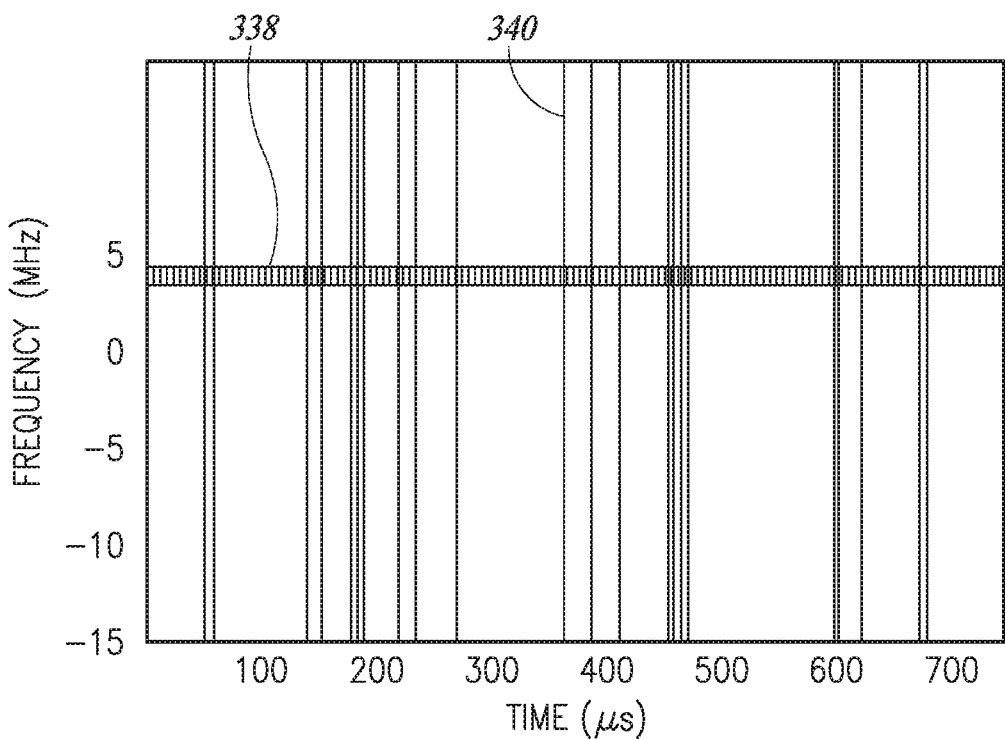
FIG. 40 is a diagram illustrating an example victim view after de-ramping and low pass filtering.

A diagram illustrating an example victim view after de-ramping and low pass filtering is shown in FIG. 40. The spectrogram shown here is of the victim's radar baseband signal with interference after de-ramping and low pass filtering. The dashed straight line 338 at approximately 4 MHz represents multiple chirps of the radar while the vertical lines 340 represent the interference from the other (i.e. interfering) radar. Each line 340 that crosses line 338 represents interference to the victim's radar.

Figure 41:
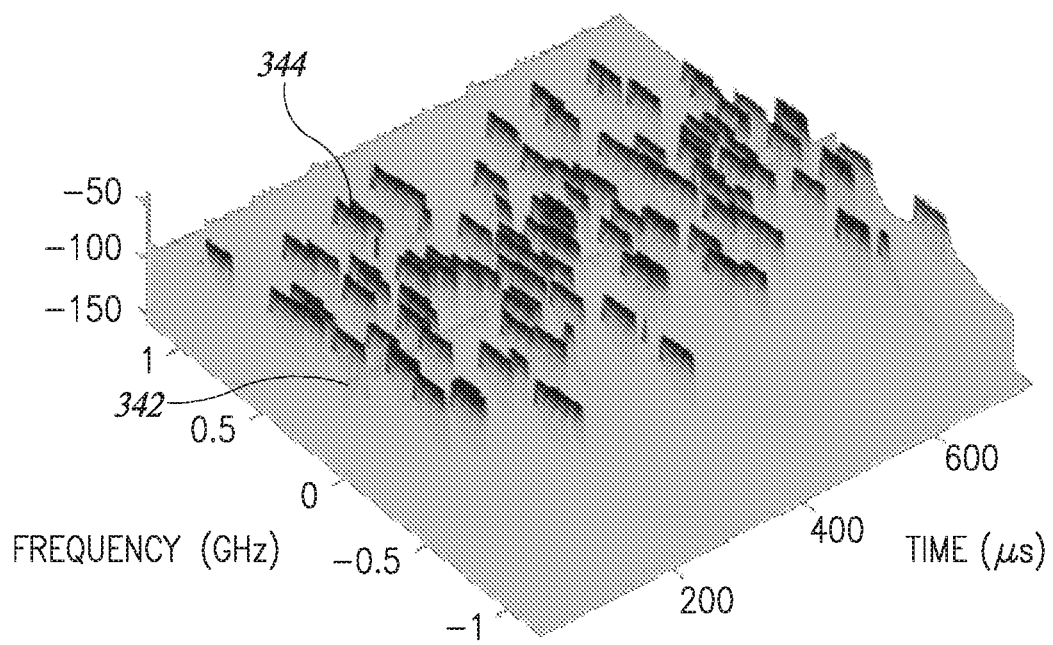
FIG. 41 is a diagram illustrating an example 3D victim view after de-ramping.

A diagram illustrating an example 3D victim view after de-ramping is shown in FIG. 41. This spectrogram is the same as the spectrogram of FIG. 39 but with a different point of view with interference level shown by height in dBs. Note that the interfering radar's chopped chirps 344 are approximately 30 dB above the desired signal 342. Note also that the victim radar suffers interference only where interference lines 344 cross line 342.

Figure 42:
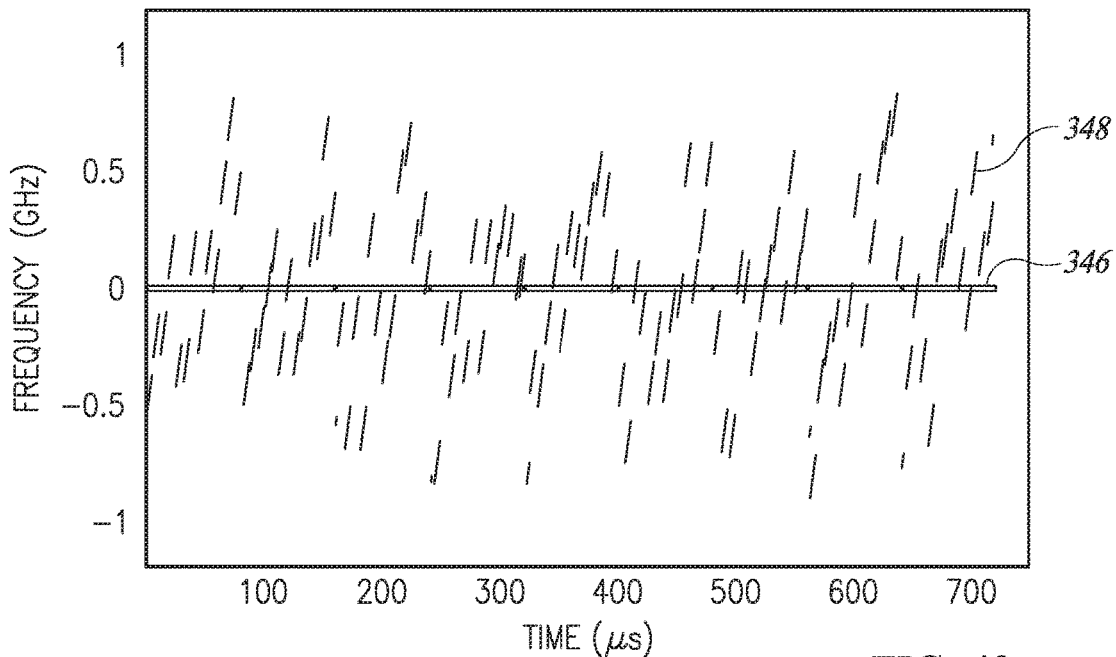
FIG. 42 is a diagram illustrating an example interferer view after de-ramping.

A diagram illustrating an example interferer view after de-ramping is shown in FIG. 42. This spectrogram represents what the other (i.e. interferer) radar sees. The radar of the present invention is considered the victim. Accordingly, shirt sloping lines 348 represent the hopping chirp pattern as seen by the interferer's radar and line 346 around zero frequency represents the de-ramped interferer's desired signal. Here, the interferer's radar suffers interference only when one of the lines 348 crosses line 346.

Thus, as described supra, in the absence of interference, the randomized unconstrained order sequence for transmitting the chirps is sufficient and achieves good results. In the presence of interference with known parameters, however, the randomization alone is not sufficient to prevent the receiver from suffering from interference due to 'collisions' between the chirp signals from nearby radars, i.e. the interfering chirp signal entering the IF of the victim's receiver.

To overcome this, the radar sensor of the present invention places a constraint on the nonlinearization (e.g., randomization) process. The constraint is that after nonlinearization none of the chirps overlap the interference signal in the time-frequency domain. This technique can be implemented in any suitable manner depending on the particular application.

Figure 43:
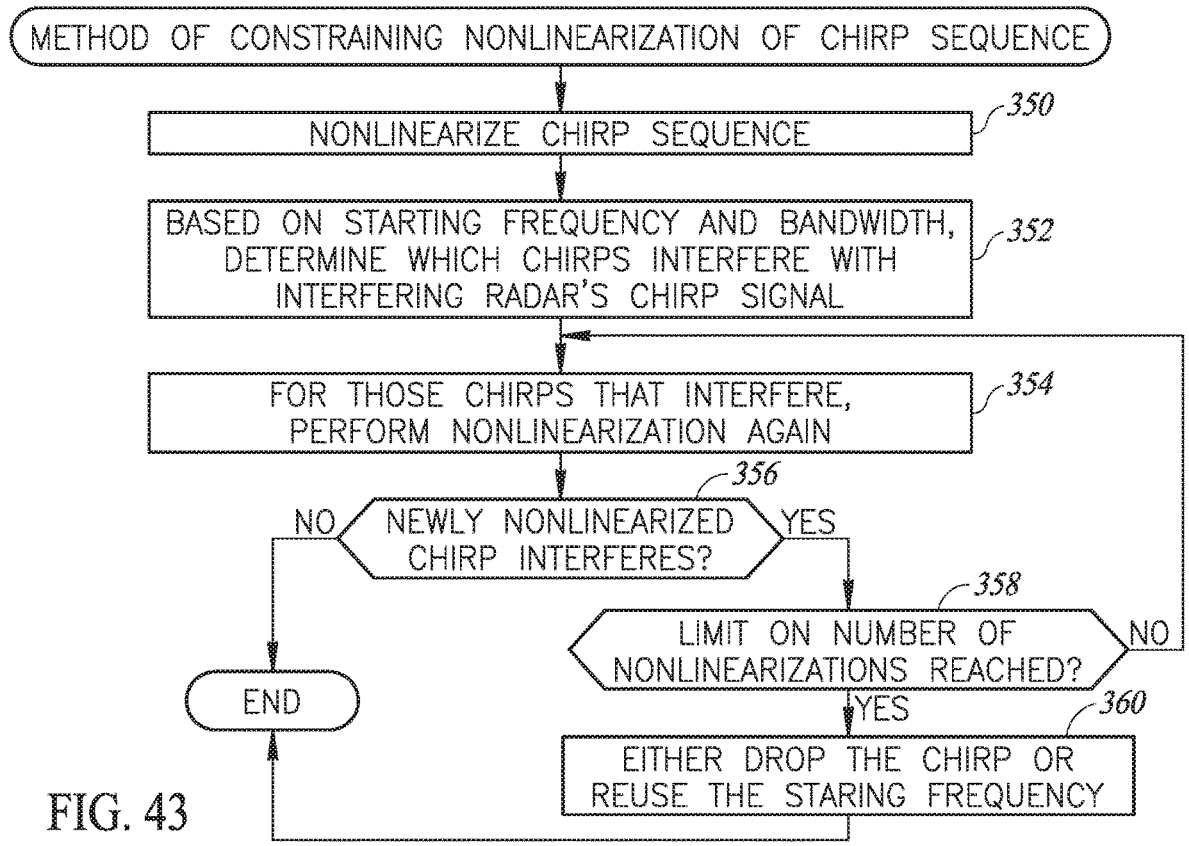
FIG. 43 is a flow diagram illustrating an example method of constraining randomization of the chirp sequence in accordance with the present invention.

A diagram illustrating an example method of constraining nonlinearization of the chirp sequence in accordance with the present invention is shown in FIG. 43. In one embodiment, after nonlinearization of the chirp sequence (step 350), the chirp intervals are examined to see whether they would collide with the interferer signal (step 352). This can be determined based on the known starting bandwidth of the chirp and its bandwidth. A list is constructed on the victim radar of all the chirps in the sequence that interfere. Each of these chirps are re-nonlinearized (step 354) and checked again whether they overlap with the interferer signal (step 356). If so, they are re-nonlinearized again. This process continues until either a new nonlinear interval is found that does not interfere with the interfering radar signal or a limit on the number of retries is reached (step 358). In the latter case, the original offending chirp is either thrown away (i.e. nothing is transmitted in its place), or one of the non-interfering chirps is repeated (i.e. the starting frequency is reused) (step 360).

Figure 44:
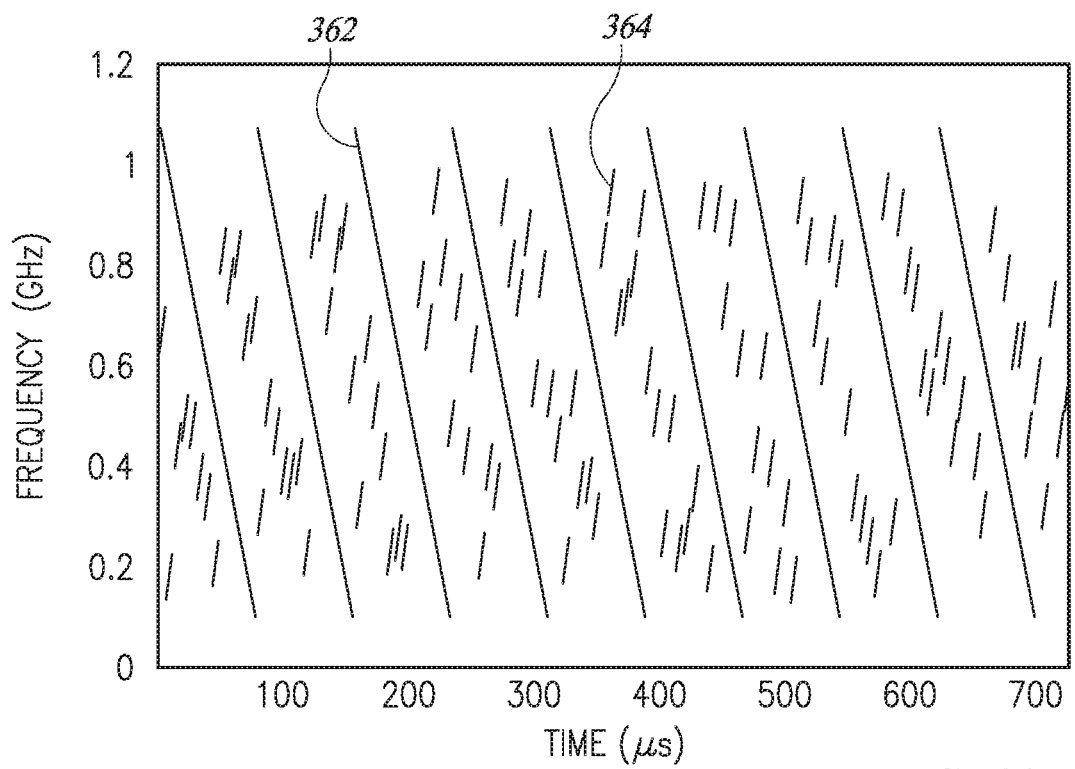
FIG. 44 is a diagram illustrating an example victim view after interference detection and avoidance.

A diagram illustrating an example victim radar view after interference detection and avoidance is shown in FIG. 44. In one embodiment, the victim radar is able to mitigate and avoid the mutual interference shown in the spectrograms described supra. Using the detection capability provided by the detection receiver 45 (FIG. 19), the radar functions to detect and estimate the other interfering radar's chirp parameters, such as bandwidth, duration, timing, etc.

In one embodiment, this can be achieved by the dedicated detection receiver sampling the total RF bandwidth its antenna sees with a fast ADC. Alternatively, periodic full chirps are used in listening mode (e.g., using look through or a separate LO).

Once the other radar's chirp characteristics are estimated, the victim radar alters the starting frequencies of the chirps so as to avoid interference with the chirps of other interfering radars. An example of the result of the alteration is shown in the spectrogram of FIG. 44 where the victim radar chirps 364 are now depicted not crossing any of the interfering radar chirps 362. This reduction in interference is to be compared to the spectrogram of FIG. 38 which represents the victim radar view without the mitigation technique of the present invention.

Note that the radar can be configured to (1) alter the start frequency of each chirp thereby creating custom start frequencies of each chirp or only selected chirps that are estimated to collide with the interferer's chirps, (2) maintain the original start frequencies of chirps but after nonlinearizing the chirps swap out chirp hop sequences that are estimated to collide with the victim's chirps and replace them with a chirp that does not collide with the victim's chirp and reassign the swapped out chirp to another slot, or (3) a combination of the above two techniques.

In another embodiment, if interference is detected, the victim radar can, in addition to altering the starting frequency of chirps, modify the sign of the slope of each chirp (i.e. whether each chirp rises or falls in frequency which is equivalent to positive or negative slope, respectively).

Figure 45:
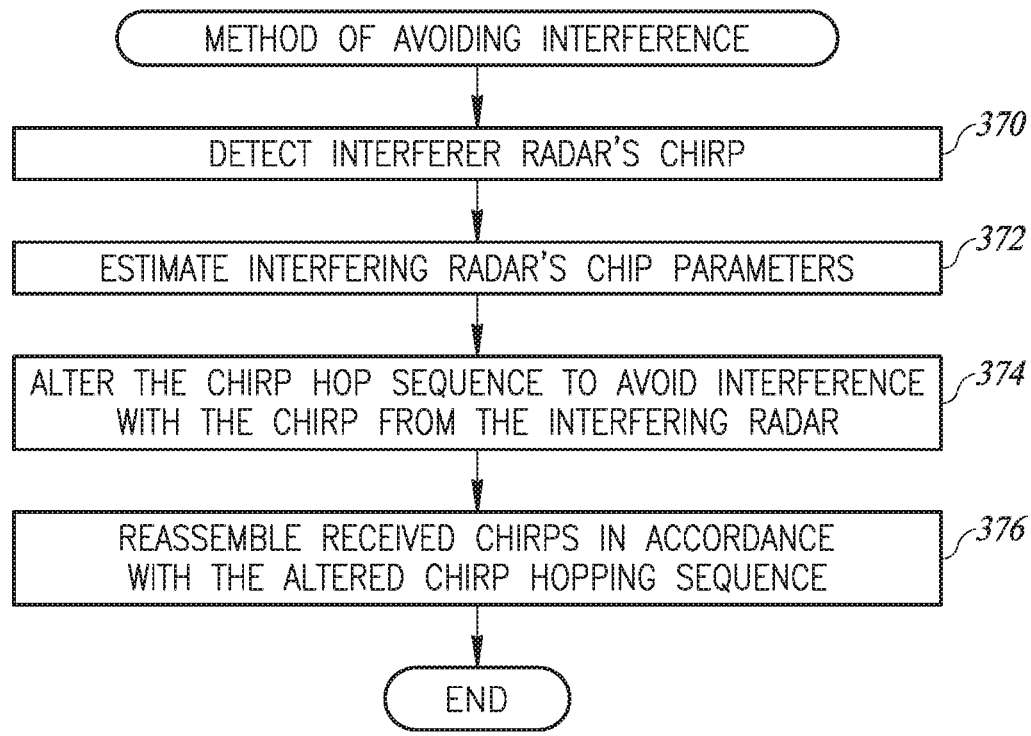
FIG. 45 is a flow diagram illustrating an example method of avoiding interference in accordance with the present invention.

A flow diagram illustrating an example method of avoiding interference in accordance with the present invention is shown in FIG. 45. The victim's radar first detects the interfering radar's one or more sequence of chirps as described supra (step 370). The parameters of the interfering radar's chirp are then estimated (step 372). Based on the estimated parameters, future hop sequences for the chirps are modified to avoid colliding with the interfering radar's chirp signal (step 374). The chirps are then reassembled in accordance with the hopping sequence (step 376).

Figure 46:
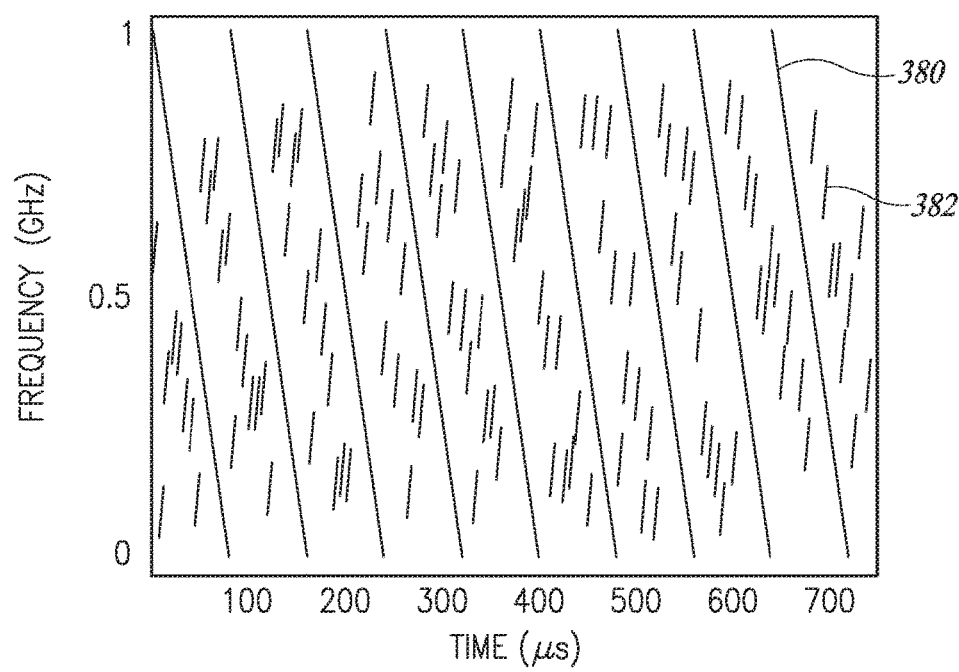
FIG. 46 is a diagram illustrating an example interferer view with interference detection and avoidance.

A diagram illustrating an example interferer view with interference detection and avoidance is shown in FIG. 46. In this spectrogram, the interfering radar's chirps 380 do not collide with the nonlinearized and constrained chirps 382 of the victim radar. Note that preferably the maximum propagation delay between the two radars, as deemed appropriate given the nature of the automotive scene and what is considered an acceptable level of residual mutual interference, is taken into account.

Figure 47:
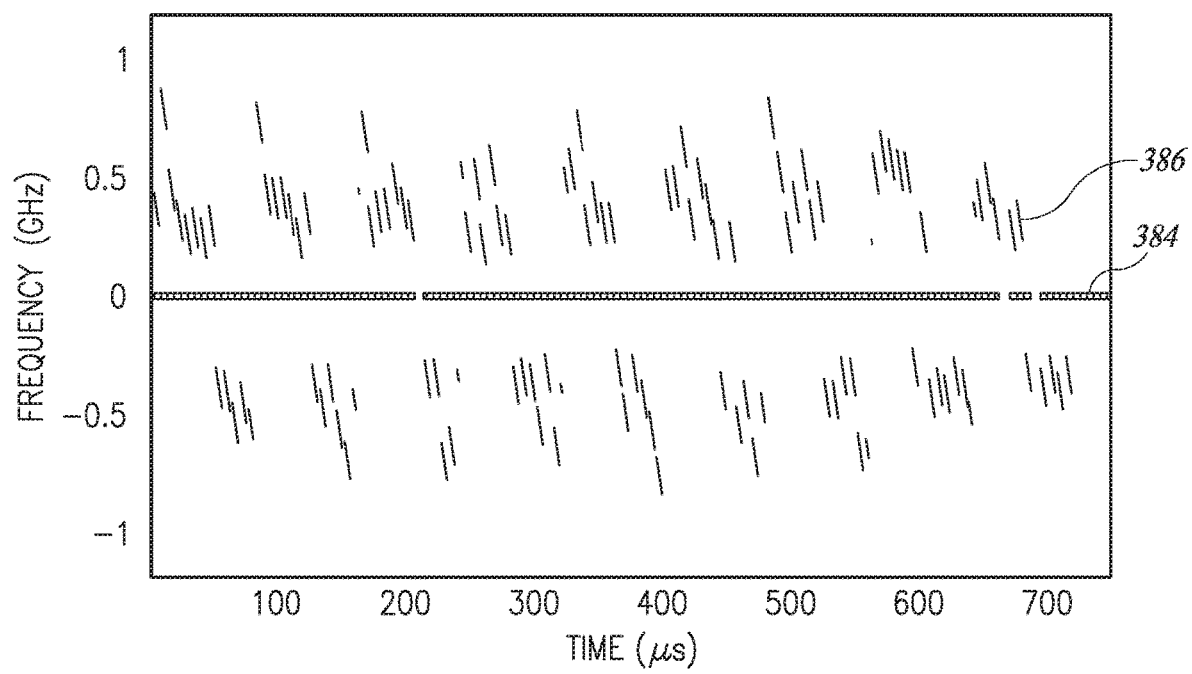
FIG. 47 is a diagram illustrating an example victim view with interference detection and avoidance post de-ramping.

A diagram illustrating an example victim view with interference detection and avoidance post de-ramping is shown in FIG. 47. In this spectrogram, the interfering radar's chirps 386 do not collide with the chirps 384 of the victim radar. Note the interference free zone around zero frequency. Note also, however, that several chirp intervals are empty. This is a result of the nonlinearization constraint method which resulted in several chirps whose starting frequencies were not able to be reassigned. Rather than reuse starting frequencies, in this example the chirps were simply deleted (i.e. skipped and not transmitted). This reduction in interference is to be compared to the spectrogram of FIG. 39 which represents the victim radar view without the mitigation technique of the present invention.

Figure 48:
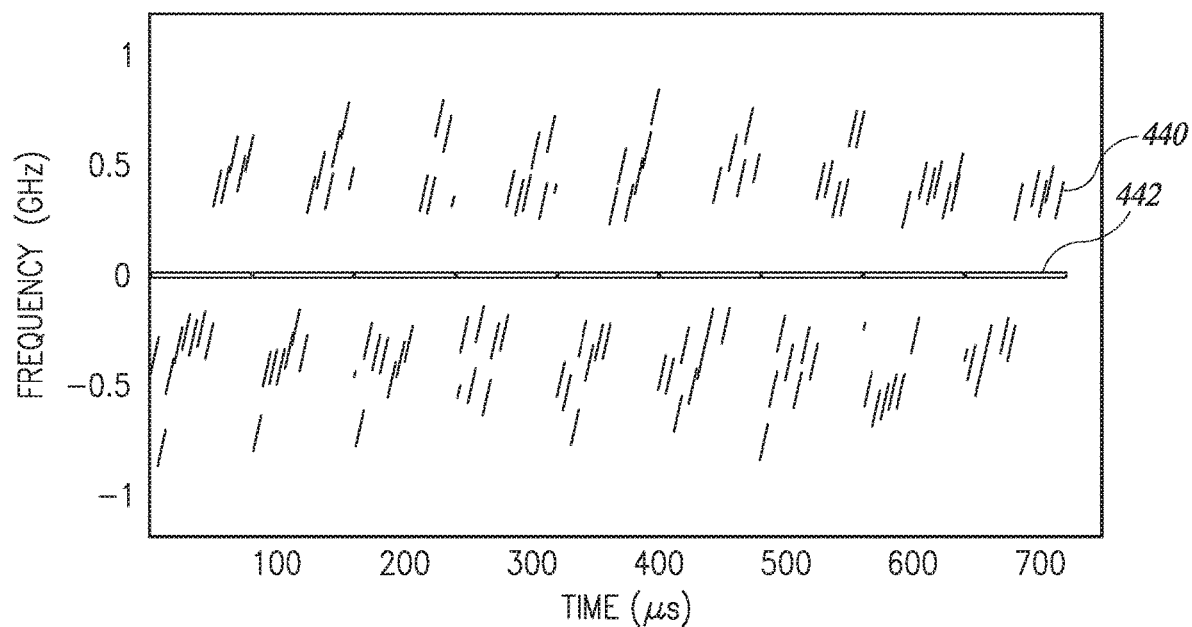
FIG. 48 is a diagram illustrating an example interferer view with interference detection and avoidance post de-ramping.

A diagram illustrating an example interferer view after interference detection and avoidance post de-ramping is shown in FIG. 48. In this spectrogram, the victim's chirps 442 do not collide with the chirps 440 of the interfering radar. Note the interference free zone around zero frequency. This reduction in interference is to be compared to the spectrogram of FIG. 41 which represents the victim radar view without the mitigation technique of the present invention.

Figure 49:
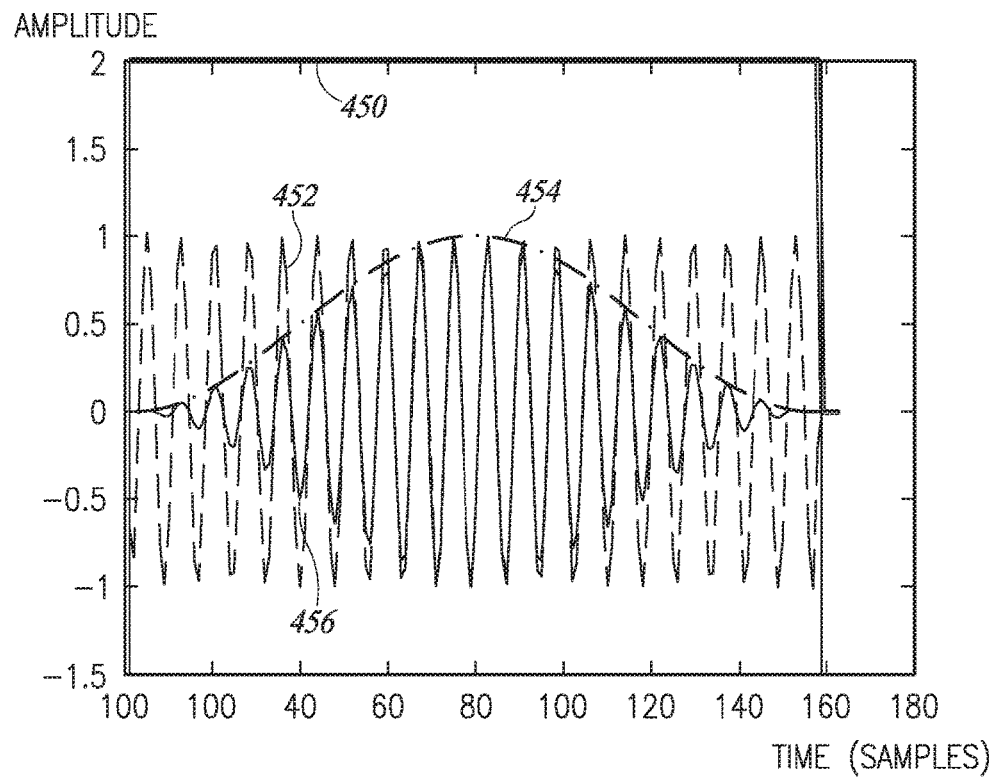
FIG. 49 is a diagram illustrating an example radar IF time domain signal without interference.

A diagram illustrating an example radar IF signal without interference is shown in FIG. 49. Since no interference is present, the entire frame is valid and used as denoted by the blanking signal 450 that encompasses the entire frame. The radar signal without interference 452 is shown before windowing. A window (e.g., Hann, Hamming, etc.) 454 is applied to the signal 452 resulting in the windowed signal 456. Note that in cases where avoidance mitigation fails or is impossible, a collision occurs.

Figure 50:
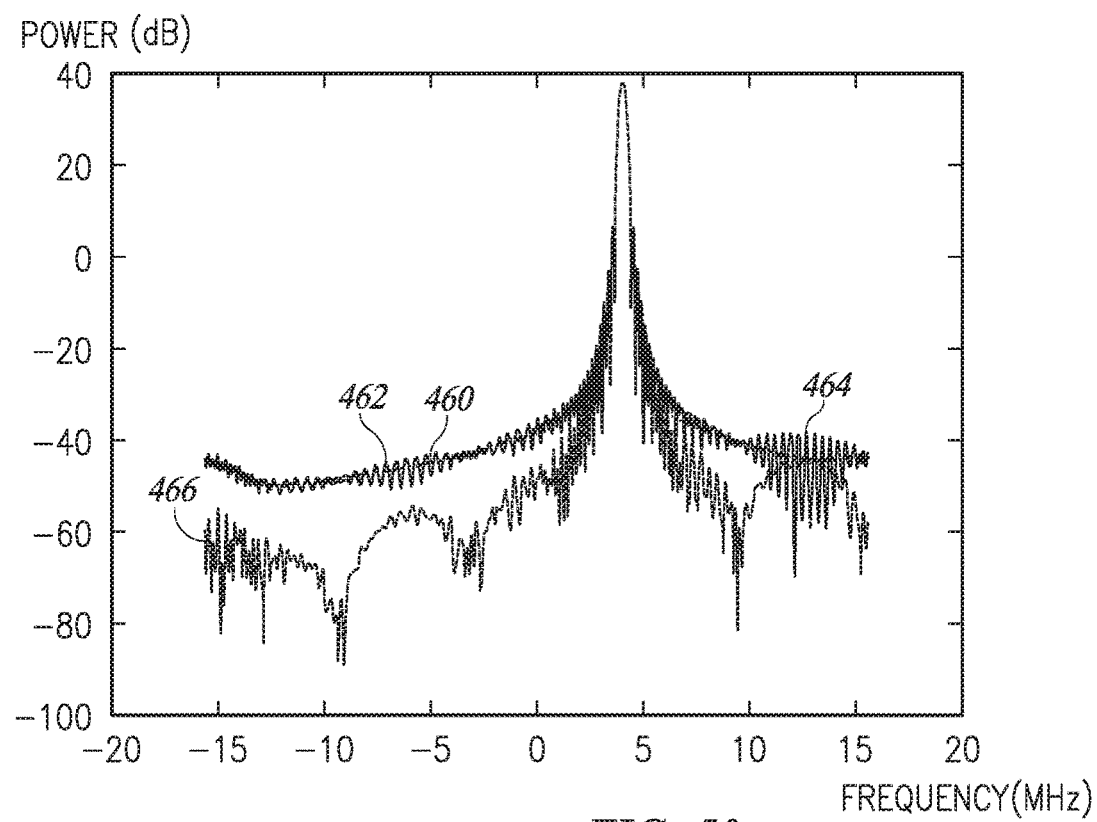
FIG. 50 is a diagram illustrating an example IF range spectrum without interference.

A diagram illustrating an example IF range spectrum without interference is shown in FIG. 50. The fast Fourier transform (FFT) of the windowed signal 456 (FIG. 49) is shown with no interference (signal 460), with interference (signal 462), with rectangular blanking (signal 464), and with windowed blanking (signal 466). Note that FIGS. 49 and 50 provide a reference for FIGS. 51, 52, 53, 54, 55, and 56, described infra.

In addition to the victim's radar avoiding collisions with interfering radar's chirp signals, the radar of the present invention also provides the capability of mitigating interference by blanking the portion of the chirp that is corrupted by the interfering chirp signal (i.e. the collision region). Two examples are provided and discussed below. In the first example, the collision between the two signals (i.e. where the interfering chirp enters the IF of the victim's receiver) occurs near the beginning of the chirp. In the second example, the collision between the two signals occurs closer to the middle of the chirp.

In another embodiment, interference mitigation may include the victim radar ceasing its own transmissions as long as interference is detected. This serves to minimize the interference inflicted by the victim radar on the nearby interfering radar.

Figure 51:
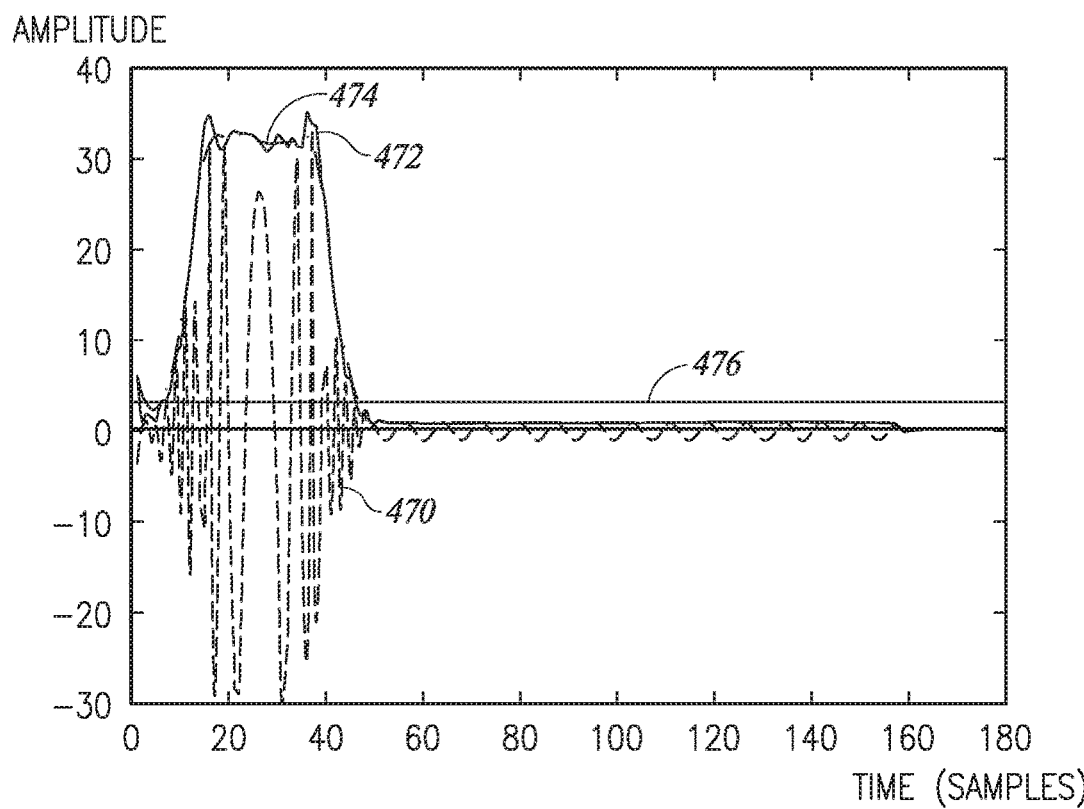
FIG. 51 is a diagram illustrating a first example time domain IF signal with interference.

A diagram illustrating a first example time domain IF signal with interference is shown in FIG. 51. In this example, the interference appears in the victim's radar IF bandwidth and occurs near the beginning of a chirp interval. The signals shown include the IF signal (signal 470), envelop (signal 472), smoothed envelope (signal 474), and the threshold (signal 476). The amplitude of the interference is approximately 30 dB stronger than the desired signal. To detect the interference, the envelope (e.g., complex envelope) of the signal is calculated and then smoothed. A threshold is then set at the 30% percentile plus some positive bias, for example. It is appreciated that other threshold values can be used depending on the particular application. Interference detection (i.e. whenever the smoothed envelope exceeds the threshold) are filtered, e.g., by a median filter. Then areas where the desired signal is free of interference are identified, and each is multiplied by a window with matching length. Signal processing then proceeds as usual, e.g., range FFT calculation, Doppler FFT calculation, azimuth and/or elevation calculation, digital beam forming, etc.

Figure 52:
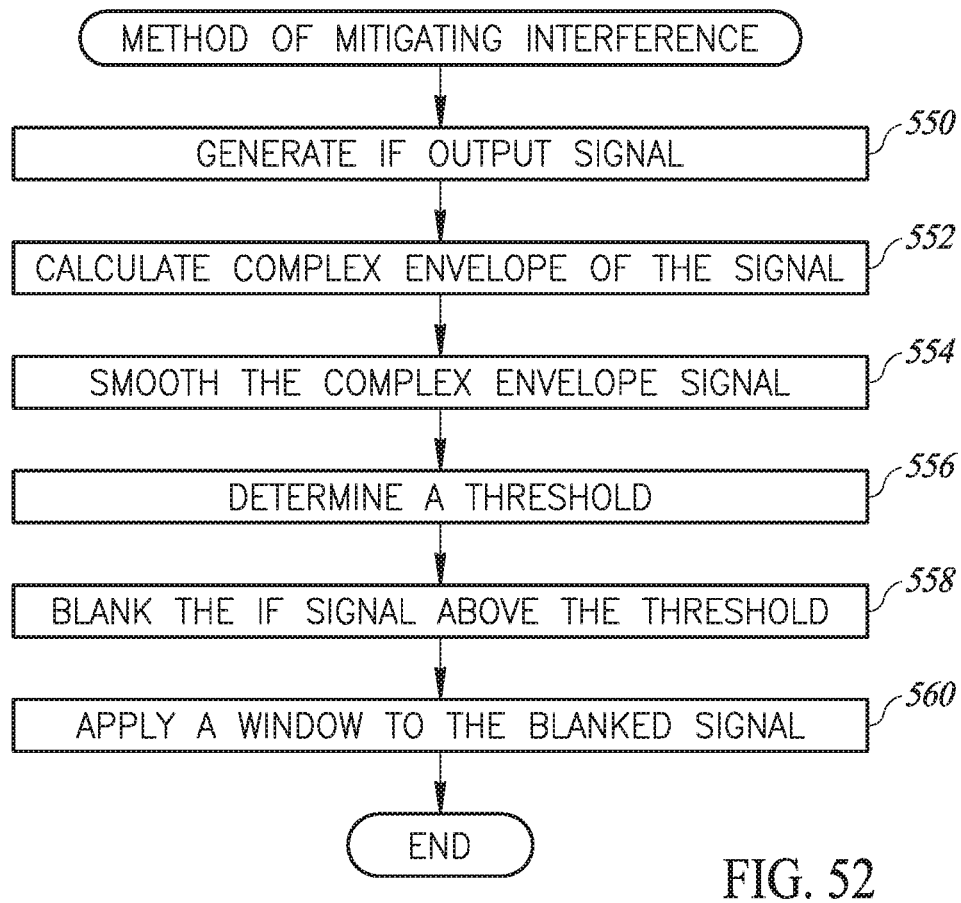
FIG. 52 is a flow diagram illustrating an example method of mitigating interference in accordance with the present invention.

A diagram illustrating an example method of mitigating interference in accordance with the present invention is shown in FIG. 52. First, an IF signal is generated (step 550). The complex envelope of the IF signal is calculated (step 552). The complex envelope is then smoothed using any suitable filer (step 554). A threshold to be applied to the smoothed complex envelope signal is determined using any suitable method (step 556). The threshold is applied whereby all values above the threshold are zeroed (i.e. blanked) (step 558). A window is then applied to the blanked signal (step 560).

In particular, with reference to FIG. 51, the time domain signal output of the IF stage (signal 470) of the victim radar is corrupted with the interferer's radar chirp. The complex envelope of the signal is calculated (signal 472) as well as a filtered or smoothed envelope (i.e. after low pass filtering) (signal 474). A threshold 476 is determined using any suitable method to apply to the smoothed envelope. Any part of the signal that is above the threshold is blanked (i.e. zeroed). Note that one method of determining the threshold is to calculate a percentile of the smoothed envelope value plus some positive bias.

Figure 53:
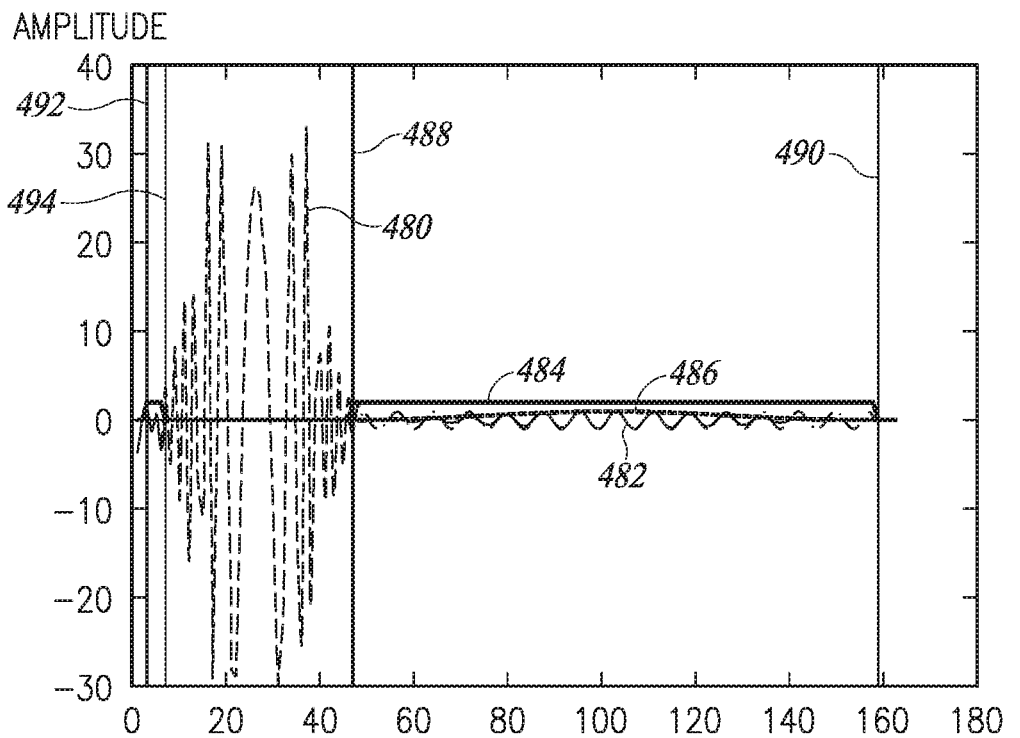
FIG. 53 is a diagram illustrating a first example time domain IF signal with interference before and after blanking.

A diagram illustrating a first example time domain IF signal with interference before and after blanking is shown in FIG. 53. The signal 480 is shown before blanking. A high level of the blanking signal 484 indicates portions of the signal that are valid and to be used while a low level represents those portions of the signal to be zeroed (i.e. invalid and to be discarded). Vertical line 492 indicates where valid signal begins, vertical line 494 indicates where valid signal stop and blanking should begin, vertical line 488 indicates where blanking should end and valid signal begins again, and vertical line 490 indicates where valid signal ends. Note that the signal 482 after blanking is applied is shown both before windowing and after window 486 is applied.

Figure 54:
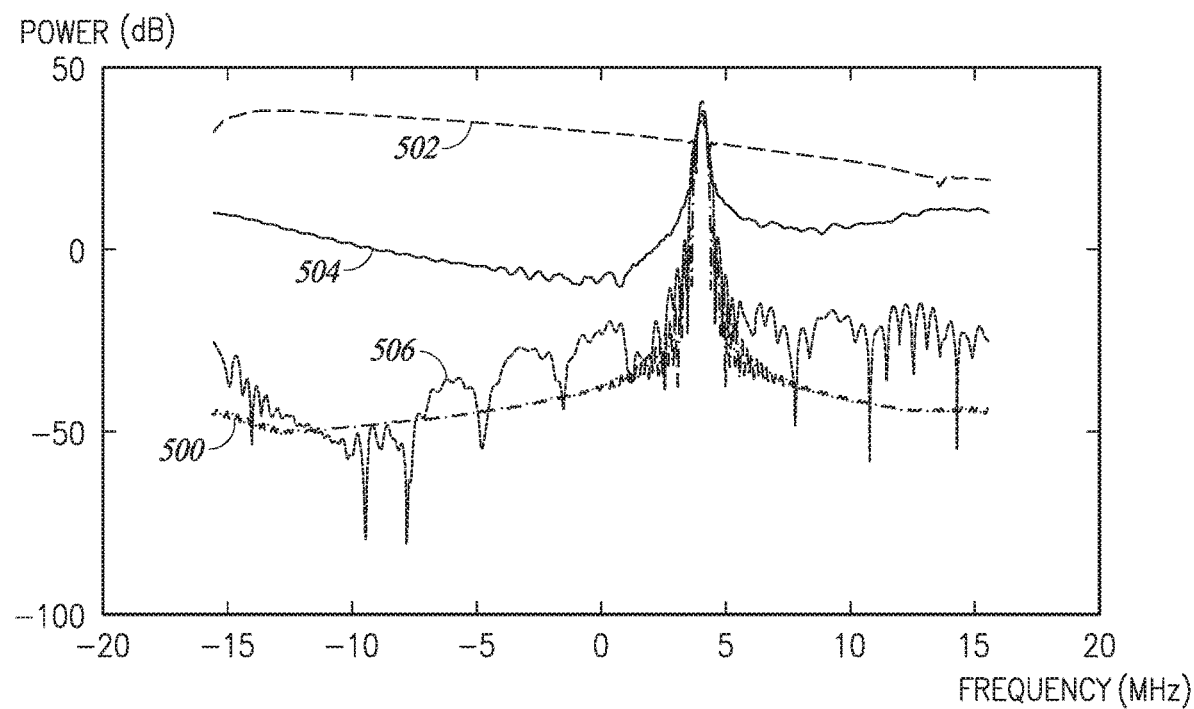
FIG. 54 is a diagram illustrating a first example IF range spectrum with interference and windowed blanking.

A diagram illustrating a first example IF range spectrum with interference and windowed blanking is shown in FIG. 54. The fast Fourier transform (FFT) of the windowed signal 482 (FIG. 53) is shown with no interference (signal 500), with interference (signal 502) and no interference blanking mitigation, with rectangular interference blanking mitigation (signal 504), and with windowed interference blanking mitigation (signal 506).

It is noted that as shown in the range FFT spectrum, if the interference is not mitigated (eliminated or blanked), the free dynamic range for target detection is severely degraded. If the interference samples are only zeroed, i.e. rectangular blanking, the dynamic range is improved but still far from the no interference case. If, however, windowed blanking is employed, the dynamic range available for detection is almost as good as the no interference case. Thus, significant detection improvement is achieved using windowed interference blanking mitigation.

Figure 55:
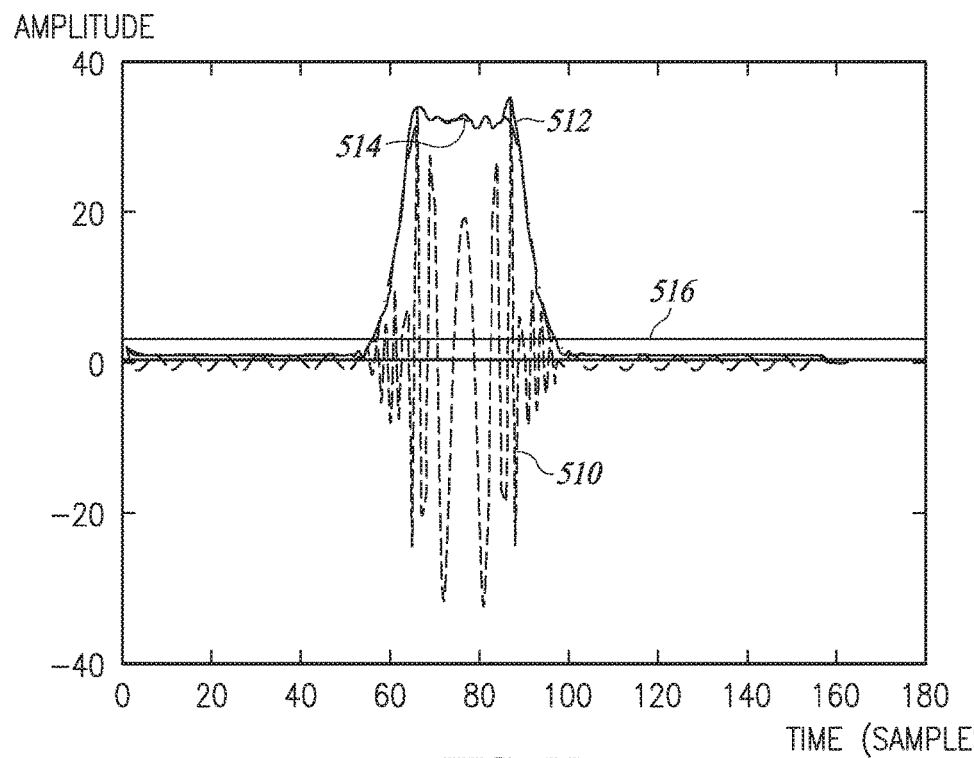
FIG. 55 is a diagram illustrating a second example time domain IF signal with interference.

A diagram illustrating a second example time domain IF signal with interference is shown in FIG. 55. In this example, the interference appears in the victim's radar IF bandwidth and occurs near the middle of a chirp interval. Note that windowed blanking achieves far better results than no blanking or blanking with rectangular windowing. In the case of interference in the middle of a chirp, either (1) both portions of the chirp can be used, i.e. before and after the interference (as shown in FIG. 41, where the resulting peak appears divided as expected, or (2) use only the longer portion of the signal, whereby a wider peak is obtained but it is not divided.

The amplitude of the interference is approximately 30 dB stronger than the desired signal. To detect the interference, the envelope (e.g., complex envelope) of the signal is calculated and then smoothed. A threshold is then set at the 30% percentile, for example. It is appreciated that other threshold values can be used depending on the particular application. Interference detection (i.e. whenever the smoothed envelope exceeds the threshold) are filtered, e.g., using a median filter. Then areas where the desired signal is free of interference are identified, and each is multiplied by a window with matching length. Signal processing then proceeds as usual, e.g., range FFT calculation, Doppler FFT calculation, etc.

In particular, the time domain signal output of the IF stage (signal 510) of the victim radar is corrupted with the interferer's radar chirp. The complex envelope of the signal is calculated (signal 512) as well as a filtered or smoothed envelope (i.e. after low pass filtering) (signal 514). A threshold 516 is determined using any suitable method to apply to the smoothed envelope. Any part of the signal that is above the threshold is blanked (i.e. zeroed). Note that one method of determining the threshold is to calculate a percentile of the smoothed envelope value plus some positive bias.

Figure 56:
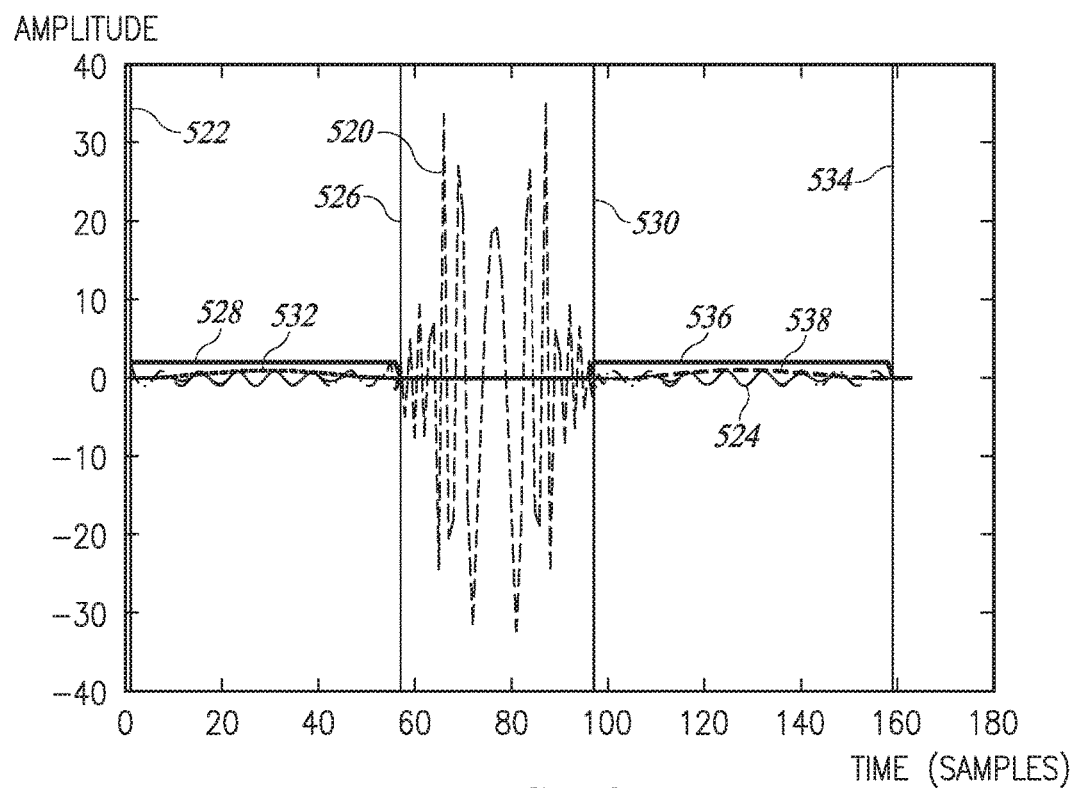
FIG. 56 is a diagram illustrating a second example time domain IF signal with interference before and after blanking.

A diagram illustrating a second example time domain IF signal with interference before and after blanking is shown in FIG. 56. The signal 520 is shown before blanking. A high level of blanking signals 528, 536 indicates portions of the signal that are valid and to be used while a low level represents those portions of the signal to be zeroed (i.e. invalid and to be discarded). Vertical line 522 indicates where valid signal begins, vertical line 526 indicates where valid signal stops and blanking should begin, vertical line 530 indicates where blanking should end and valid signal begins again, and vertical line 534 indicates where valid signal ends. Note that the signal 524 after blanking is applied is shown both before windowing and after windows 532 and 538 are applied.

Figure 57:
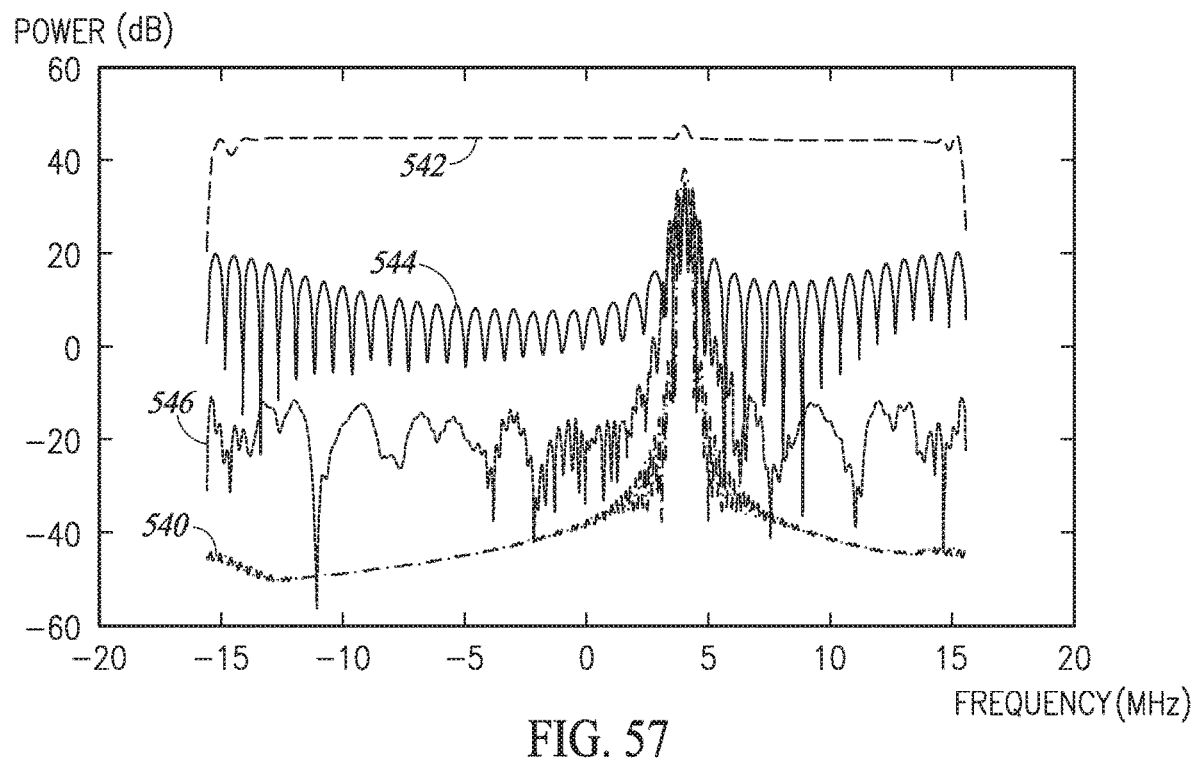
FIG. 57 is a diagram illustrating a second example IF range spectrum with interference and windowed blanking.

A diagram illustrating a second example IF range spectrum with interference and windowed blanking is shown in FIG. 57. The fast Fourier transform (FFT) of the windowed signal 524 (FIG. 56) is shown with no interference (signal 540), with interference (signal 542) and no interference blanking mitigation, with rectangular interference blanking mitigation (signal 544), and with windowed interference blanking mitigation (signal 546).

It is noted that as shown in the range FFT spectrum, if the interference is not mitigated (eliminated or blanked), the free dynamic range for target detection is severely degraded. If the interference samples are only zeroed, i.e. rectangular blanking, the dynamic range is improved but still far from the no interference case. If, however, windowed blanking is employed, the dynamic range available for detection is almost as good as the no interference case. Thus, significant detection improvement is achieved using windowed interference blanking mitigation.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediary components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the claims, any reference signs placed between parentheses shall not be construed as limiting the claim. The use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first," "second," etc. are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

The invention claimed is:

1. A method of processing receive data in a radar system adapted to transmit a multiband chirp signal utilizing a nonlinear start frequency hopping sequence, the method comprising:
    receiving radar digital input data samples from a sequence of chirps transmitted during a single coherent processing interval (CPI) and received via a plurality of receive antenna elements and associated receive circuitry in order to determine range, Doppler, azimuth and/or elevation to a target, each chirp having a pseudo-random start frequency, fixed fractional bandwidth, and fixed time duration, said radar digital input data samples processed in a fast time dimension to generate coarse range information;
    coherently processing said radar digital input data samples by:
    performing slow time processing on said sampled input data utilizing a modified Fourier transform that considers the pseudo-random start frequencies of the sequence of chirps to generate both Doppler data and fine range data having enhanced resolution without requiring coherent or non-coherent integration of multiple CPIs; and
    wherein said modified Fourier transform comprises

$$\underbrace{\mathcal{Y}[\rho, V, R_\varepsilon]}_{\substack{\text{Modified}\\\text{Fourier}\\\text{Transform}}} = \sum_{k=0:K-1} \mathcal{Y}[\rho, k] \cdot \underbrace{e^{j2\pi\frac{2Tf_0}{c}Vk}}_{\substack{\text{Doppler}\\\text{Fourier}\\\text{Coefficient}\\\text{(slow time)}}} \cdot \underbrace{\left(e^{-j2\pi\frac{(2R_\varepsilon - 2kTV)}{c}\Delta[k]} \cdot e^{-j2\pi\frac{2\rho}{c}\Delta[k]}\right)}_{\substack{\text{Fine Range Fourier Coefficient}\\\text{(fast time)}}}$$

where y[p,k] is the coarse range/slow time data map provided by fast time Fourier processing, $R_\varepsilon$ is the residual or fine range, T is the period of a pulse or chirp, V is velocity; k is the chirp index denoting slow time; ρ is the coarse range, c is the speed of light; Δ[k] is the frequency shift at chirp k, $f_0$ is the carrier center frequency.

2. The method according to claim 1, wherein the coarse range information is generated by applying Fourier processing on the sampled input data in the fast time dimension.

3. The method according to claim 1, wherein said modified Fourier transform comprises a Doppler term whereby a phase thereof changes linearly over slow time.

4. The method according to claim 1, wherein said modified Fourier transform is utilized to generate fine range data from said slow time processing with significantly higher resolution than fast time coarse range processing.

5. The method according to claim 1, wherein said modified Fourier transform comprises a fine range term whereby a phase thereof changes nonlinearly over slow time in accordance with a nonlinear start frequency hopping sequence.

6. The method according to claim 1, wherein a result of said modified Fourier transform is a fine range-Doppler map which is subsequently input to downstream azimuth/elevation processing.

7. The method according to claim 1, wherein a fine range-Doppler coupling ambiguity is broken by utilizing the nonlinear start frequency ordering for said chirp sequence in combination with said modified Fourier transform processing.

8. The method according to claim 1, wherein said range-Doppler slow time processing effectively combines a plurality of lower resolution coarse range fast time data into higher resolution fine range slow time data.

9. A method of receive processing in a radar system adapted to transmit a multiband chirp signal utilizing a nonlinear start frequency hopping sequence, the method comprising:
    receiving radar digital input data samples from a sequence of chirps transmitted during a single coherent processing interval (CPI) and received via a plurality of receive antenna elements and associated receive circuitry in order to determine range, Doppler, azimuth and/or elevation to a target, each chirp having a pseudo-random start frequency, fixed fractional bandwidth, and fixed time duration;
    coherently processing said radar digital input data samples by:
    performing a Fourier transform on the input data samples in a fast time dimension to generate coarse range bin data therefrom; and
    for each coarse range bin, performing slow time processing on said coarse range bin data utilizing a modified Fourier transform that considers the pseudo-random start frequencies of the sequence of chirps based on a known frequency shift wherein the Fourier transform takes into account the known frequency shift to generate both Doppler data and fine range data having enhanced resolution without coherent or non-coherent integration of multiple CPIs.

10. The method according to claim 9, wherein said modified Fourier transform comprises a Doppler term whereby a phase thereof changes linearly over slow time.

11. The method according to claim 10, wherein said Doppler term comprises $$e^{j2\pi \frac{2Tf_0}{c} Vk}$$

where T is the period of a pulse or chirp, $f_0$ is the carrier center frequency, V is velocity;
and k is the chirp index denoting slow time.

12. The method according to claim 9, wherein said modified Fourier transform comprises a fine range term whereby a phase thereof changes nonlinearly over slow time in accordance with a start frequency hopping sequence.

13. The method according to claim 12, wherein said fine range term comprises $$e^{-j2\pi \frac{(2R_\varepsilon - 2kTV)}{c} \Delta[k]} \cdot e^{-j2\pi \frac{2\rho}{c} \Delta[k]}$$

where $R_\varepsilon$ is the residual or fine range, T is the period of a pulse or chirp, V is velocity; k is the chirp index denoting slow time; $\rho$ is the coarse range, c is the speed of light; $\Delta[k]$ is the frequency shift at chirp k.

14. An apparatus for processing receive data in a radar system adapted to transmit a multiband chirp signal utilizing a nonlinear start frequency hopping sequence, comprising:
 a circuit operative to receive radar digital input data samples from a sequence of chirps transmitted during a single coherent processing interval (CPI) and received via a plurality of receive antenna elements and associated receive circuitry in order to determine range, Doppler, azimuth and/or elevation to a target, each chirp having a pseudo-random start frequency, fixed fractional bandwidth, and fixed time duration, said radar digital input data samples processed coherently in a fast time dimension to generate coarse range information therefrom; and
 a processor operative to perform coherent slow time processing on said input data samples utilizing a modified Fourier transform that considers the pseudo-random start frequencies of the sequence of chirps based on a known frequency shift wherein the Fourier transform takes into account the known frequency shift to generate both Doppler data and fine range data having enhanced resolution without coherent or non-coherent integration of multiple CPIs.

15. The apparatus according to claim 14, wherein said modified Fourier transform comprises a Doppler term whereby a phase thereof changes linearly over slow time.

16. The apparatus according to claim 15, wherein said Doppler term comprises $$e^{j2\pi \frac{2Tf_0}{c} Vk}$$

where T is the period of a pulse or chirp, $f_0$ is the carrier center frequency, V is velocity;
and k is the chirp index denoting slow time.

17. The apparatus according to claim 14, wherein said modified Fourier transform comprises a fine range term whereby a phase thereof changes nonlinearly over slow time in accordance with a start frequency hopping sequence.

18. The apparatus according to claim 17, wherein said fine range term comprises $$e^{-j2\pi \frac{(2R_\varepsilon - 2kTV)}{c} \Delta[k]} \cdot e^{-j2\pi \frac{2\rho}{c} \Delta[k]}$$

where $R_\varepsilon$ is the residual or fine range, T is the period of a pulse or chirp, V is velocity; k is the chirp index denoting slow time; $\rho$ is the coarse range, c is the speed of light; $\Delta[k]$ is the frequency shift at chirp k.

* * * * *